US008191140B2

(12) United States Patent
Cohen et al.

(10) Patent No.: US 8,191,140 B2
(45) Date of Patent: May 29, 2012

(54) INDICATING A SECURITY BREACH OF A PROTECTED SET OF FILES

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1216 days.

(21) Appl. No.: 11/444,893

(22) Filed: May 31, 2006

(65) Prior Publication Data

US 2008/0022400 A1    Jan. 24, 2008

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06Q 10/00 | (2012.01) |
| G06Q 20/00 | (2012.01) |

(52) U.S. Cl. .................... 726/23; 705/2; 705/64; 705/67
(58) Field of Classification Search .............. 726/22–24; 705/2, 64, 67
See application file for complete search history.

(56) References Cited

U.S. PATENT DOCUMENTS

| | | | | |
|---|---|---|---|---|
| 5,440,723 | A | * | 8/1995 | Arnold et al. ..................... 714/2 |
| 5,765,155 | A | * | 6/1998 | Nakamura ........................... 1/1 |
| 5,935,246 | A | | 8/1999 | Benson |
| 6,813,640 | B1 | * | 11/2004 | Benson et al. ................ 709/229 |
| 6,971,018 | B1 | | 11/2005 | Witt et al. |
| 7,120,933 | B2 | | 10/2006 | Mattsson |
| 7,555,458 | B1 | | 6/2009 | Felger |
| 7,634,800 | B2 | * | 12/2009 | Ide et al. .......................... 726/3 |
| 7,665,134 | B1 | * | 2/2010 | Hernacki et al. ................ 726/22 |
| 2002/0157021 | A1 | * | 10/2002 | Sorkin et al. .................. 713/201 |
| 2003/0101355 | A1 | * | 5/2003 | Mattsson ...................... 713/200 |
| 2005/0021972 | A1 | | 1/2005 | Levi et al. |
| 2005/0071684 | A1 | * | 3/2005 | Sorkin et al. .................. 713/201 |
| 2005/0114709 | A1 | | 5/2005 | Moore |
| 2005/0132184 | A1 | * | 6/2005 | Palliyil et al. ................. 713/152 |
| 2005/0132205 | A1 | * | 6/2005 | Palliyil et al. ................. 713/188 |
| 2005/0132206 | A1 | * | 6/2005 | Palliyil et al. ................. 713/188 |
| 2005/0229250 | A1 | | 10/2005 | Ring et al. |
| 2006/0031935 | A1 | * | 2/2006 | Lyle et al. ....................... 726/22 |

(Continued)

OTHER PUBLICATIONS

Gene H. Kim et al. The Design and Implementation of Tripwire: A File System Integrity Checker. Feb. 23, 1995. p. 1-18.*

(Continued)

*Primary Examiner* — Christian Laforgia

(57) ABSTRACT

Embodiments include a system, an apparatus, a device, and a method. An embodiment provides an apparatus that includes a marker circuit for saving a tripwire file in a protected set of files that includes at least one normal file. The apparatus also includes a monitor circuit for detecting an indicium of an activity related to the tripwire file. The apparatus further includes a notification circuit for generating a signal indicating an occurrence of an unauthorized activity related to the protected set of files in response to the detected indicium of an activity related to the tripwire file.

59 Claims, 61 Drawing Sheets

U.S. PATENT DOCUMENTS

| | | | |
|---|---|---|---|
| 2006/0053490 A1 | 3/2006 | Herz et al. | |
| 2006/0100912 A1* | 5/2006 | Kumar et al. | 705/4 |
| 2006/0112418 A1 | 5/2006 | Bantz et al. | |
| 2006/0248590 A1 | 11/2006 | Johnson | |
| 2006/0288414 A1* | 12/2006 | Kuroda | 726/24 |
| 2007/0079379 A1 | 4/2007 | Sprosts et al. | |
| 2007/0101425 A1* | 5/2007 | Mattsson | 726/22 |
| 2007/0209075 A1 | 9/2007 | Coffman | |
| 2008/0208935 A1* | 8/2008 | Palliyil et al. | 707/204 |
| 2009/0019547 A1* | 1/2009 | Palliyil et al. | 726/25 |

OTHER PUBLICATIONS

Gene H. Kim et al. Experiences with Tripwire: Using Integrity Checkers for Intrusion Detection. Feb. 21, 1994. p. 1-13.*
Brian M. Bown. Automating the Injection of Believable Decoys to Detect Snooping. Mar. 22-24, 2010. ACM. p. 1-6.*
U.S. Appl. No. 11/445,485, Cohen et al.
U.S. Appl. No. 11/444,979, Cohen et al.
U.S. Appl. No. 11/444,963, Cohen et al.
*Feist Publications, Inc.* v. *Rural Telephone Service Co.*; 499 U.S. 340 (1991); printed on Aug. 6, 2008; pp. 1-13; located at: http://www.law.cornell.edu/copyright/cases/499_US_340.htm.
Spitzner, Lance; "Honeytokens: The Other Honeypot"; SecurityFocus.com; Jul. 2003; printed on Jul. 14, 2008; pp. 1-5; located at: http://www.securityfocus.com/infocus/1713.
Thompson, Nicholas; "New Economy; The "honeytoken," an innocuous tag in a file, can signal an intrusion in a company's database"; The New York Times; Apr. 28, 2008; printed on Jul. 14, 2008; pp. 1-3; located at: http://query.nytimes.com/gst/fullpage.html?res=9F0CEFD7123DF93BA15757C0A9659C8B63.
"Using Fine Grained Auditing"; Oracle.com; bearing a date of 2005; printed on Jul. 14, 2008; pp. 1-11; located at: http://web.archive.org/web/20051108041203/http://www.oracle.com/technology/obe/10gr2_db_vmware/sevurity/fga/fga.htm.
"Controlling Change: Change auditing for compliance"; Tripwire Software; Bearing a date of 2006, printed on May 2, 2006; pp. 1-1; Tripwire, Inc.; located at: http://www.tripwire.com/products/index.cfm.
"Credit Cards—Players, Merchant Services Providers, Payment Gateway"; Shift4: Credit Card 101; printed on May 3, 2006; pp. 1-2; Shift4 Corporation; located at: http://www.shift4.com/players.htm.
"File System"; Wikipedia; Bearing a date of May 19, 2006, printed on May 19, 2006; pp. 1-6; Wikimedia Foundation, Inc.; located at: http://en.wikipedia.org/wiki/File_system.
"Financial transaction card fraud"; Minnesota Statutes 2005; Bearing a date of 2005, printed on May 17, 2006; pp. 1-4; Chapter 609, Section 821; Office of Revisor of Statutes, State of Minnesota; located at: http://www.revisor.leg.state.mn.us/stats/609/821.html.
"Giving you the Power to Accept Credit, Debit & Gift Cards"; PowerPay; Bearing a date of 2006, printed on May 3, 2006; pp. 1-3; PowerPay LLC; located at: http://www.powerpay.biz/help.htm.
"MasterCard Merchant: Terms of Use"; MasterCard International; Bearing dates of 1994-2006, printed on May 3, 2006; pp. 1-4; MasterCard International Incorporated; located at: http://www.mastercard.com/us/merchant/termsofuse.html.
"Merchant Account Basics for Credit Cards Processing"; WebSite 101; printed on May 3, 2006; pp. 1-4; located at: http://www.website101.com/shopping_ecommerce/merchant-account-basics.html.
"Possible creditcard fraud—Warning?"; AV Forums; printed on May 3, 2006; Bearing dates of 2000-2006; pp. 1-44; Jelsoft Enterprises Ltd.; located at: http://www.avforums.com/forums/archive/index.php/t-142625.html.
"An Online Tool to do a 'quick and dirty' diff of two text or code fragments"; Quick Diff Online Tool; pp. 1-8; printed on May 15, 2009; located at: http://quickdiff.com/index.php.
Belur, Meera; "Tripwire: A File System Integrity Checker for Intrusion Detection"; CS265: Computer Cryptography and Security; Bearing a date of 2002; total of 5 pages.
Collins English Dictionary (Dormant); Bearing a date 2000; Printed on May 22, 2009; total of 1 page; HarperCollins; London; located at: http://www.credoreference.com/entry/heengdict/dormant.
"IEEE 100 The Authoritative Dictionary of IEEE Standards Terms, Seventh Edition"; Bearing a date of 2000; total of 13 pages; IEEE; New York, USA.
"Internet Archive: Frequently Asked Questions"; printed on May 14, 2009, pp. 1-37; located at: http://www.archive.org/about/faqs.php.
Spitzner, Lance; "Honeytokens: The Other Honeypot"; Bearing a date of Jul. 21, 2003; printed on May 14, 2009; pp. 1-3; Security Focus; located at: http://web.archive.org/web/20030811090852/http://www.securityfocus.com/infocus/1713.
Belur, Meera, "Tripwire: A File System Integrity Checker For Intrusion Detection", CS265: Computer Cryptography and Security, Fall 2002, pp. 1-5; located at: www.cs.sjsu.edu/~stamp/CS265/projects/papers/tripwire.doc.

* cited by examiner

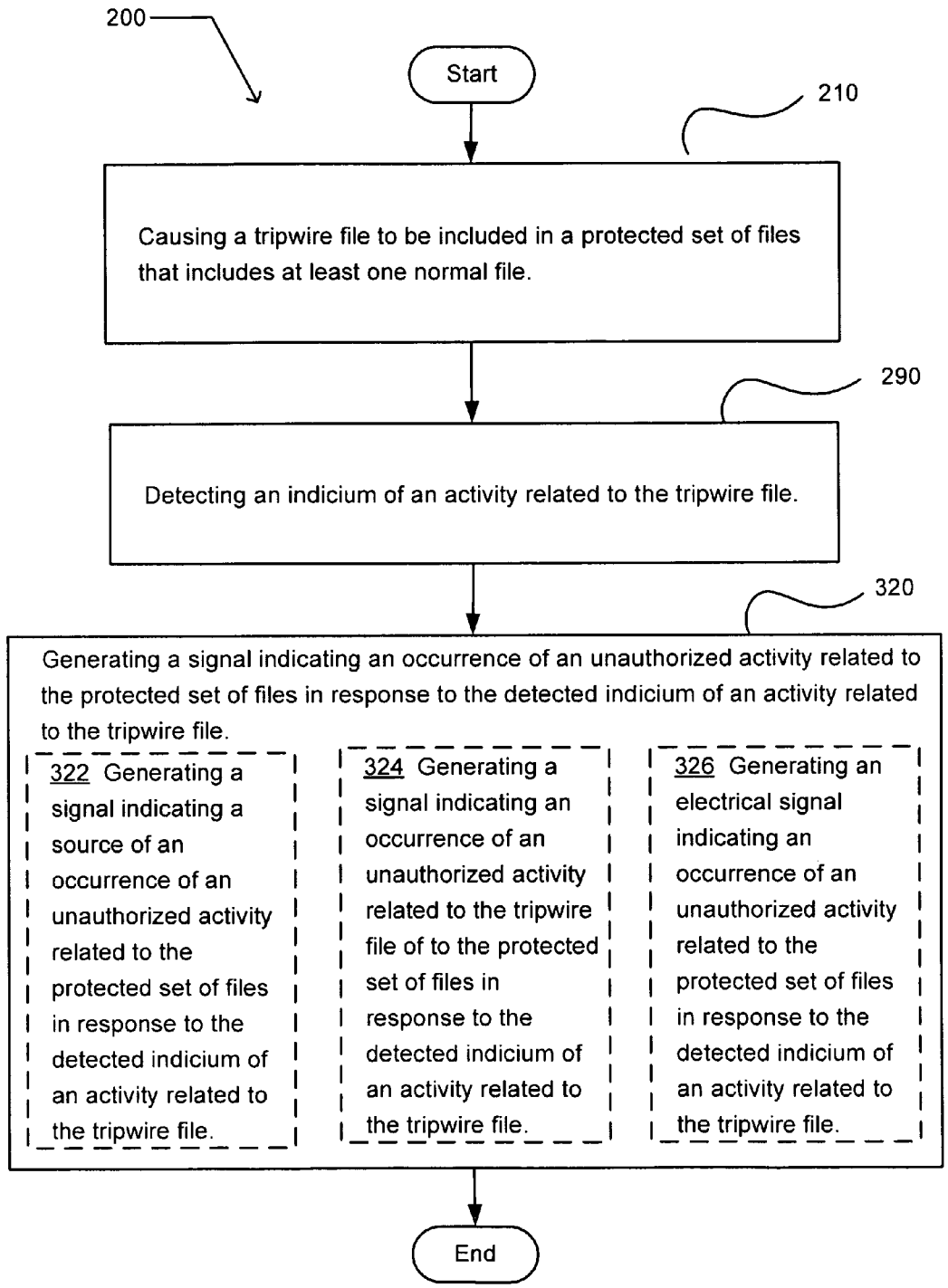

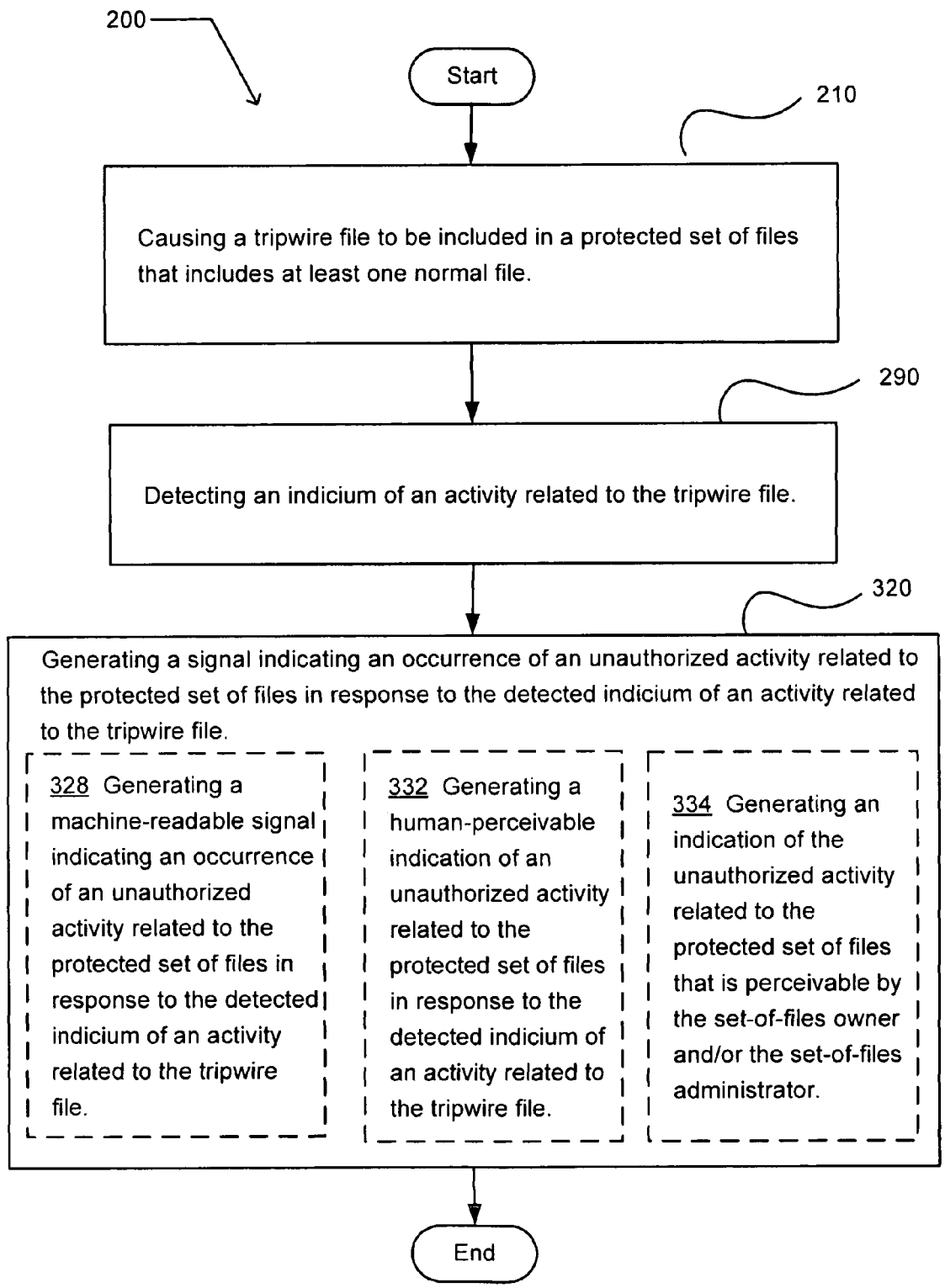

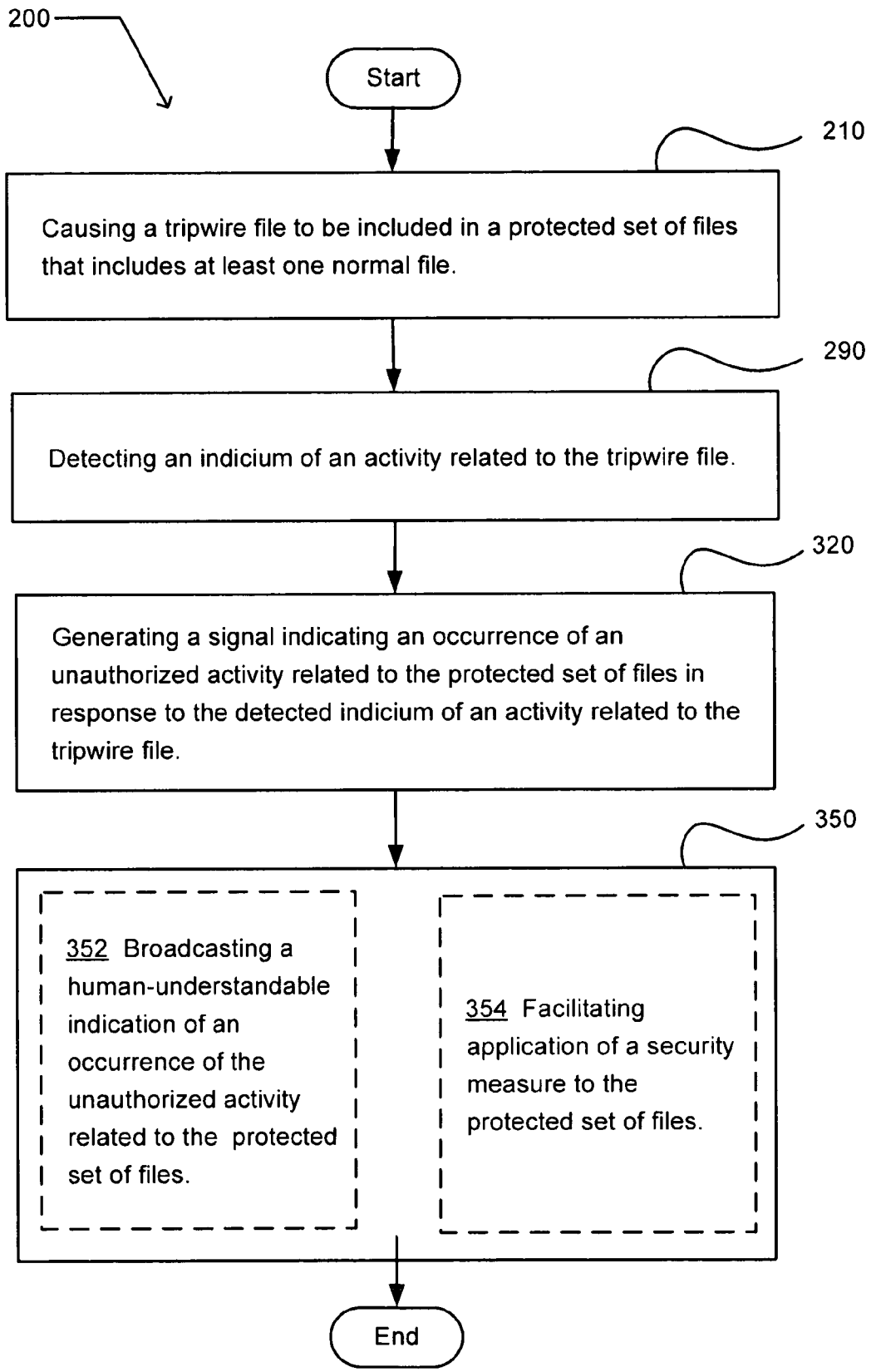

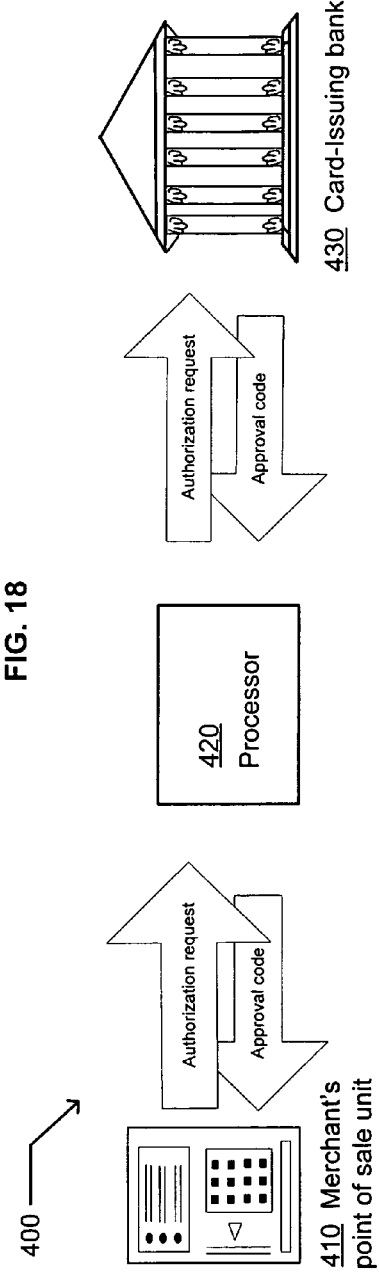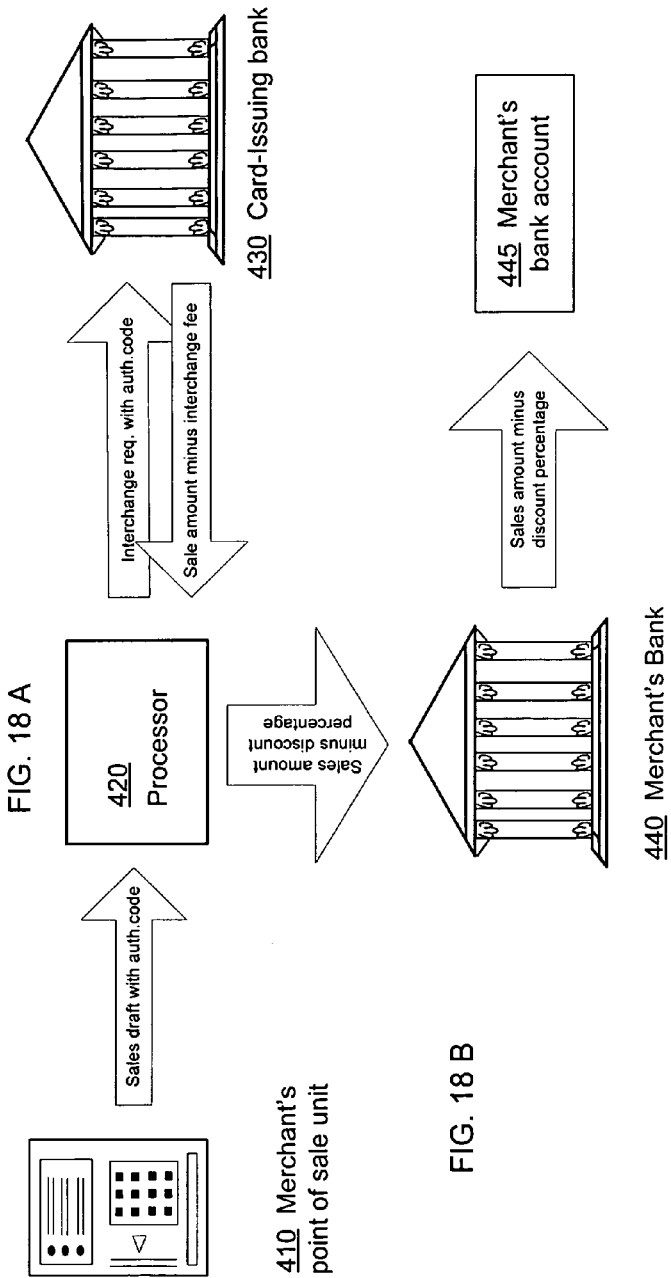

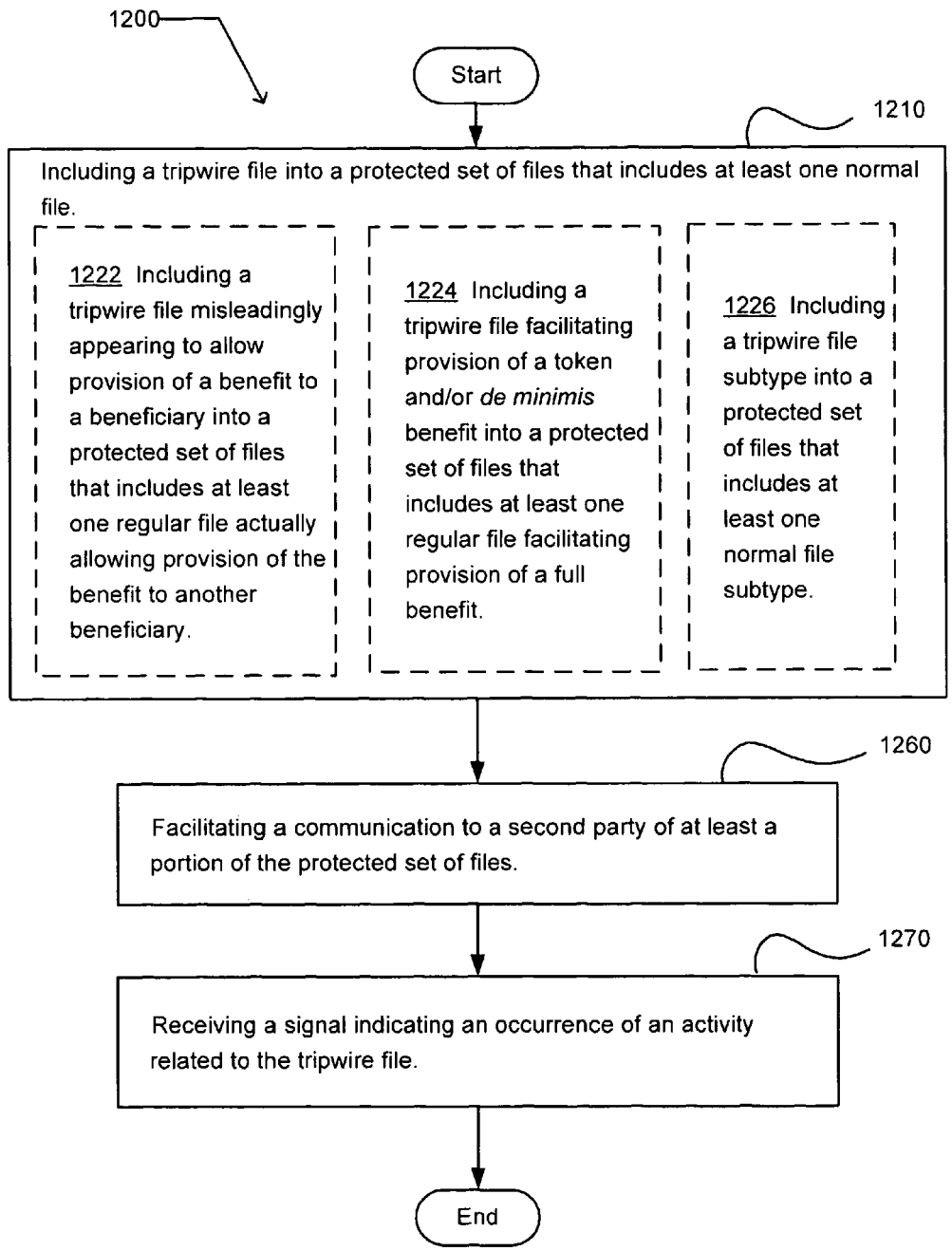

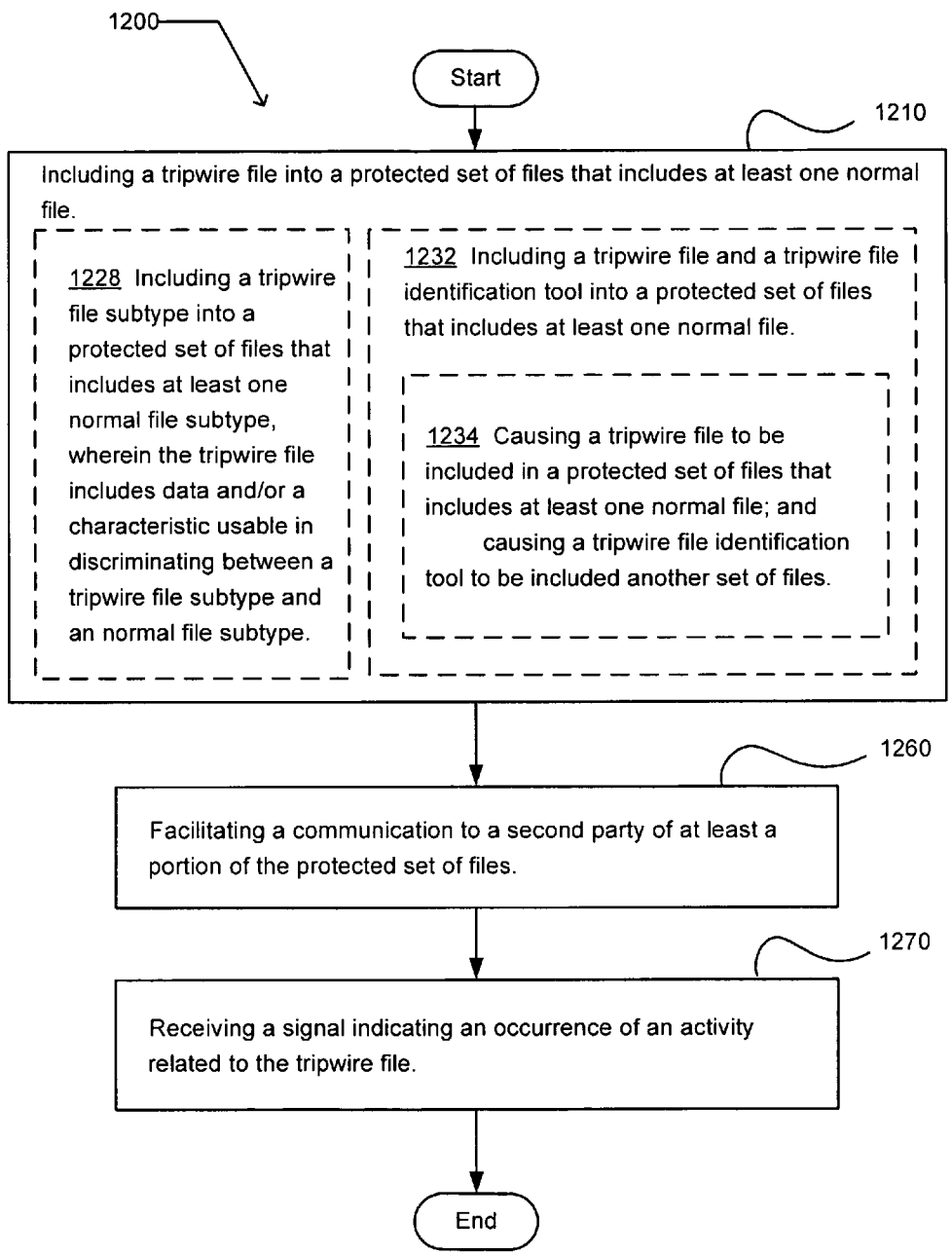

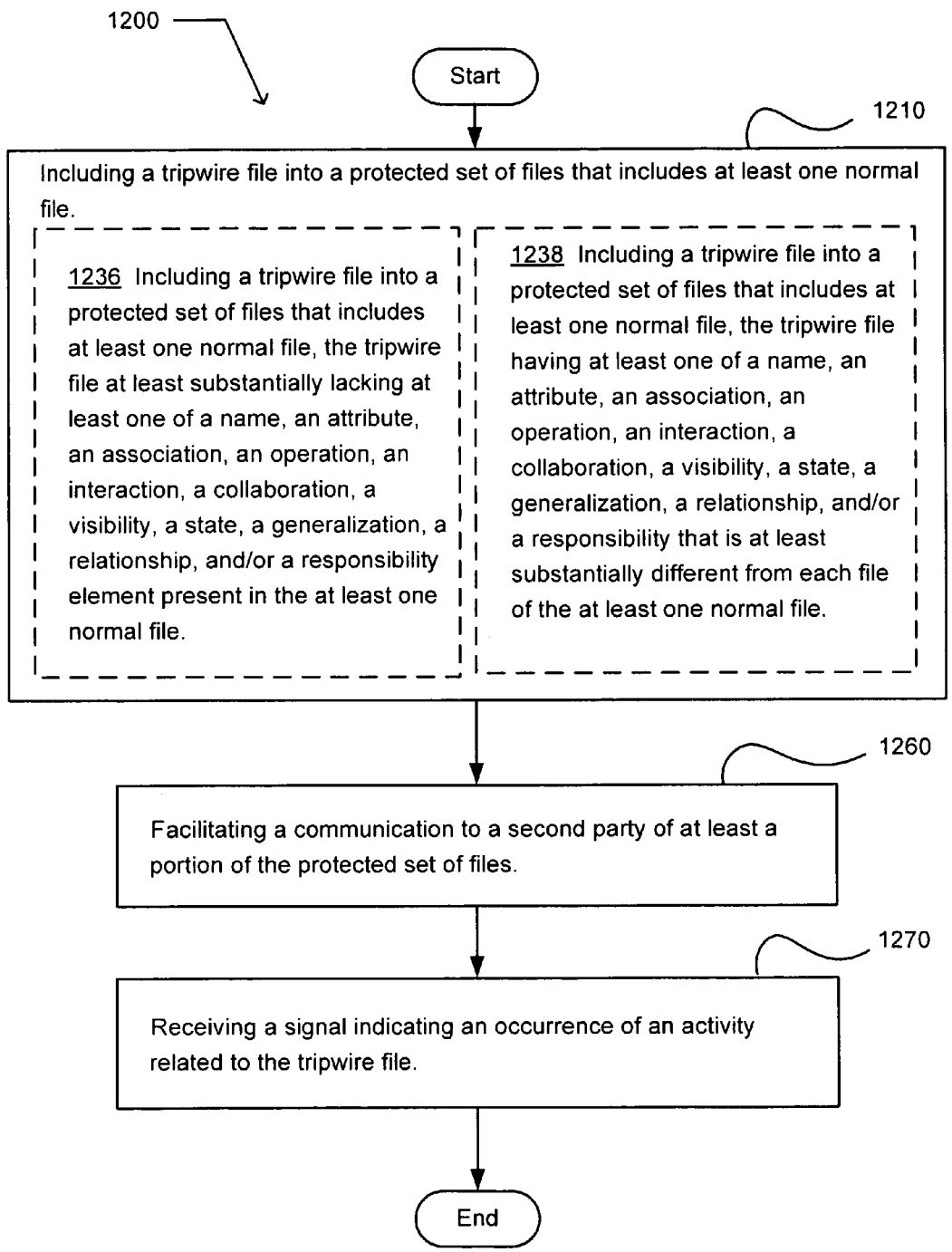

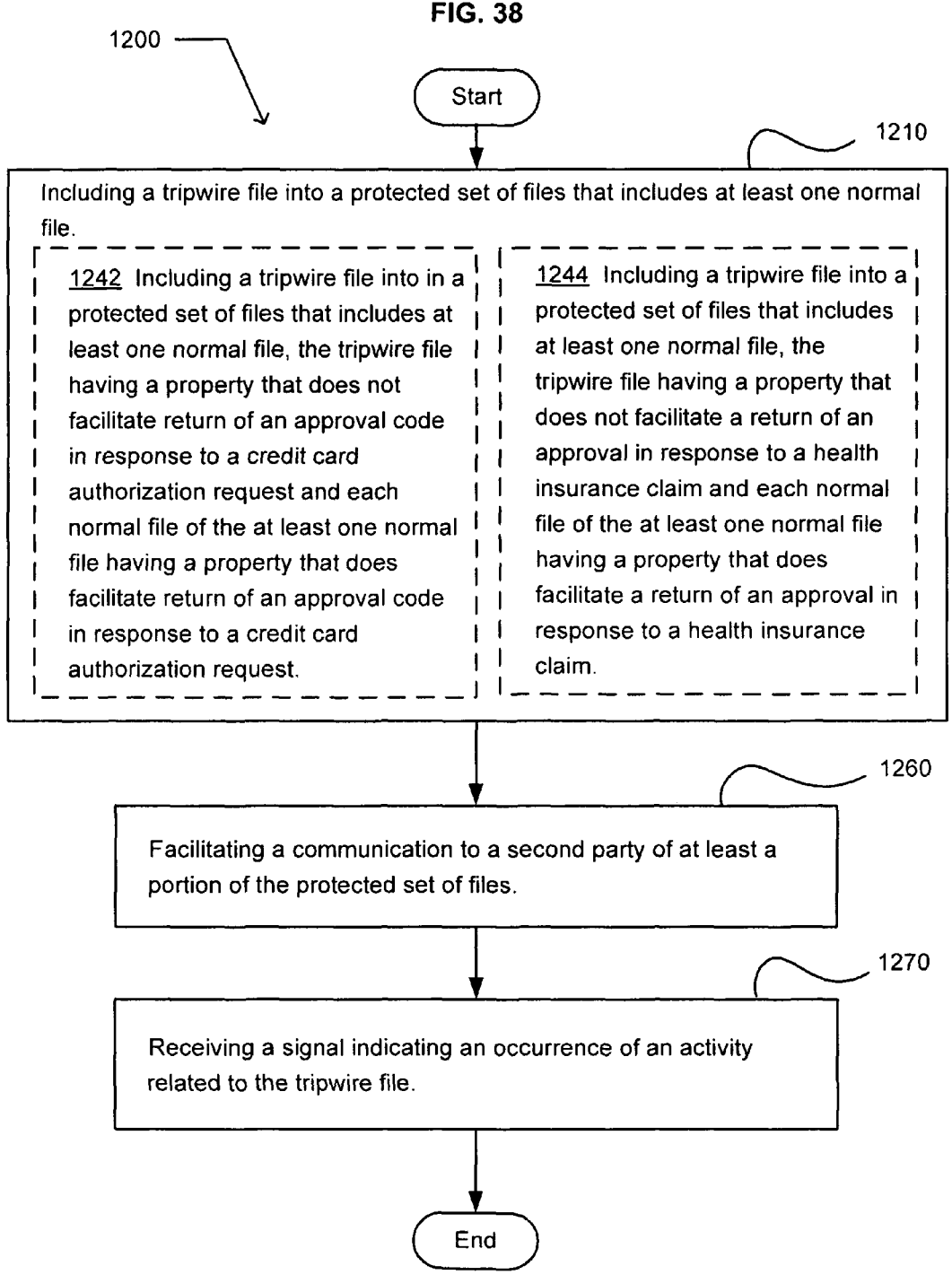

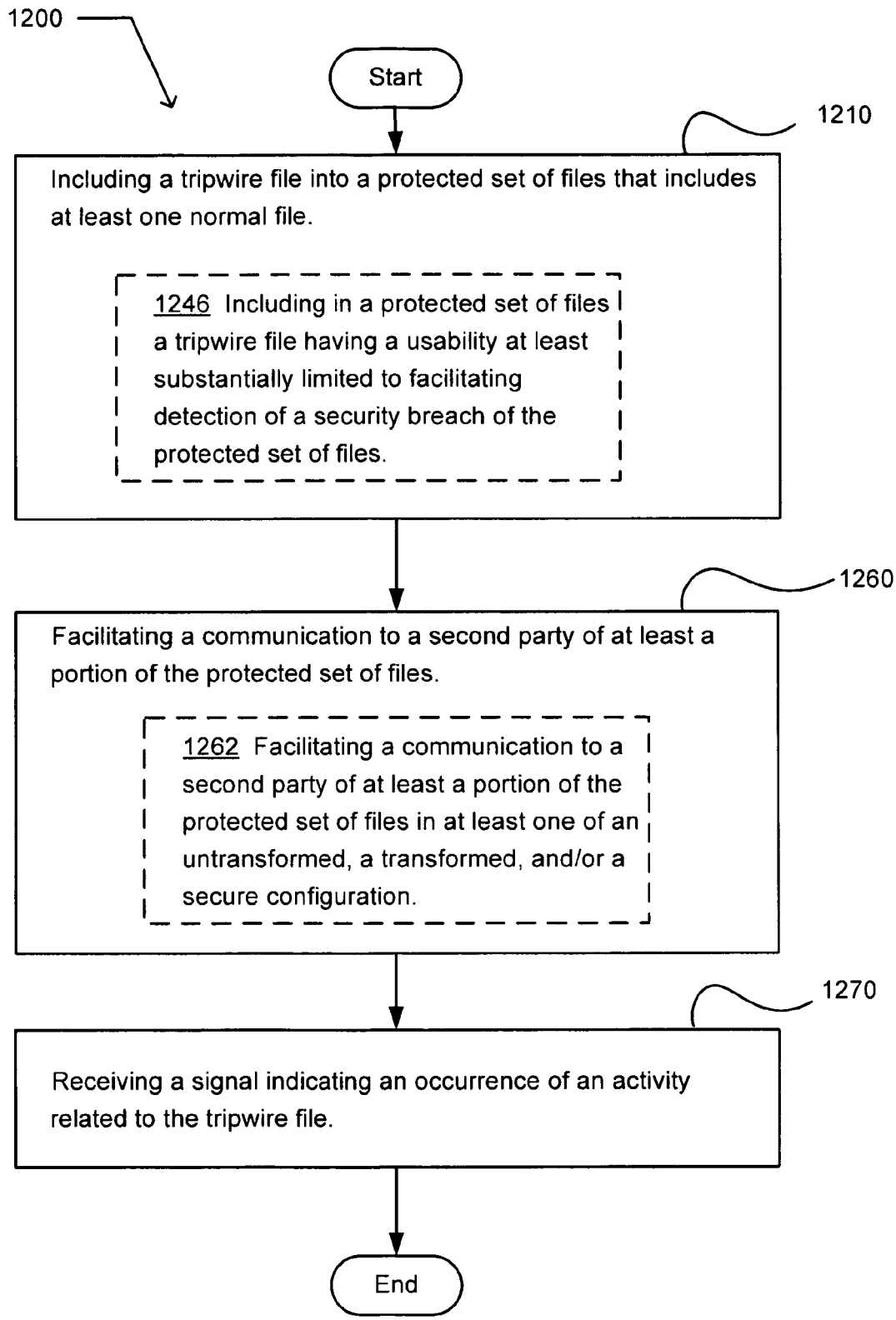

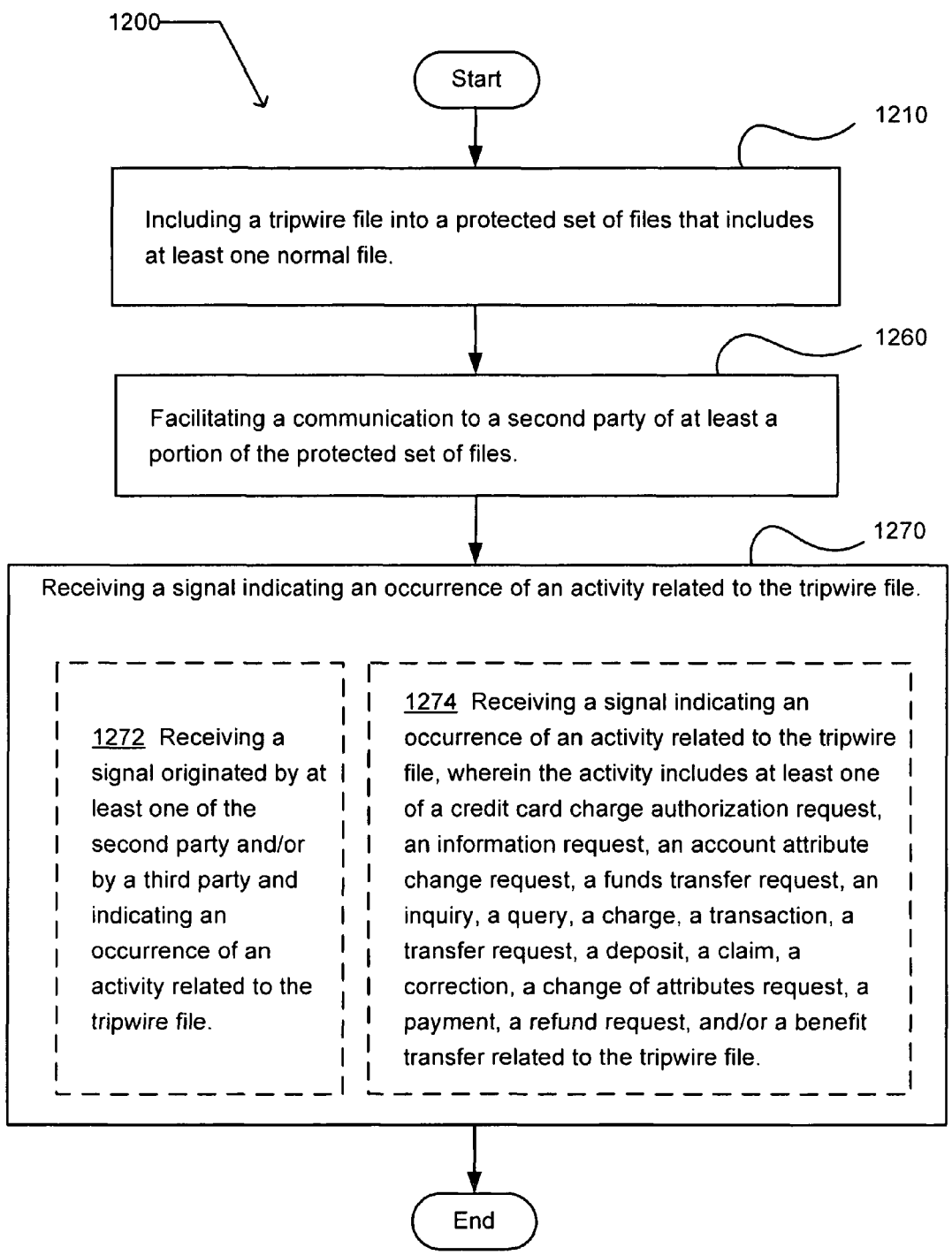

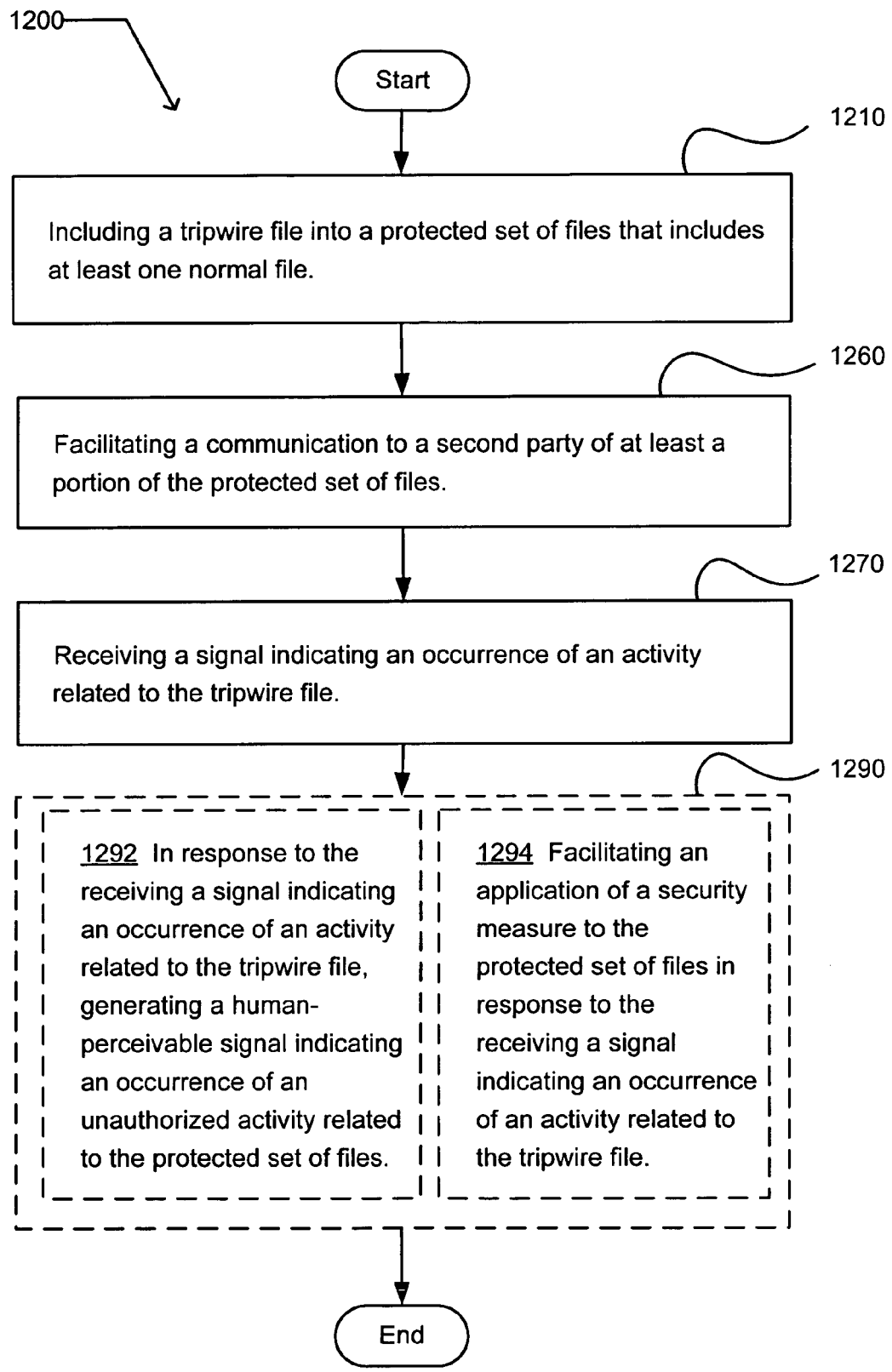

1302 A computer-readable signal-bearing medium bearing the program instructions.

1304 Program instructions operable to perform a process in a computing device, the process comprising:
 including a tripwire file into a protected set of files that includes at least one normal file;
 facilitating a communication to a second party of at least a portion of the protected set of files; and
 receiving a signal indicating an occurrence of an activity related to the tripwire file.

1306 Generating a signal indicating an occurrence of an unauthorized activity related to the protected set of files in response to the received signal indicating an occurrence of an activity related to the tripwire file.

1308 Facilitating application of a security measure to the protected set of files in response to the received signal indicating an occurrence of an activity related to the tripwire file.

1312 The computer-readable signal-bearing medium includes a computer storage medium.

1314 The computer-readable signal-bearing medium includes a communication medium.

INDICATING A SECURITY BREACH OF A PROTECTED SET OF FILES

CROSS-REFERENCE TO RELATED APPLICATIONS

The present application may be related to the following listed application(s) (the "Related Applications"):

RELATED APPLICATIONS

United States patent application entitled SIGNALING A SECURITY BREACH OF A PROTECTED SET OF FILES naming Alexander J. Cohen; Edward K. Y. Jung; Royce A. Levien; Robert W. Lord; Mark A. Malamud; William Henry Mangione-Smith; John D. Rinaldo, Jr.; Clarence T. Tegreene as inventors, U.S. application Ser. No. 11/444,963, filed May 31, 2006.

United States patent application entitled RECEIVING AN INDICATION OF A SECURTIY BREACH OF A PROTECTED SET OF FILES naming Alexander J. Cohen; Edward K. Y. Jung; Royce A. Levien; Robert W. Lord; Mark A. Malamud; William Henry Mangione-Smith; John D. Rinaldo, Jr.; Clarence T. Tegreene as inventors, U.S. application Ser. No. 11/444,979, filed May 31, 2006.

United States patent application entitled MONITORING A STATUS OF A DATABASE BY PLACING A FALSE IDENTIFIER IN THE DATABASE naming Alexander J. Cohen; Edward K. Y. Jung; Royce A. Levien; Robert W. Lord; Mark A. Malamud; William Henry Mangione-Smith; John D. Rinaldo, Jr.; Clarence T. Tegreene as inventors, U.S. application Ser. No. 11/445,485, filed May 31, 2006.

BRIEF DESCRIPTION OF THE DRAWINGS

FIG. 15 illustrates another alternative embodiment of the exemplary operational flow of FIG. 2;

FIG. 16 illustrates a further alternative embodiment of the exemplary operational flow of FIG. 2;

FIG. 17 illustrates another alternative embodiment of the exemplary operational flow of FIG. 2;

FIGS. 18A and 18B illustrates an environment in which an embodiment of the exemplary operational flow of FIG. 2 may be implemented;

FIG. 35 illustrates another embodiment of the exemplary operational flow of FIG. 33;

FIG. 36 illustrates a further embodiment of the exemplary operational flow of FIG. 33;

FIG. 37 illustrates an alternative embodiment of the exemplary operational flow of FIG. 33;

FIG. 38 illustrates another embodiment of the exemplary operational flow of FIG. 33;

FIG. 39 illustrates a further embodiment of the exemplary operational flow of FIG. 33;

FIG. 40 illustrates an alternative embodiment of the exemplary operational flow of FIG. 33;

FIG. 41 illustrates another embodiment of the exemplary operational flow of FIG. 33;

FIG. 42 illustrates a partial view of an exemplary computer program product;

DETAILED DESCRIPTION

Figure 1:
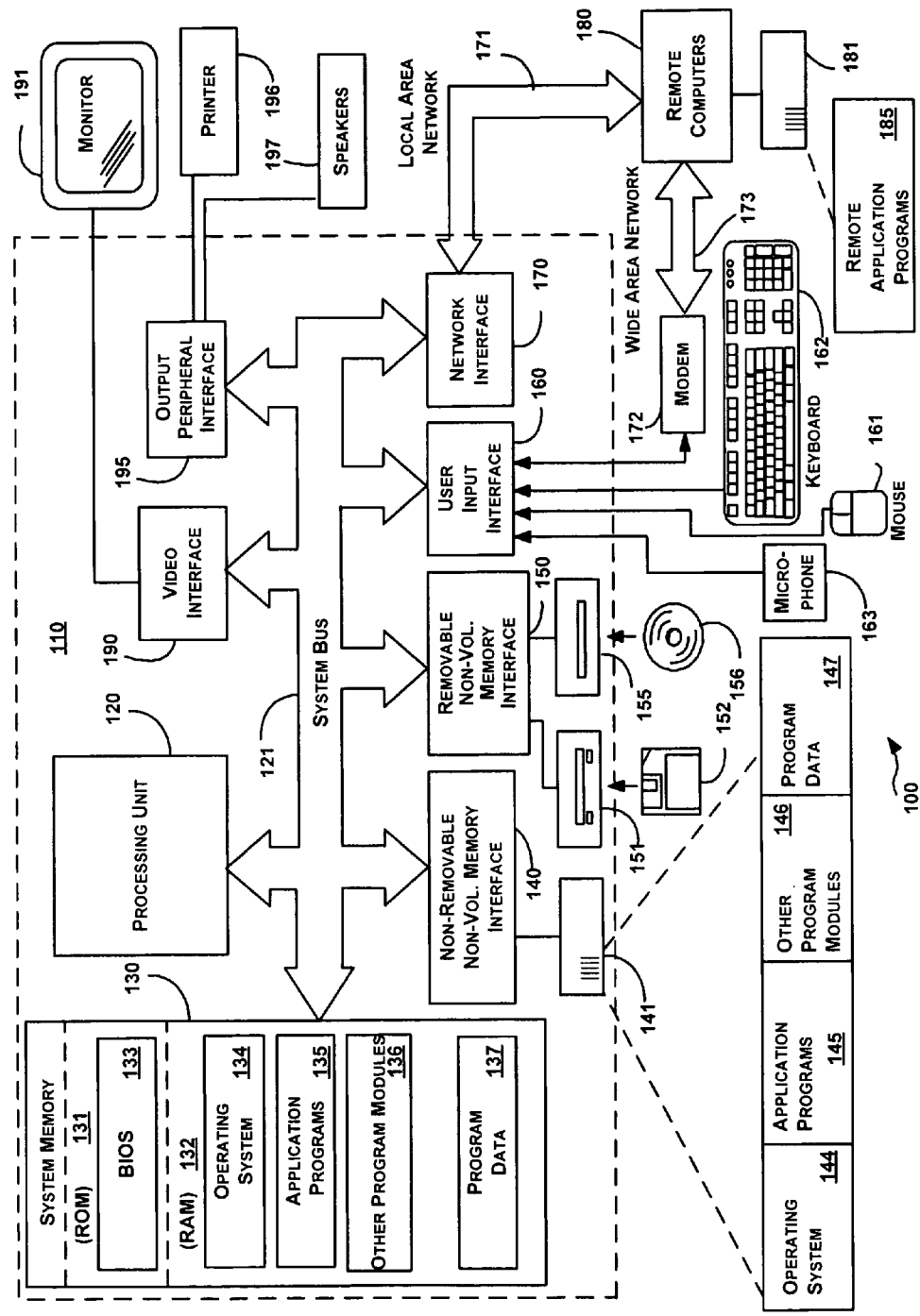
FIG. 1 illustrates an exemplary general-purpose computing system in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 illustrates an exemplary general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art. In an embodiment, an information store may include a computer storage media. In a further embodiment, an information store may include a group of digital information storage devices. In another embodiment, an information store may include a quantum memory device.

The computing device 110 may also include other removable/non-removable, volatile/nonvolatile computer storage media products. By way of example only, FIG. 1 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 1 provide storage of computer-readable instructions, data structures, program modules, and other data for the computing device 110. In FIG. 1, for example, hard disk drive 141, is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 1. The logical connections depicted in FIG. 1 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 1 illustrates remote application programs 185 as residing on computer storage medium 181. It will be appreciated that the network connections shown are exemplary and other means of establishing a communications link between the computers may be used.

FIG. 1 is intended to provide a brief, general description of an illustrative and/or suitable exemplary environment in which embodiments may be implemented. An exemplary system may include the computing system environment 100 of FIG. 1. FIG. 1 is an example of a suitable environment and is not intended to suggest any limitation as to the structure, scope of use, or functionality of an embodiment. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing device 110 of FIG. 1. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 2:
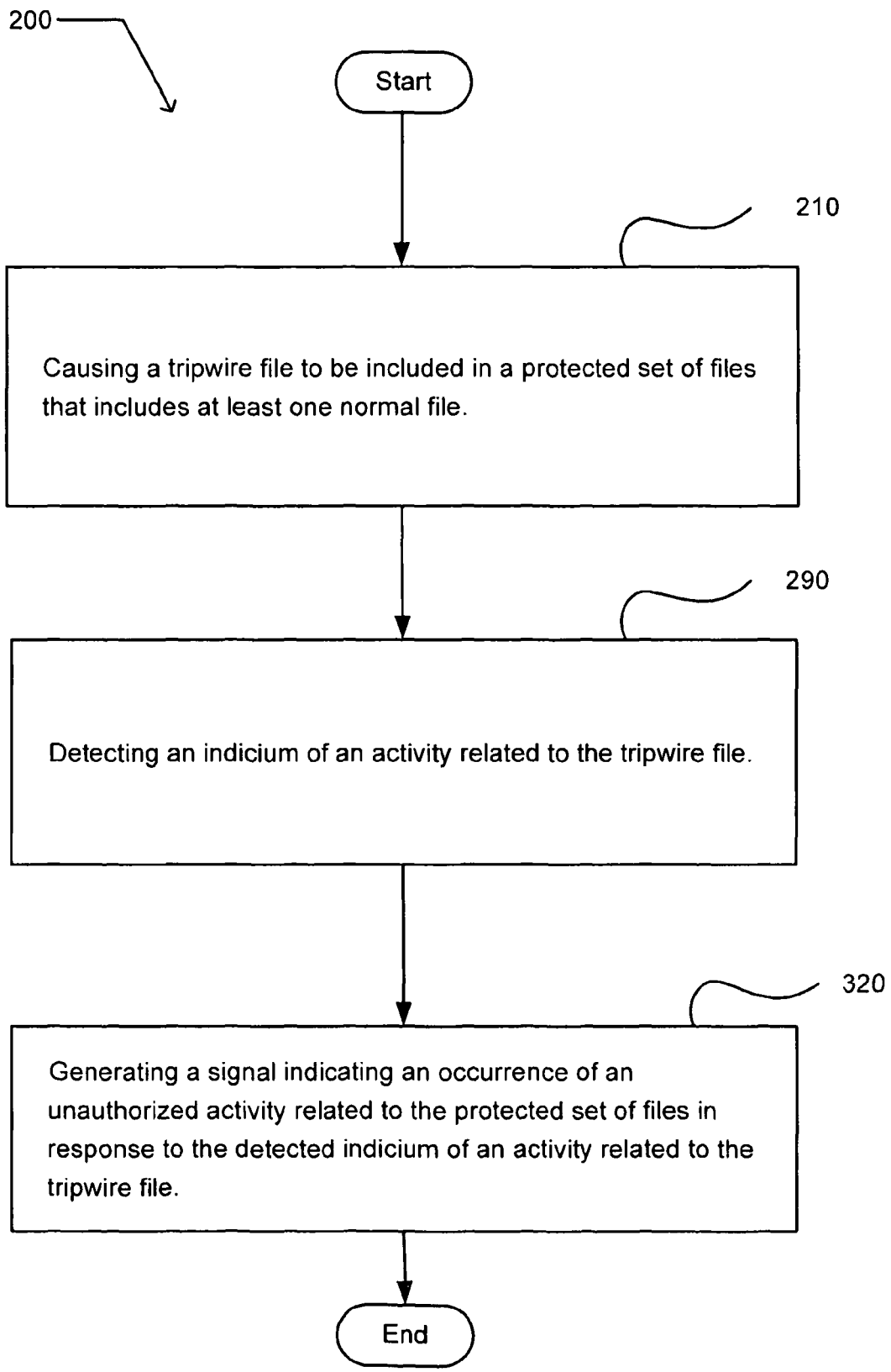
FIG. 2 illustrates an exemplary operational flow in which embodiments may be implemented.

FIG. 2 illustrates an exemplary operational flow 200 in which embodiments may be implemented. In an embodiment, the operational flow may be implemented using the computing system environment 100 of FIG. 1. After a start operation, the operational flow moves to a planting operation 210. The planting operation causes a tripwire file to be included in a protected set of files that includes at least one normal file. A discovery operation 290 detects an indicium of an activity related to the tripwire file. A warning operation 320 generates a signal indicating an occurrence of an unauthorized activity related to the protected set of files in response to the detected indicium of an activity related to the tripwire file. The operational flow then moves to a stop operation.

Figure 3:
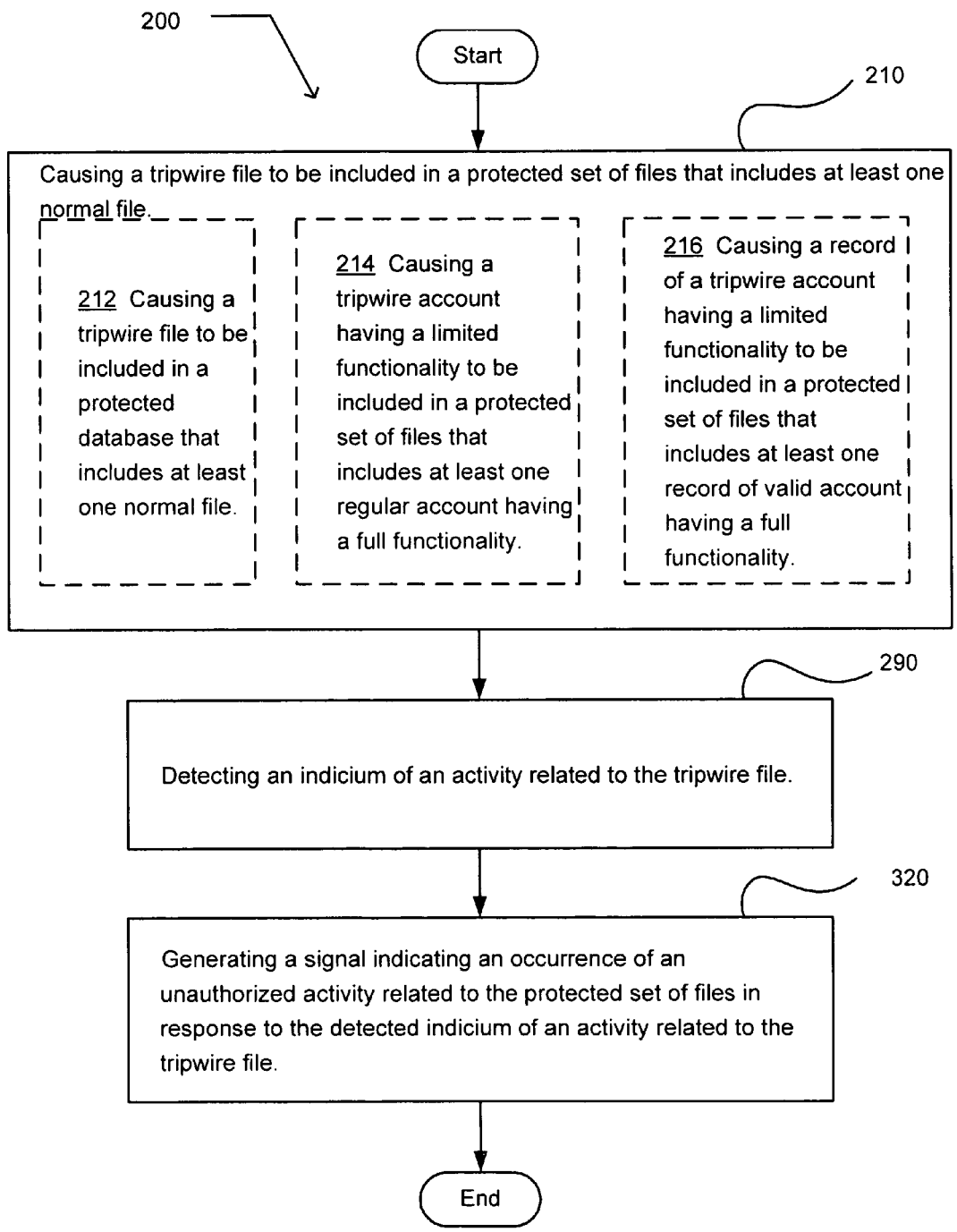
FIG. 3 illustrates an alternative embodiment of the exemplary operational flow of FIG. 2.

FIG. 3 illustrates an alternative embodiment of the exemplary operational flow 200 of FIG. 2. The planting operation 210 may include at least one additional operation. The at least one additional operation may include an operation 212, an operation 214, and/or an operation 216. The operation 212 causes a tripwire file to be included in a protected database that includes at least one normal file. The operation 214 causes a tripwire account having a limited functionality to be included in a protected set of files that includes at least one regular account having a full functionality. The operation 216 causes a record of a tripwire account having a limited functionality to be included in a protected set of files that includes at least one record of valid account having a full functionality.

Figure 4:
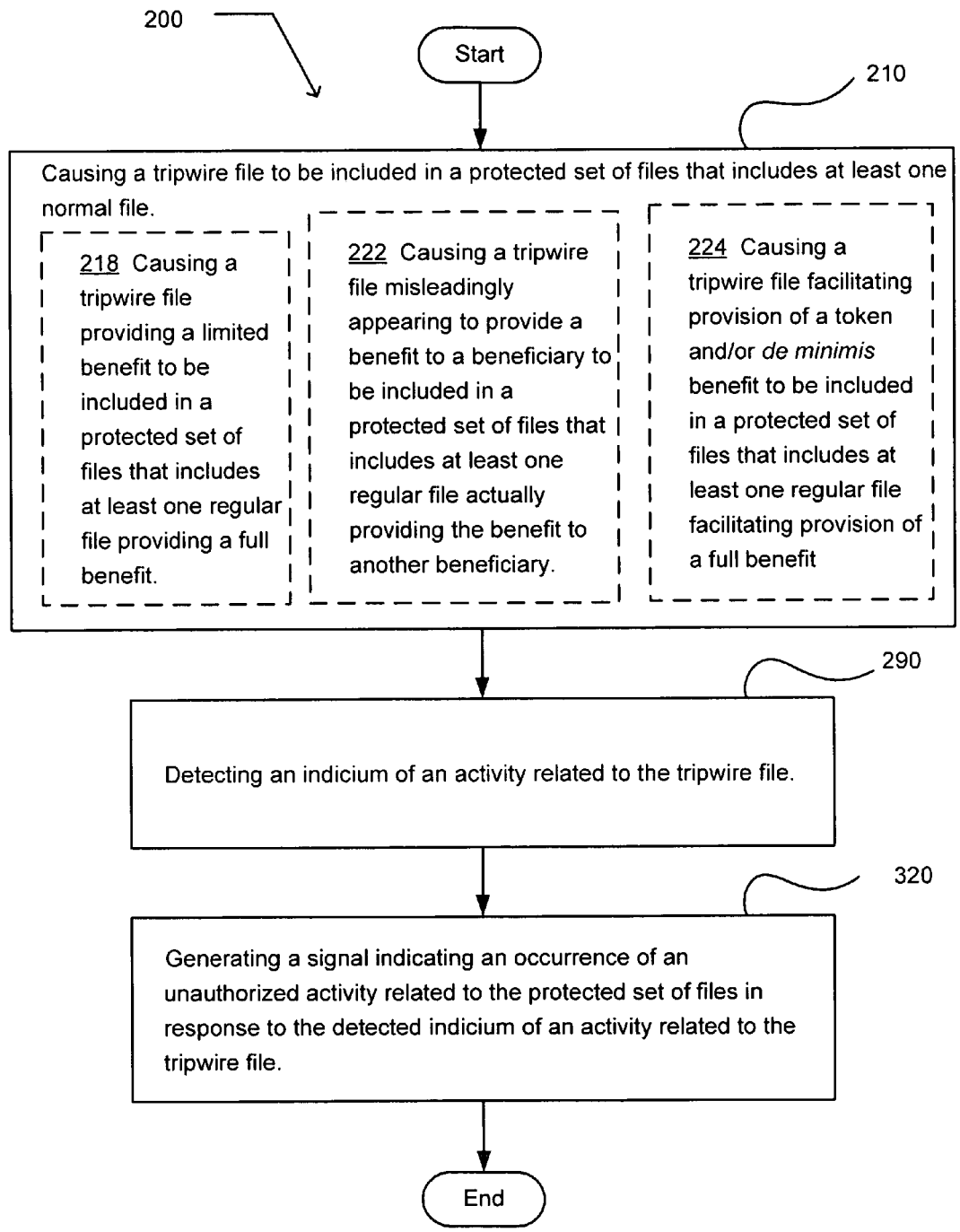
FIG. 4 illustrates another alternative embodiment of the exemplary operational flow of FIG. 2.

FIG. 4 illustrates another alternative embodiment of the exemplary operational flow 200 of FIG. 2. The planting operation 210 may include at least one additional operation. The at least one additional operation may include an operation 218, an operation 222, and/or an operation 224. The operation 218 causes a tripwire file providing a limited benefit to be included in a protected set of files that includes at least one regular file providing a full benefit. The operation 222 causes a tripwire file misleadingly appearing to provide a benefit to a beneficiary to be included in a protected set of files that includes at least one regular file actually allowing provision of the benefit to another beneficiary. The operation 224 causes a tripwire file facilitating provision of a token and/or de minimis benefit to be included in a protected set of files that includes at least one regular file facilitating provision of a full benefit.

Figure 5:
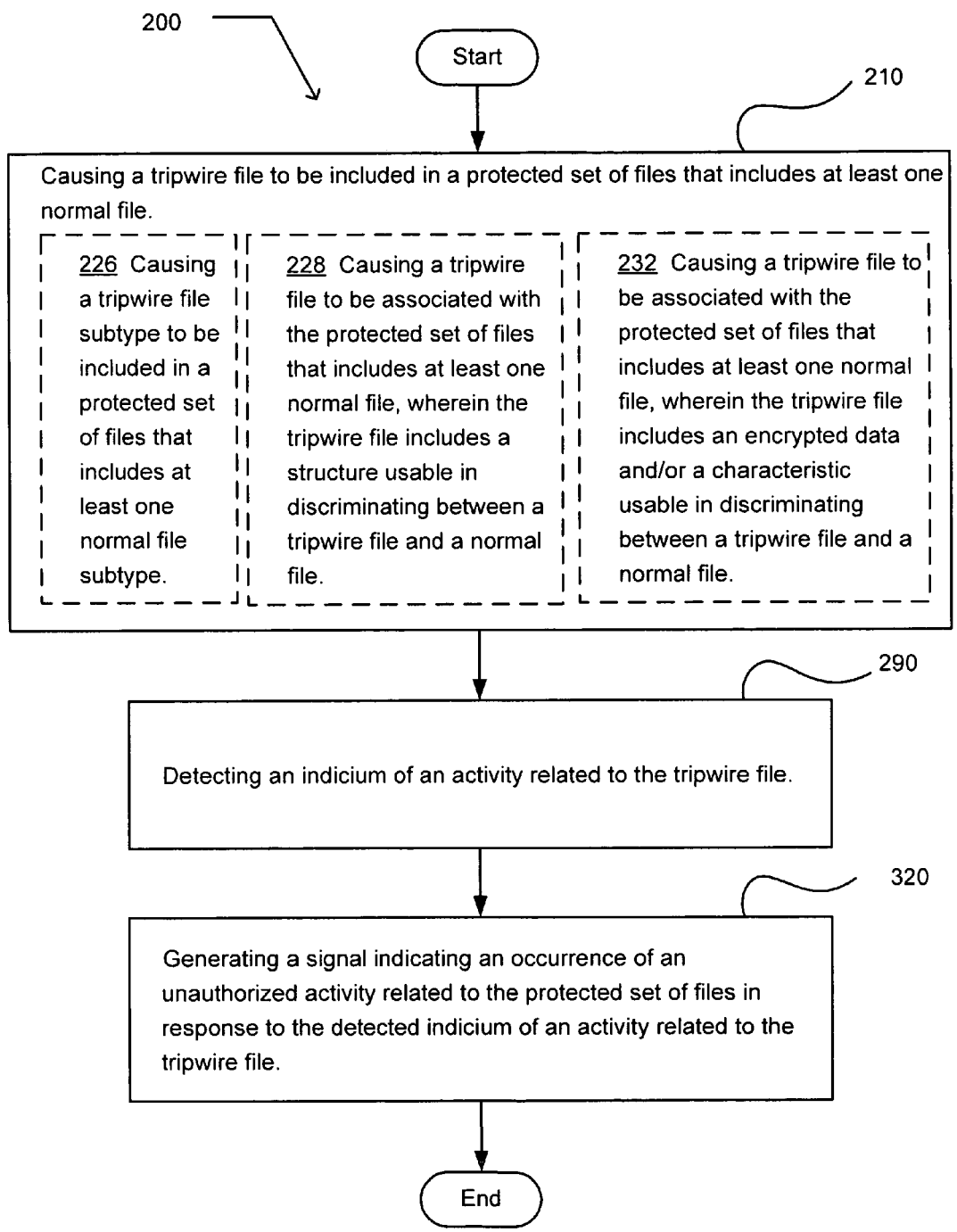
FIG. 5 illustrates a further alternative embodiment of the exemplary operational flow of FIG. 2.

FIG. 5 illustrates a further alternative embodiment of the exemplary operational flow 200 of FIG. 2. The planting operation 210 may include at least one additional operation. The at least one additional operation may include an operation 226, an operation 228, and/or an operation 232. The operation 226 causes a tripwire file subtype to be included in a protected set of files that includes at least one normal file subtype. The operation 228 causes a tripwire file to be associated with the protected set of files that includes at least one normal file. The tripwire file includes a structure usable in discriminating between a tripwire file and a normal file. The operation 232 causes a tripwire file to be associated with the protected set of files that includes at least one normal file. The tripwire file includes an encrypted data and/or a characteristic usable in discriminating between a tripwire file and a normal file.

Figure 6:
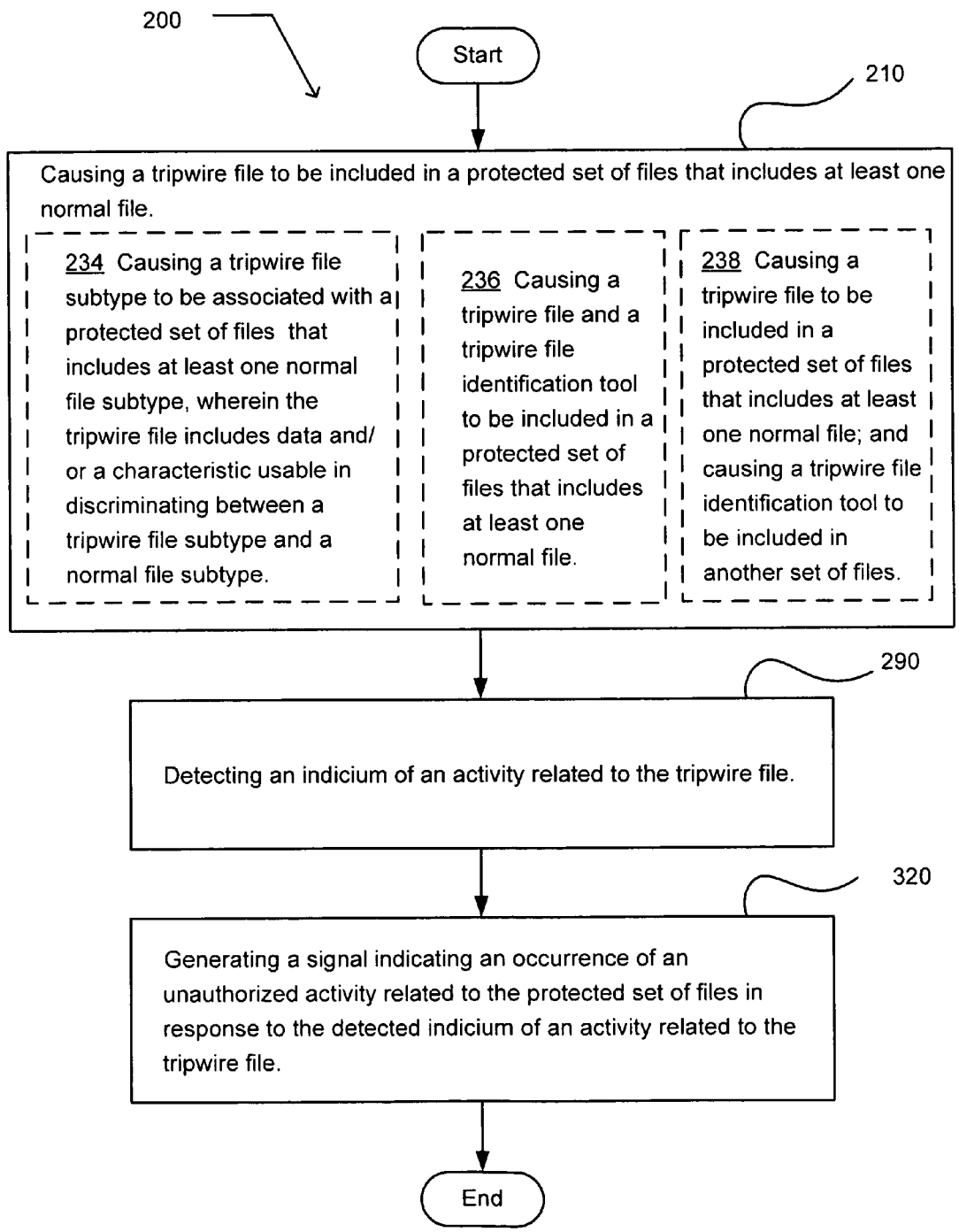
FIG. 6 illustrates another alternative embodiment of the exemplary operational flow of FIG. 2.

FIG. 6 illustrates another alternative embodiment of the exemplary operational flow 200 of FIG. 2. The planting operation 210 may include at least one additional operation. The at least one additional operation may include an operation 234, an operation 236, and/or an operation 238. The operation 234 causes a tripwire file subtype to be associated with a protected set of files that includes at least one normal file subtype. The tripwire file includes data and/or a characteristic usable in discriminating between a tripwire file subtype and a normal file subtype. The operation 236 causes a tripwire file and a tripwire file identification tool to be included in a protected set of files that includes at least one normal file. The operation 238 causes a tripwire file to be included in a protected set of files that includes at least one normal file. The operation 238 also causes a tripwire file identification tool to be included another set of files. The tripwire file identification tool may include any tool useful in distinguishing between a normal file and a tripwire file. For example, the tripwire file identification tool may indicate that a tripwire file may be identified by dividing an account number by a digital representation of the account name, and if the result equals a known or predicted value, or range of values for tripwire accounts. Alternatively, a similar process may be used to identify non-tripwire accounts. By way of further example, a tripwire file identification tool may include account data and/or information within the tripwire account that indicates its character as a tripwire account. The tripwire file identification tool may be untransformed or it may transformed. For example, the tripwire file identification tool may be hashed. The tripwire file identification tool may be encoded, and/or encrypted.

Figure 7:
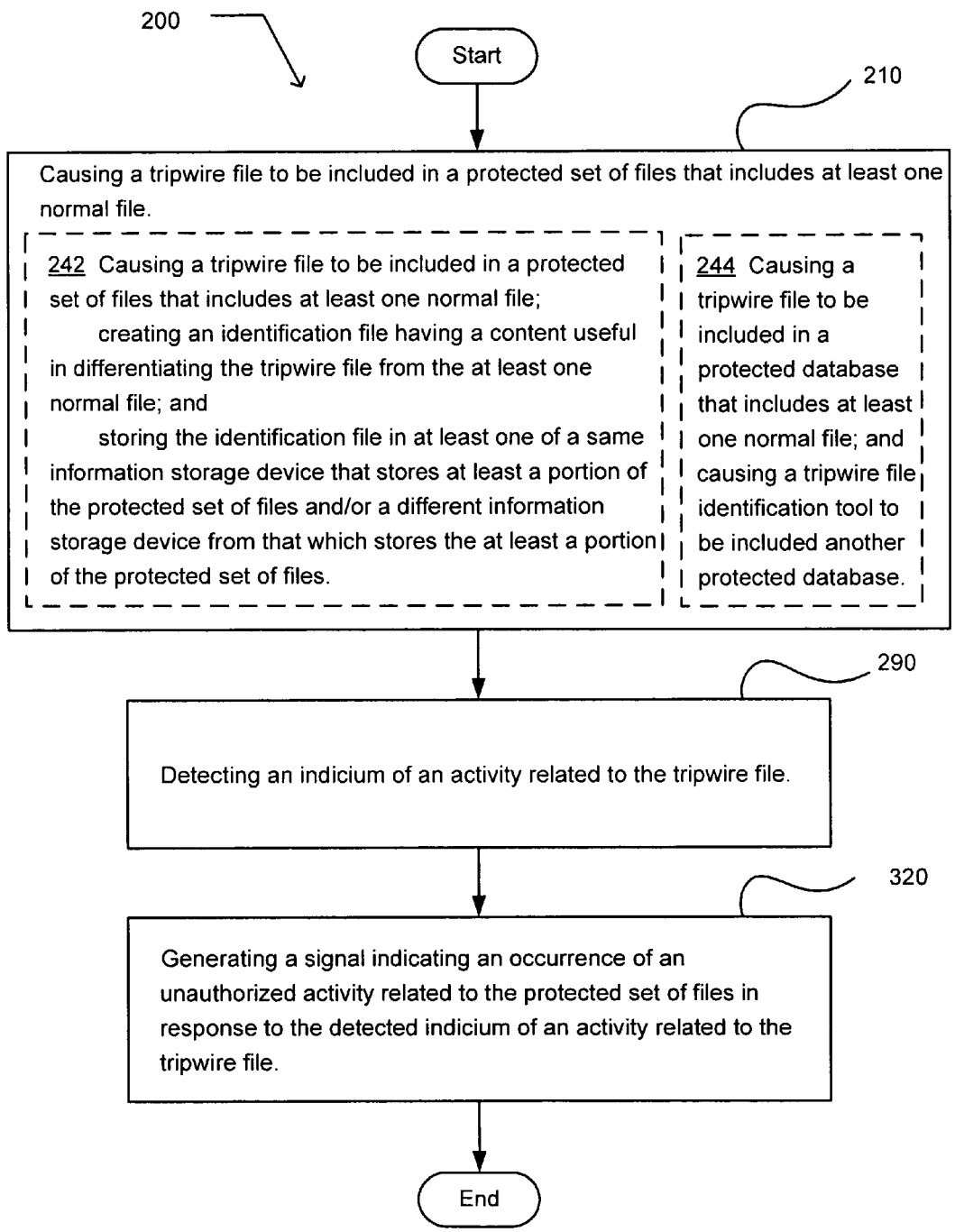
FIG. 7 illustrates an alternative embodiment of the exemplary operational flow of FIG. 2.

FIG. 7 illustrates an alternative embodiment of the exemplary operational flow 200 of FIG. 2. The planting operation 210 may include at least one additional operation. The at least one additional operation may include an operation 242, and/or an operation 244. The operation 242 causes a tripwire file to be included in a protected set of files that includes at least one normal file. The operation 242 also creates an identification file having a content useful in differentiating the tripwire file from the at least one normal file. The operation 242 further stores the identification file in at least one of a same information storage device that stores at least a portion of the protected set of files and/or a different information storage device from that which stores the at least a portion of the protected set of files. The operation 244 causes a tripwire file to be included in a protected database that includes at least one normal file. The operation 248 also causes a tripwire file identification tool to be included in another protected database.

Figure 8:
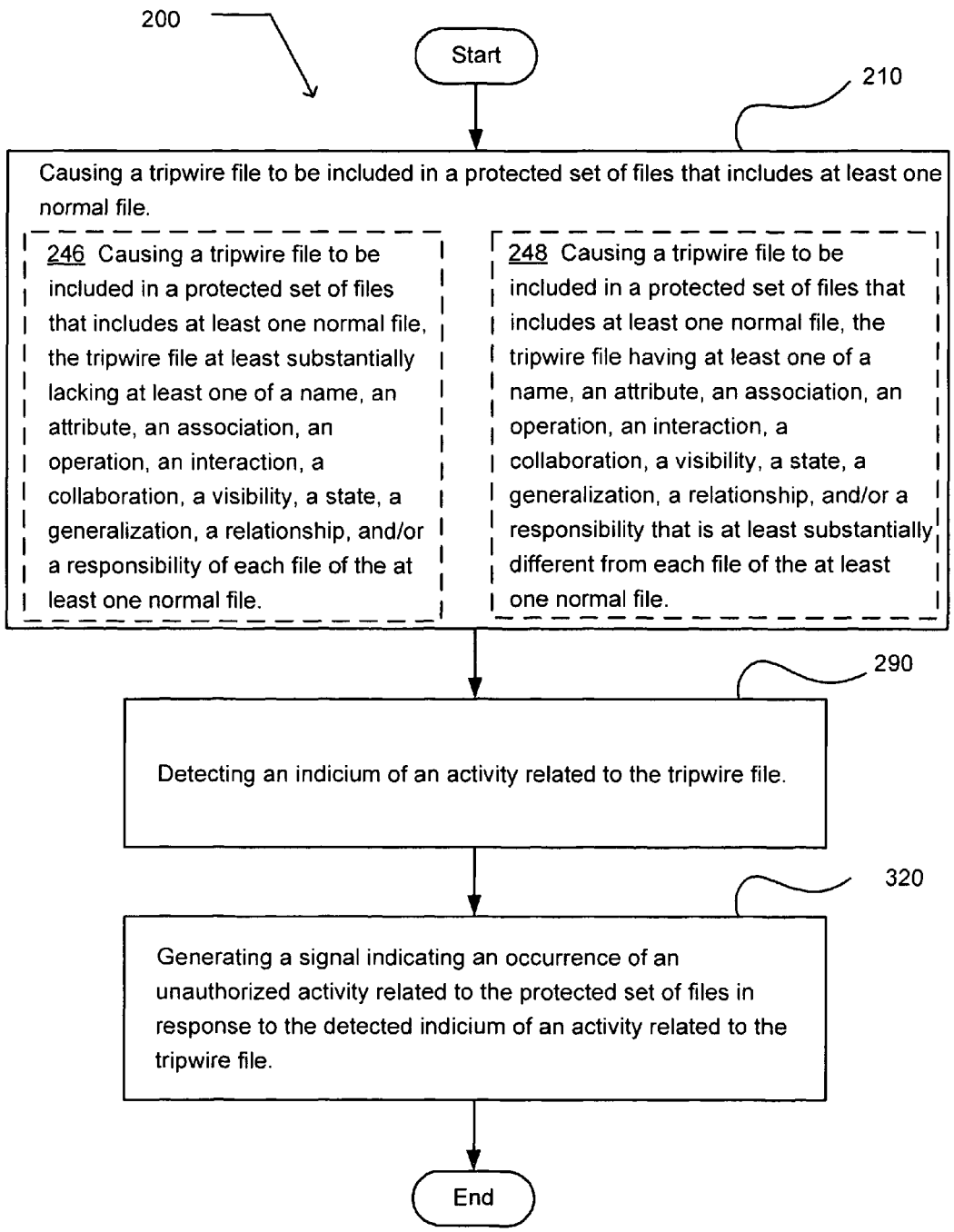
FIG. 8 illustrates another alternative embodiment of the exemplary operational flow of FIG. 2.

FIG. 8 illustrates another alternative embodiment of the exemplary operational flow 200 of FIG. 2. The planting operation 210 may include at least one additional operation. The at least one additional operation may include an operation 246, and/or an operation 248. The operation 246 causes a tripwire file to be included in a protected set of files that includes at least one normal file. The tripwire file is at least substantially lacking at least one of a name, an attribute, an association, an operation, an interaction, a collaboration, a visibility, a state, a generalization, a relationship, and/or a responsibility of each file of the at least one normal file. The operation 248 causes a tripwire file to be included in a protected set of files that includes at least one normal file. The tripwire file includes at least one of a name, an attribute, an association, an operation, an interaction, a collaboration, a visibility, a state, a generalization, a relationship, and/or a responsibility that is at least substantially different from each file of the at least one normal file.

Figure 9:
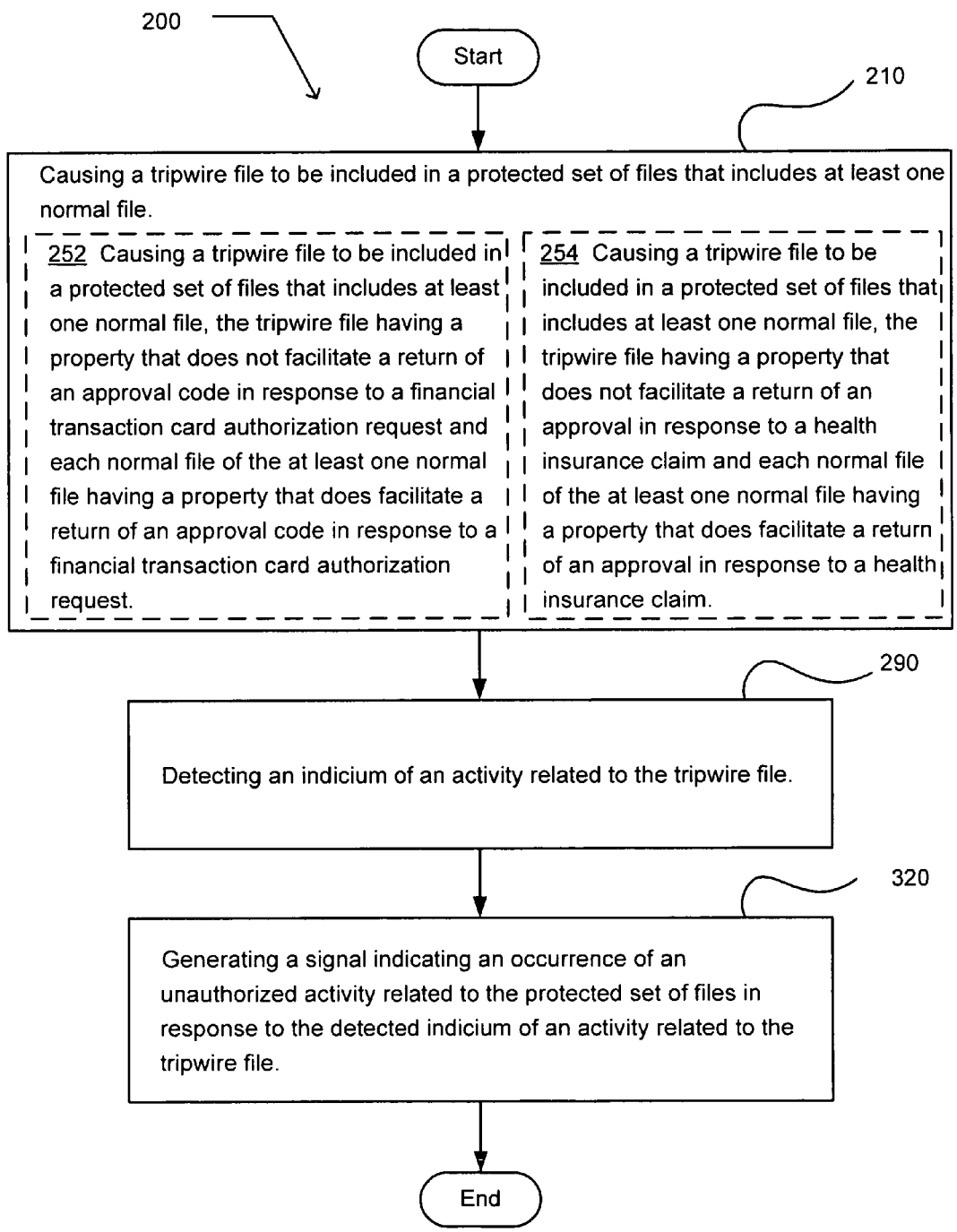
FIG. 9 illustrates a further alternative embodiment of the exemplary operational flow of FIG. 2.

FIG. 9 illustrates a further alternative embodiment of the exemplary operational flow 200 of FIG. 2. The planting operation 210 may include at least one additional operation. The at least one additional operation may include an operation 252, and/or an operation 254. The operation 252 causes a tripwire file to be included in a protected set of files that includes at least one normal file. The tripwire file has a property that does not facilitate a return of an approval code in response to a financial transaction card authorization request. Each normal file of the at least one normal file has a property that does facilitate a return of an approval code in response to a financial transaction card authorization request. The operation 254 causes a tripwire file to be included in a protected set of files that includes at least one normal file. The tripwire file has a property that does not facilitate a return of an approval in response to a health insurance claim, and each normal file of the at least one normal file has a property that does facilitate a return of an approval in response to a health insurance claim.

Figure 10:
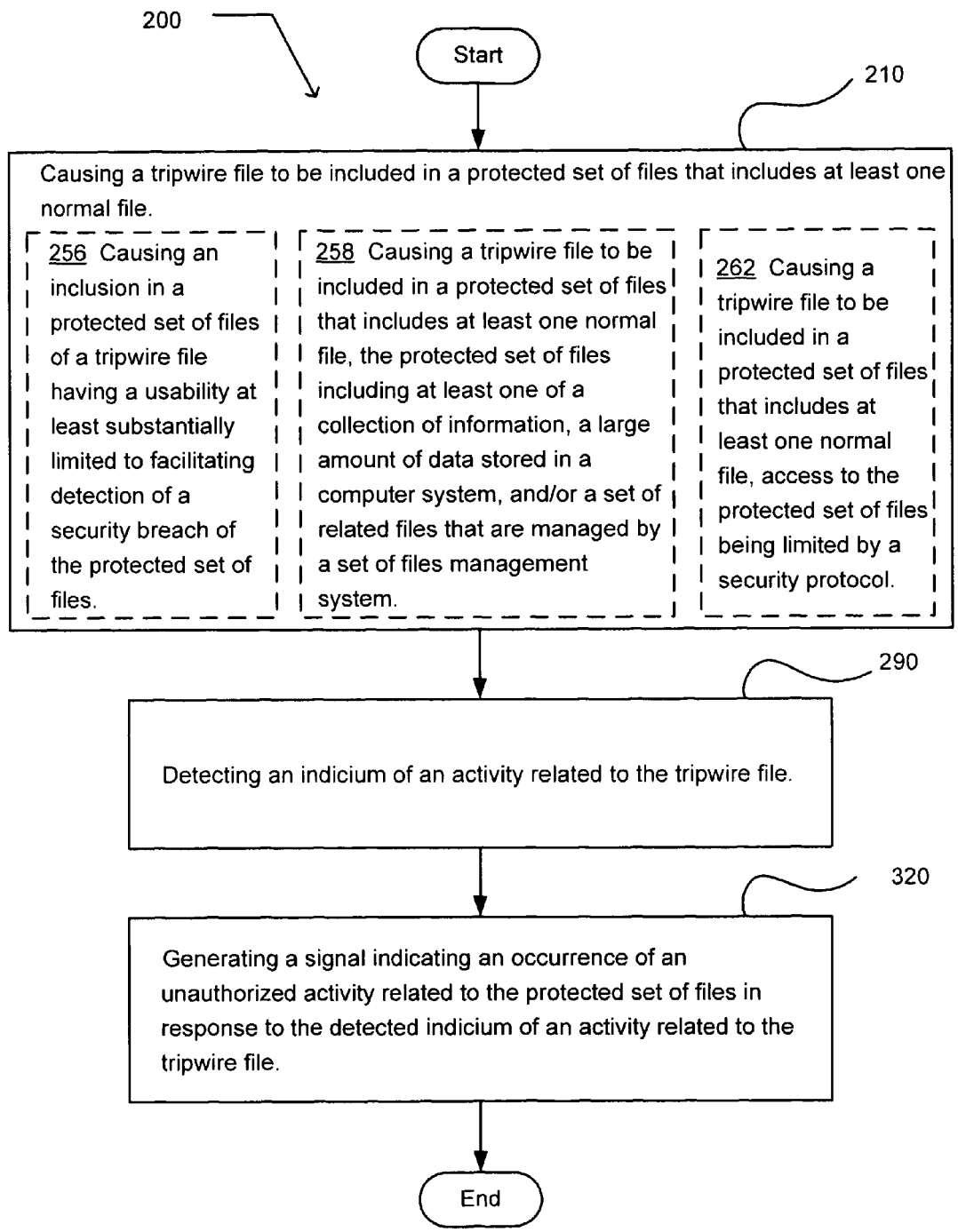
FIG. 10 illustrates another alternative embodiment of the exemplary operational flow of FIG. 2.

FIG. 10 illustrates another alternative embodiment of the exemplary operational flow 200 of FIG. 2. The planting operation 210 may include at least one additional operation. The at least one additional operation may include an operation 256, an operation 258, and/or an operation 262. The operation 256 causes an inclusion in a protected set of files of a tripwire file having a usability at least substantially limited to facilitating detection of a security breach of the protected set of files. The operation 258 causes a tripwire file to be included in a protected set of files that includes at least one normal file. The protected set of files includes at least one of a collection of information, a large amount of data stored in a computer system, and/or a set of related files that are managed by a set of files management system. The operation 262 causes a tripwire file to be included in a protected set of files that includes at least one normal file, access to the protected set of files being limited by a security protocol.

Figure 11:
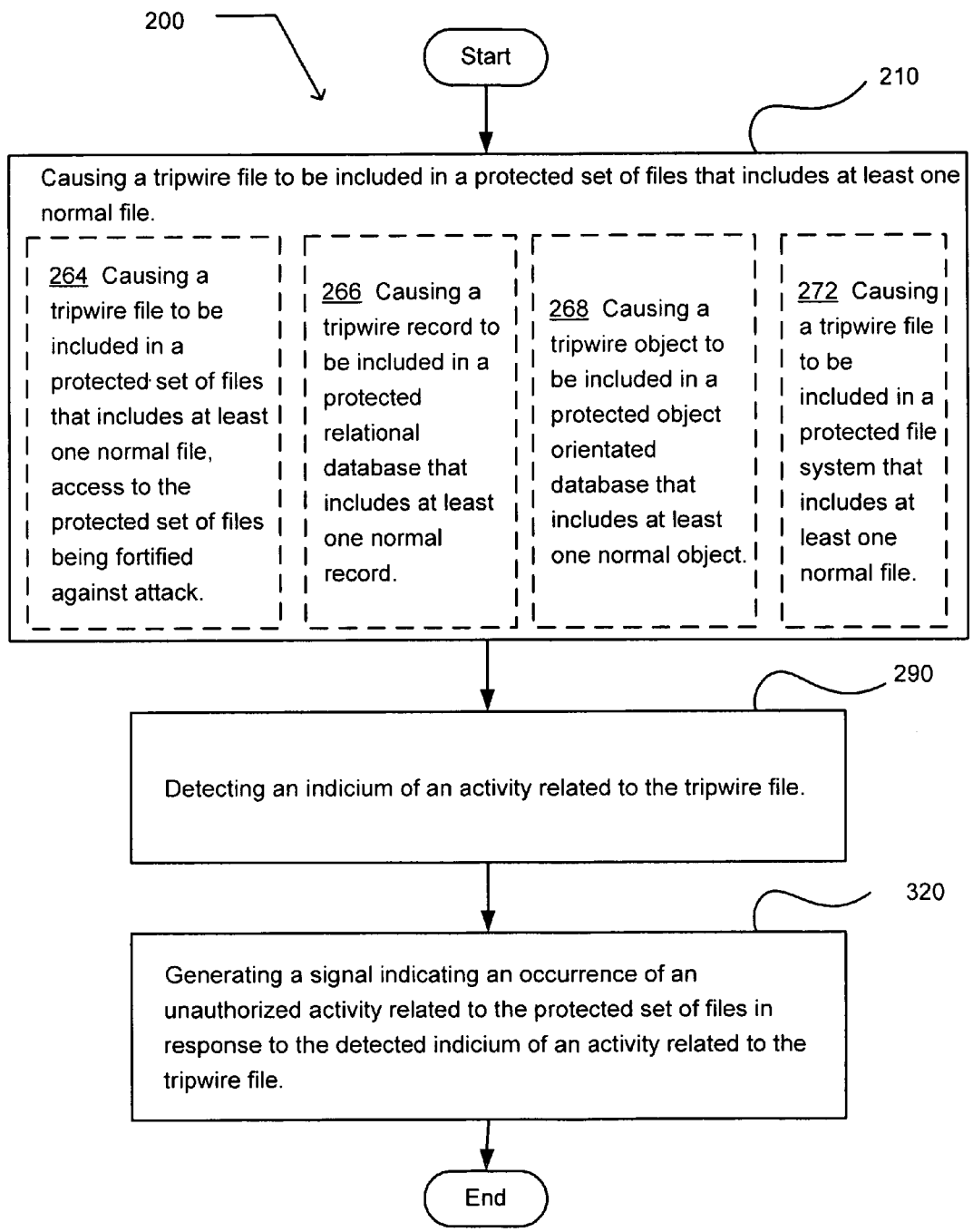
FIG. 11 illustrates another alternative embodiment of the exemplary operational flow of FIG. 2.

FIG. 11 illustrates another alternative embodiment of the exemplary operational flow 200 of FIG. 2. The planting operation 210 may include at least one additional operation. The at least one additional operation may include an operation 264, an operation 266, an operation 268, and/or an operation 272. The operation 264 causes a tripwire file to be included in a protected set of files that includes at least one normal file. Access to the protected set of files is fortified against attack. The operation 266 causes a tripwire record to be included in a protected relational database that includes at least one normal record. The operation 268 causes a tripwire object to be included in a protected object orientated database that includes at least one normal object. The operation 272 causes a tripwire file to be included in a protected file system that includes at least one normal file.

Figure 12:
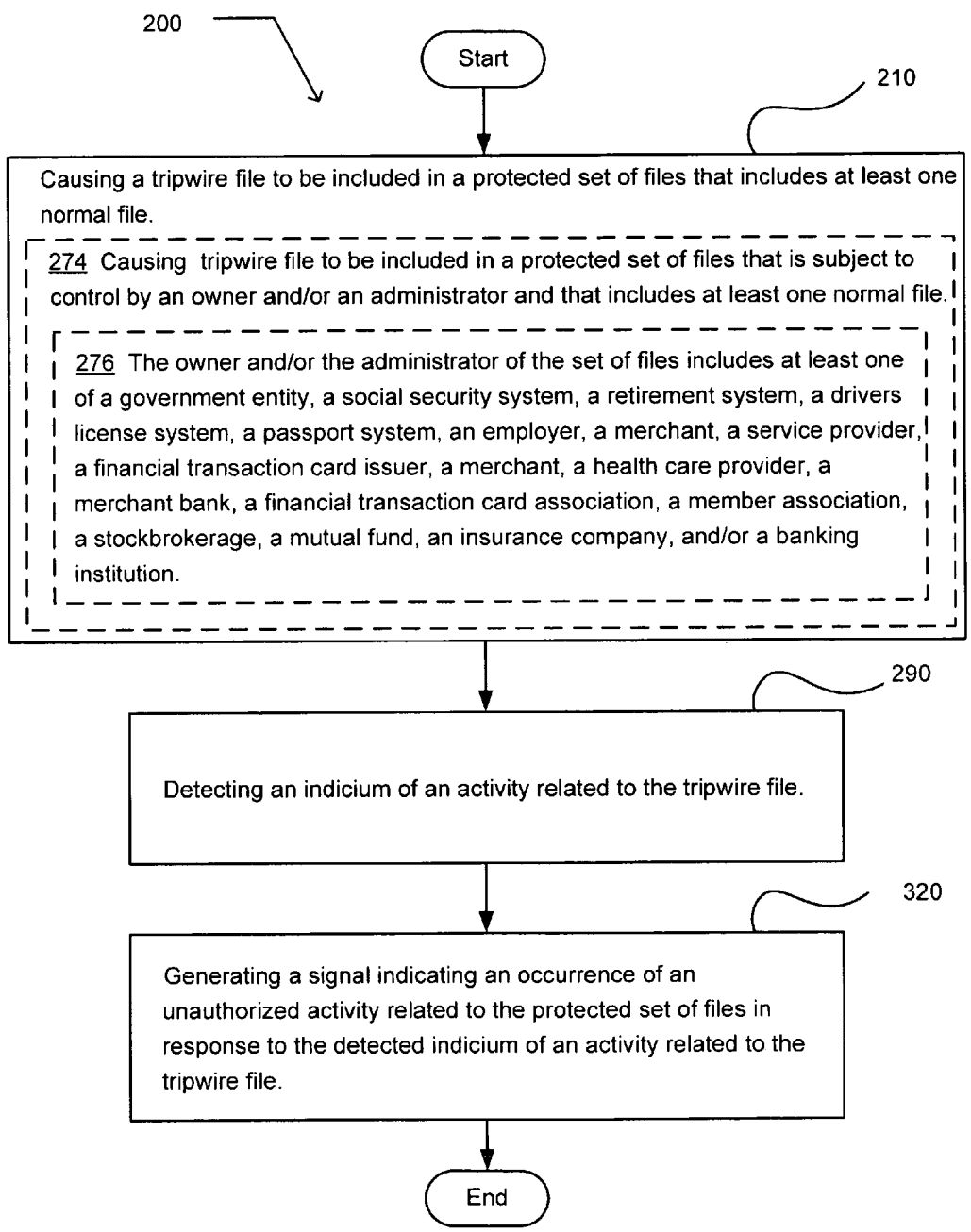
FIG. 12 illustrates a further alternative embodiment of the exemplary operational flow of FIG. 2.

FIG. 12 illustrates a further alternative embodiment of the exemplary operational flow 200 of FIG. 2. The planting operation 210 may include at least one additional operation. The at least one additional operation may include an operation 274. The operation 274 causes a tripwire file to be included in a protected set of files that is subject to control by an owner and/or an administrator and that includes at least one normal file. The operation 274 may include at least one additional operation, such as an operation 276. At the operation 276 the owner and/or the administrator of the set of files includes at least one of a government entity, a social security system, a retirement system, a drivers license system, a passport system, an employer, a merchant, a service provider, a financial transaction card issuer, a merchant, a health care provider, a merchant bank, a financial transaction card association, a member association, a stockbrokerage, a mutual fund, an insurance company, and/or a banking institution.

Figure 13:
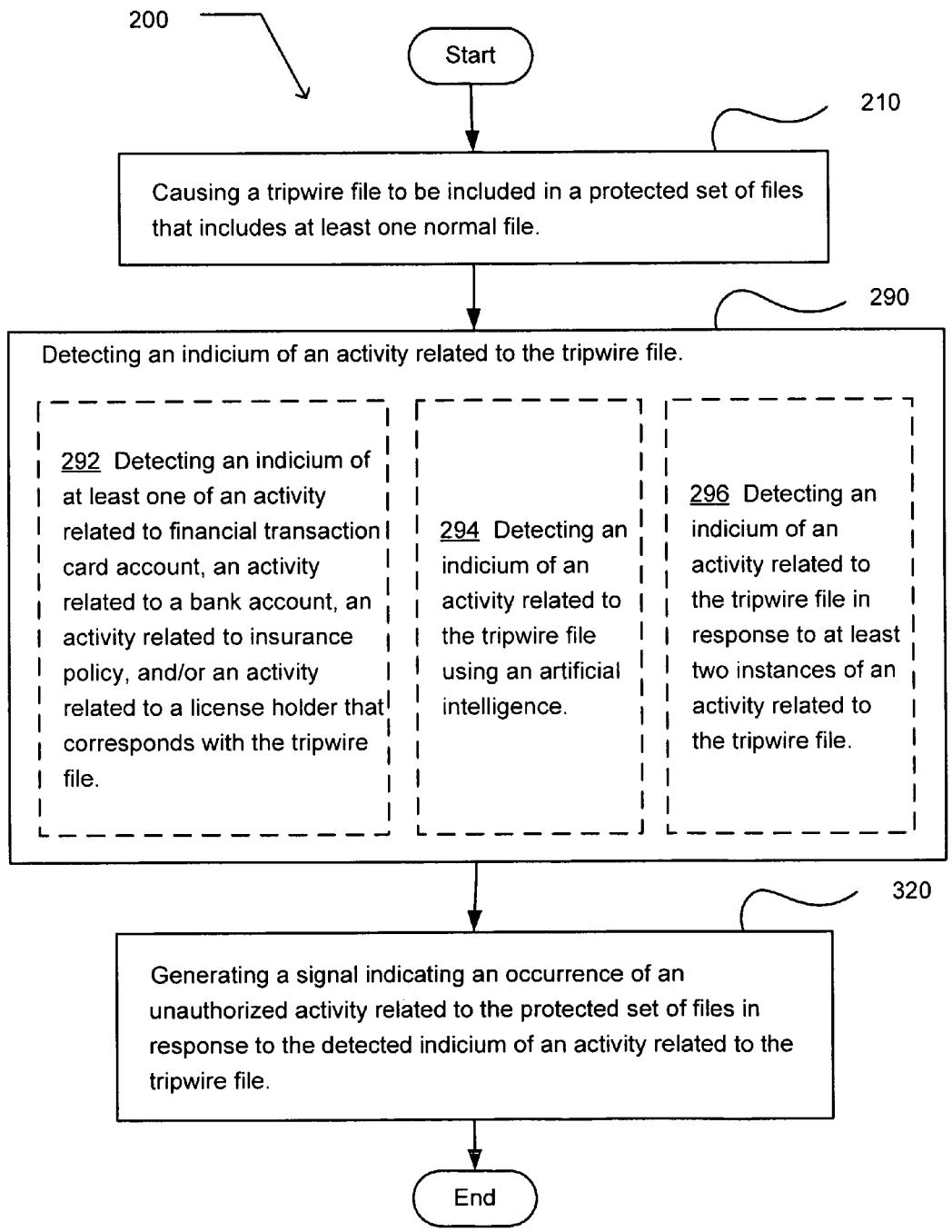
FIG. 13 illustrates an alternative embodiment of the exemplary operational flow of FIG. 2.

FIG. 13 illustrates an alternative embodiment of the exemplary operational flow 200 of FIG. 2. The discovery operation 290 may include at least one additional operation. The at least one additional operation may include an operation 292, an operation 294, and/or an operation 296. The operation 292 detects an indicium of at least one of an activity related to financial transaction card account, an activity related to a bank account, an activity related to insurance policy, and/or an activity related to a license holder that corresponds with the tripwire file. The operation 294 detects an indicium of an activity related to the tripwire file using an artificial intelligence. The operation 296 detects an indicium of an activity related to the tripwire file in response to at least two instances of an activity related to the tripwire file.

Figure 14:
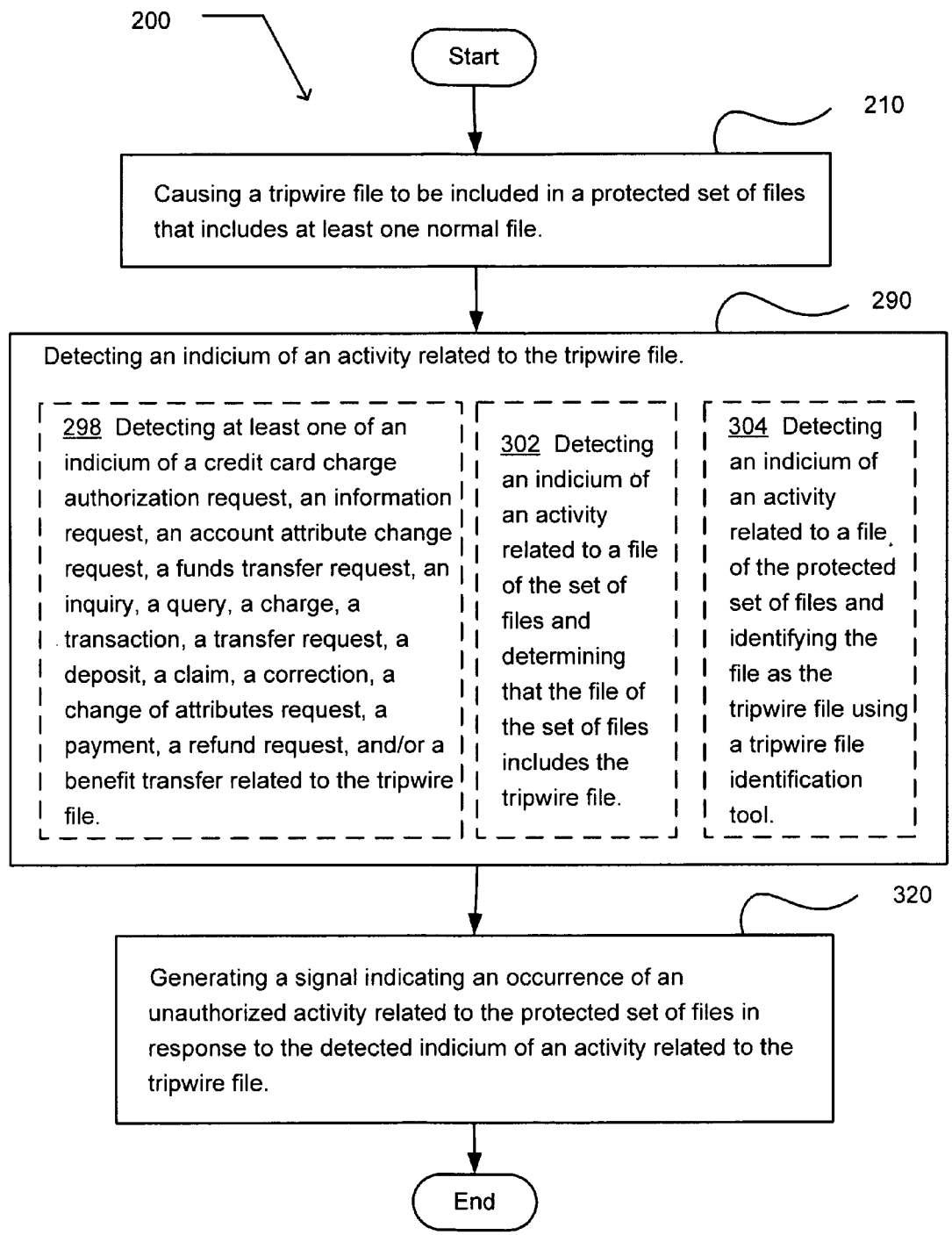
FIG. 14 illustrates another alternative embodiment of the exemplary operational flow of FIG. 2.

FIG. 14 illustrates another alternative embodiment of the exemplary operational flow 200 of FIG. 2. The discovery operation 290 may include at least one additional operation. The at least one additional operation may include an operation 298, an operation 302, and/or an operation 304. The operation 298 detects at least one of an indicium of a credit card charge authorization request, an information request, an account attribute change request, a funds transfer request, an inquiry, a query, a charge, a transaction, a transfer request, a deposit, a claim, a correction, a change of attributes request, a payment, a refund request, and/or a benefit transfer related to the tripwire file. The operation 302 detects an indicium of an activity related to a file of the set of files and determines that the file of the set of files includes the tripwire file. The operation 304 detects an indicium of an activity related to a file of the protected set of files and identifies the file as the tripwire file using a tripwire file identification tool.

FIG. 15 illustrates another alternative embodiment of the exemplary operational flow 200 of FIG. 2. The warning operation 320 may include at least one additional operation. The at least one additional operation may include an operation 322, an operation 324, and/or an operation 326. The operation 322 generates a signal indicating a source of an occurrence of an unauthorized activity related to the protected set of files in response to the detected indicium of an activity related to the tripwire file. The operation 324 generates a signal indicating an occurrence of an unauthorized activity related to the tripwire file to the protected set of files in response to the detected indicium of an activity related to the tripwire file. The operation 326 generates an electrical signal indicating an occurrence of an unauthorized activity related to the protected set of files in response to the detected indicium of an activity related to the tripwire file.

FIG. 16 illustrates a further alternative embodiment of the exemplary operational flow 200 of FIG. 2. The warning operation 320 may include at least one additional operation. The at least one additional operation may include an operation 328, an operation 332, and/or an operation 334. The operation 328 generates a machine-readable signal indicating an occurrence of an unauthorized activity related to the protected set of files in response to the detected indicium of an activity related to the tripwire file. The operation 332 generates a human-perceivable indication of an unauthorized activity related to the protected set of files in response to the detected indicium of an activity related to the tripwire file. The operation 334 generates an indication of the unauthorized activity related to the protected set of files that is perceivable by the set-of-files owner and/or the set-of-files administrator.

FIG. 17 illustrates another alternative embodiment of the exemplary operational flow 200 of FIG. 2. The exemplary operational flow may include at least one additional operation 350. The at least one additional operation 350 may include an operation 352, and/or an operation 354. The operation 352 broadcasts a human-understandable indication of an occurrence of the unauthorized activity related to the protected set of files. The operation 354 facilitates application of a security measure to the protected set of files.

FIGS. 18A and 18B illustrates an environment 400 in which an embodiment of the exemplary operational flow 200 of FIG. 2 may be implemented. FIGS. 18A and 18B schematically illustrate a credit card processing environment that is simplified for the purposes of illustration. A cardholder obtains a credit card from a Card-Issuing Bank 430. The credit card may be a card branded by an association, such as for illustrative purposes, a VISA® card or MASTERCARD® card, or the credit card may be a brand owned and issued by the Card-Issuing Bank 430, such as for illustrative purposes, an AMERICAN EXPRESS® card or DISCOVER® card. The Card-Issuing Bank may maintain a record of cards issued by it in a protected set of files. The protected set of files may include many normal credit card files each respectively indicating a customer name, an account number, a billing address, a history of charges, a history of payments, and other relevant information. Even though protected in a manner selected by the Card-Issuing Bank, at least a portion the protected set of files may experience an unauthorized access or a theft with an ultimate goal of incurring fraudulent charges against the credit card accounts reflected in the set of files.

FIG. 18A illustrates an environment that includes an aspect of a credit card transaction. A merchant may enter a customer's credit card number into their card reader or terminal, illustrated as a Merchant's point of sale unit 410, in conjunction with a transaction. An authorization request is communicated to an intermediary and/or intermediaries, illustrated as a Processor 420. The Processor communicates the authorization request to the bank that issued the credit card to the customer, illustrated as the Card-Issuing Bank 430. The Card-Issuing Bank checks the authorization request against the normal credit card file for the customer in its protected set of files, and if appropriate, returns an approval code to the Processor. The Processor returns the approval code to the Merchant's point of sale unit. The merchant typically then completes the transaction and the customer receives the goods.

FIG. 18B illustrates an environment that occurs after the aspect of the credit card transaction illustrated in FIG. 18A. During a reporting period, typically at the end of a day, the Merchant through the Merchant's point of sale unit 410 communicates the transactions, illustrated as "sales drafts with authorization code" for the reporting period to the Processor 420. The Processor communicates each transaction to each customer's card-issuing bank, illustrated as "interchange request with authorization code" to the Card-Issuing Bank 430. The Card-Issuing Bank communicates the proceeds, illustrated as "sale amount minus interchange fee" to the Merchant's Bank 440, which deposits the "sales amount minus discount percentage" and any other charges into the Merchant's bank account 445.

At least one entity of the Merchant's point of sale unit 410, the Processor 420, and/or the Card-Issuing Bank 430 illustrated in FIGS. 18A and 18B is likely to maintain a protected set of files. In an embodiment, the protected set of files include at least one normal file corresponding in some manner to the customer's credit card, the customer's account information, the transaction, and/or similar records of other customers and other transactions. A protected set of files maintained by the Card-Issuing Bank 430 is used to illustrate an embodiment of the exemplary operational flow 200 of FIG. 2. A tripwire file is caused to be included in the protected set of files maintained by the Card-Issuing Bank that includes at least one normal account. For example, the tripwire file may include a record of a tripwire credit card account having a limited functionality. In an alternative embodiment, at least two tripwire files are caused to be included in the protected set of files. The at least one normal account includes least one record of valid credit card account having a full functionality.

An indicium of an activity related to the tripwire file is detected. For example, a detected indicium of activity related to the tripwire file may include a receipt from the Processor 420 of the credit card charge "authorization request" by the Card-Issuing Bank 430 as illustrated in FIG. 18A. By way of further example, a detected indicium of activity may include at least one of an information request, an account attribute change request, a funds transfer request, an inquiry, a query, a charge, a transaction, a transfer request, a deposit, a claim, a correction, a change of attributes request, a payment, a refund request, and/or a benefit transfer related to the tripwire file. Since the tripwire account has only limited functionality and is not associated with a real customer, any activity with respect to the tripwire account may indicate an unauthorized access or theft of the protected set of files that includes the tripwire account has occurred.

A signal is generated indicating an occurrence of an unauthorized activity related to the protected set of files in response to the detected indicium of an activity related to the tripwire file. For example, the generated signal may include a human-perceivable indication of an unauthorized activity related to the protected set of files in response to the detected indicium of an activity related to the tripwire file. By way of further example, the generated signal may include a machine-readable signal indicating an occurrence of an unauthorized activity related to the protected set of files in response to the detected indicium of an activity related to the tripwire file. The machine-readable signal may be used to activate an additional security or protection for the set of files.

In another embodiment, the exemplary operational flow 200 of FIG. 2 may be used to indicate a security breach of protected file sets in other industries. For example, a health insurer may cause a tripwire health insurance file to be included in a protected set of health insurance files that includes at least one normal health insurance file. By way of further example, a governmental unit, such as US Department of Veterans Affairs, may cause a tripwire veterans file to be included in a protected set of veterans files that includes at least one normal veterans file.

Figure 19:
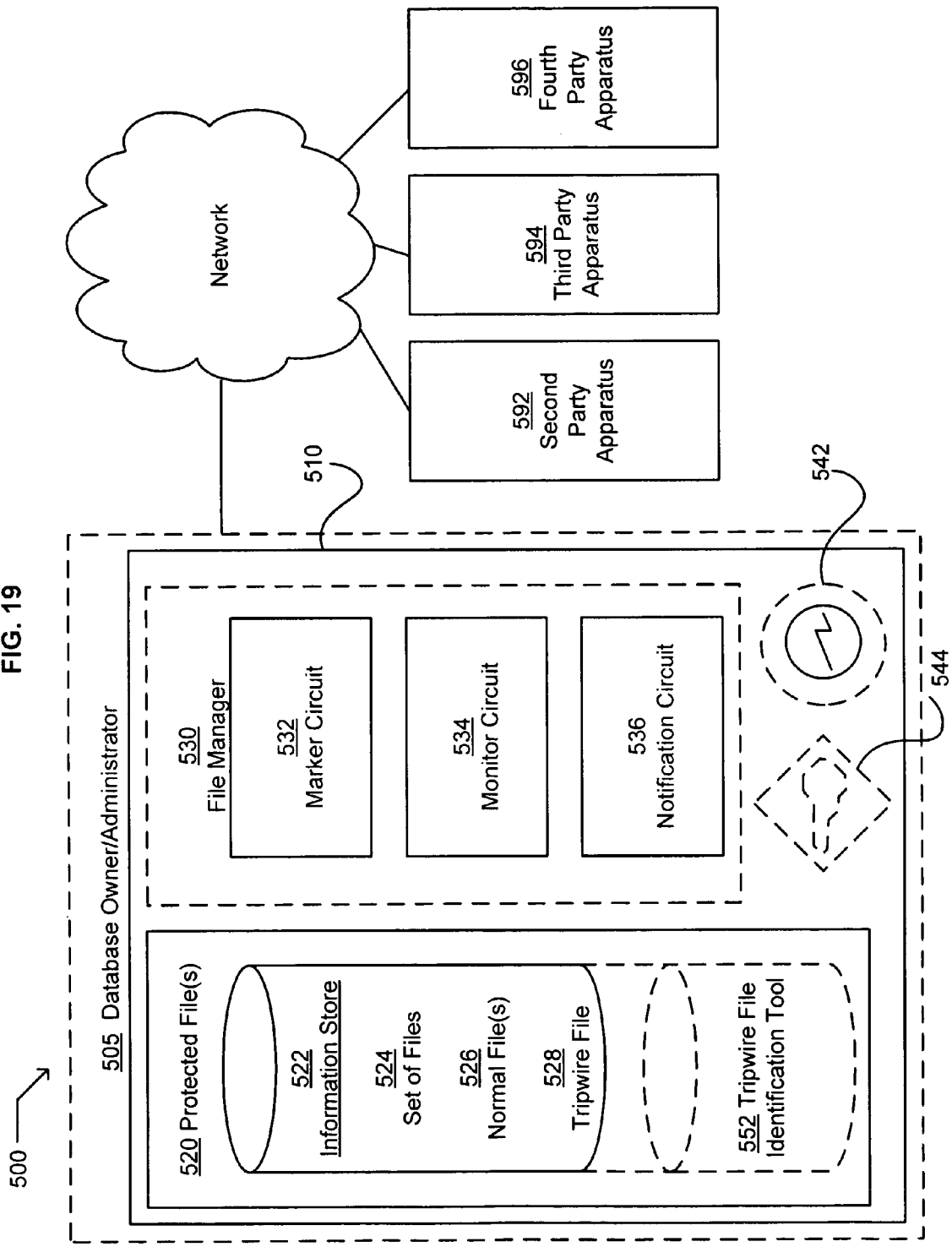
FIG. 19 illustrates an exemplary environment in which embodiments may be implemented.

FIG. 19 illustrates an exemplary environment 500 in which embodiments may be implemented. Components of the exemplary environment include an apparatus 510, a network, a second party apparatus 592, a third party apparatus 594, and a fourth party apparatus 596. The apparatus 510 includes a marker circuit 532 for saving a tripwire file 528 in a protected set of files 524 that includes at least one normal file 526. The apparatus also includes a monitor circuit 534 for detecting an indicium of an activity related to the tripwire file. The apparatus further includes a notification circuit 536 for generating a signal indicating an occurrence of an unauthorized activity related to the protected set of files in response to the detected indicium of an activity related to the tripwire file.

In an embodiment, the marker circuit 532 further includes a marker circuit for saving a tripwire file in a protected database that includes at least one normal file. In another embodiment, the marker circuit further includes a marker circuit for saving a tripwire file misleadingly appearing to allow provision of a benefit to a beneficiary into a protected set of files that includes at least one regular file actually allowing provision of the benefit to another beneficiary. In a further embodiment, the marker circuit further includes a marker circuit for saving a tripwire file in a protected set of files that includes at least one normal file. In an embodiment, the tripwire file has a property that does not facilitate a return of an approval in response to a health insurance claim. Each normal file of the at least one normal file has a property that does facilitate a return of an approval in response to a health insurance claim. In an embodiment, the marker circuit further includes a marker circuit for causing a tripwire file subtype to be included in a protected set of files of files that includes at least one normal file subtype. In another embodiment, the marker circuit further includes a marker circuit for causing a tripwire file and a tripwire file identification tool to be included in a protected set of files that includes at least one normal file. In a further embodiment, the marker circuit further includes a marker circuit for causing a tripwire file to be included in a protected set of files that includes at least one normal file and for causing a tripwire file identification tool to be included in another set of files.

In an embodiment, the monitor circuit 534 further includes a monitor circuit for detecting an indicium of an activity related to the tripwire file 528 in response to at least two instances of an activity related to the tripwire file. In another embodiment, the monitor circuit further includes a monitor circuit for detecting at least one of an indicium of a credit card charge authorization request, an account information change request, a funds transfer request, an inquiry, a query, a charge, a transaction, a claim, a correction, a change of attributes request, a refund, and/or a benefits transfer related to the tripwire file.

In an embodiment, the notification circuit 536 further includes a notification circuit for generating an electrical signal indicating an occurrence of an unauthorized activity related to the protected set of files 524 in response to the detected indicium of an activity related to the tripwire file 528. In a further embodiment, the notification circuit further includes a notification circuit for generating a human-perceptible indication of an occurrence of an unauthorized activity related to the protected set of files in response to the detected indicium of an activity related to the tripwire file.

In an embodiment, the apparatus 510 may further include a sentry circuit 542 for broadcasting a human-understandable indication of the occurrence of an unauthorized activity related to the protected set of files 524 in response to the detected indicium of an activity related to the tripwire file 528. In another embodiment, the apparatus may further include a fortification circuit 544 for facilitating application of a security measure to the protected set of files in response to the detected indicium of an activity related to the tripwire file. In further embodiment, the apparatus may include the fortification circuit for facilitating application of a security measure to another set of files in response to the detected indicium of an activity related to the tripwire file.

In an embodiment, the apparatus 510 may be used to implement the operational flow 200 of FIG. 2 in the environment illustrated in FIGS. 18A and 18B. For example, the Card-Issuing Bank 430 of FIG. 18A may employ the apparatus and the operational flow to discover a security breach to its protected set of files that includes its normal credit card files. By way of further example, the Processor 420 of FIG. 18A may employ the apparatus and the operational flow to discover a security breach to any protected set of files it maintains.

Figure 20:
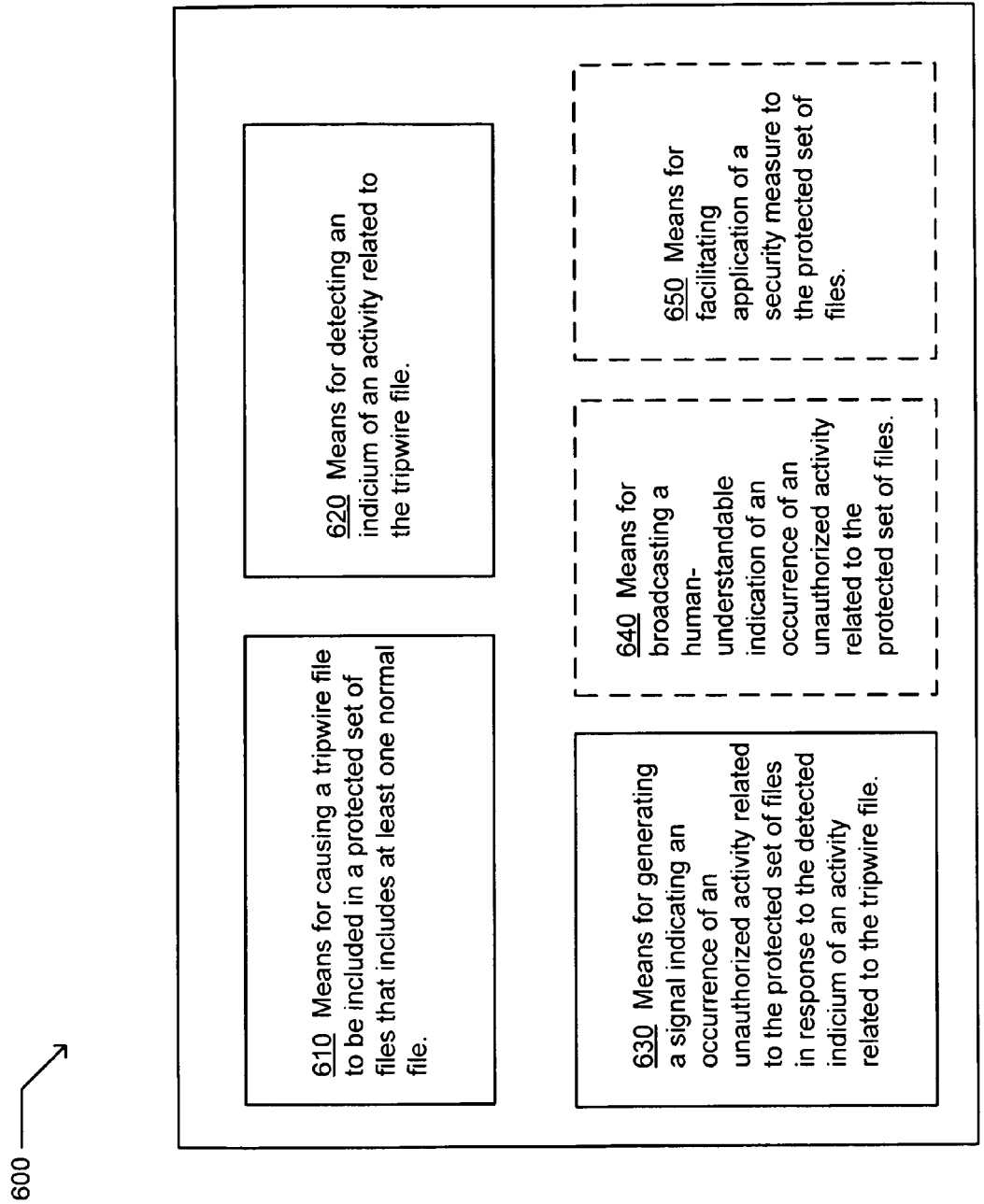
FIG. 20 illustrates an exemplary apparatus in which embodiments may be implemented.

FIG. 20 illustrates an exemplary apparatus 600 in which embodiments may be implemented. The apparatus includes a means 610 for causing a tripwire file to be included in a protected set of files that includes at least one normal file. The apparatus also includes a means 620 for detecting an indicium of an activity related to the tripwire file. The apparatus further includes a means 630 for generating a signal indicating an occurrence of an unauthorized activity related to the protected set of files in response to the detected indicium of an activity related to the tripwire file.

In an embodiment, the apparatus 600 may include a means 640 for broadcasting a human-understandable indication of an occurrence of an unauthorized activity related to the protected set of files. In another embodiment, the apparatus may include a means 650 for facilitating application of a security measure to the protected set of files.

Figure 21:
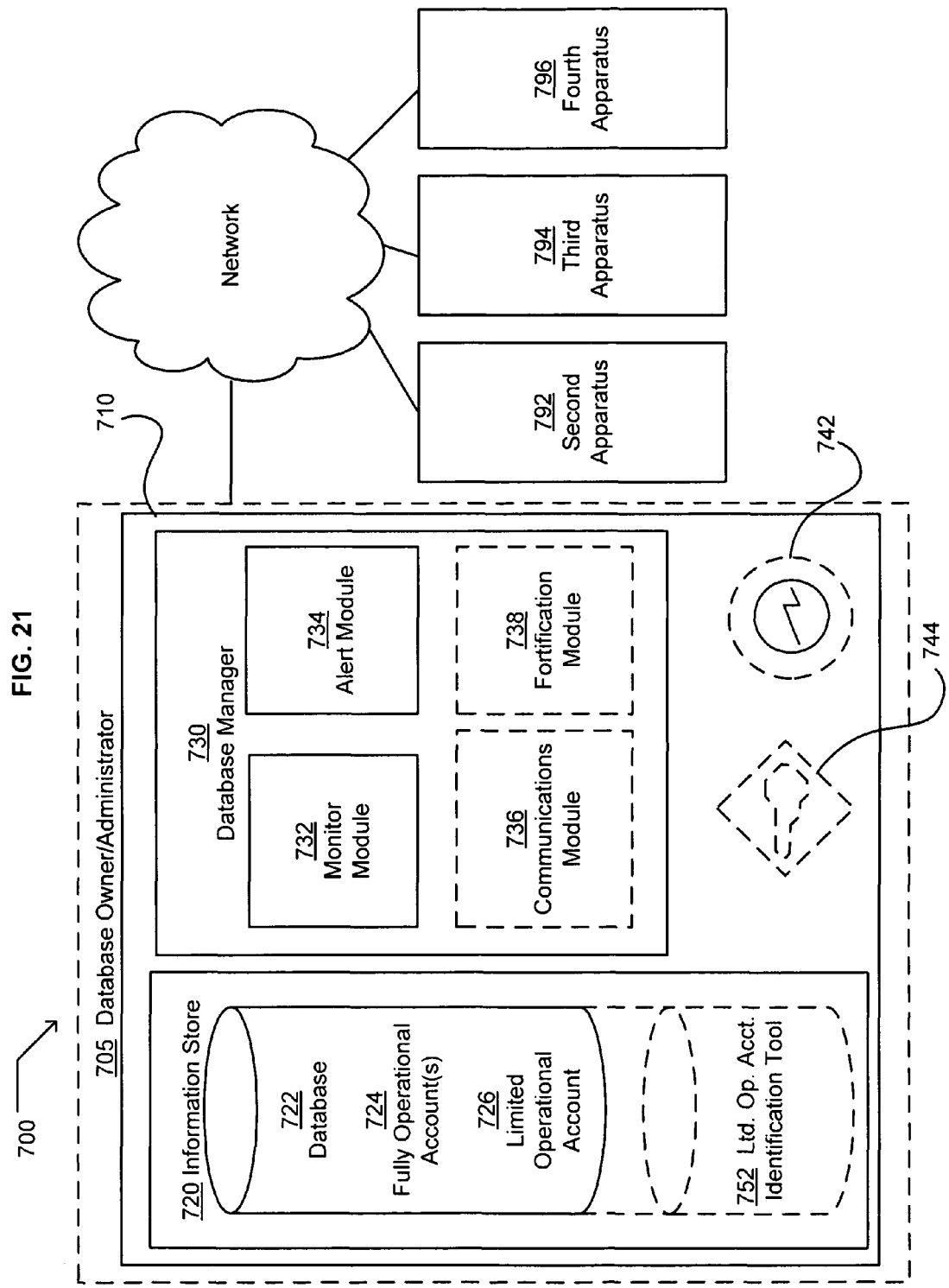
FIG. 21 illustrates an exemplary environment in which embodiments may be implemented.

FIG. 21 illustrates an exemplary environment 700 in which embodiments may be implemented. The exemplary environment includes an apparatus 710, a network, a second apparatus 792, a third apparatus 794, and/or a fourth apparatus 796. The apparatus 710 includes an information store 720 configurable by a database 722 that includes at least one fully operational account 724 and a limited operational account 726. The apparatus 710 also includes a database manager device 730. The database manager includes a monitor module 732 operable to detect a sign of an activity related to the limited operational account, and an alert module 734 operable to generate signal indicating an unauthorized activity related to the database in response to the detected sign of an activity related to the limited operational account.

In an embodiment, the information store 720 includes a computer storage media and/or a quantum memory device. In another embodiment, the information store further includes an information store configured by a database 722 that includes a record of at least one fully operational account 724 and a record of a limited operational account 726. In a further embodiment, the information store further includes an information store configured by a database that includes a record of at least one account facilitating provision of a benefit and a record of a limited operational account not facilitating provision of the benefit. In another embodiment, the information store further includes an information store configured by a database that includes at least one normal credit card account subtype and a limited operational credit card account subtype.

In an embodiment, the monitor module 732 further includes a monitor module operable to detect a sign of at least one of a financial transaction card charge authorization request, an account information change request, a funds transfer request, an inquiry, a query, a charge, a transaction, a claim, a correction, a change of attributes request, a refund, and/or a benefit transfer related to the limited operational account. In another embodiment, the alert module 734 further includes an alert module operable to generate an electronic signal indicating an unauthorized activity related to the database 722 in response to the detected sign of an activity related to the limited operational account 726. In a further embodiment, the alert module further includes an alert module operable to generate a human-understandable indication of an unauthorized activity related to the database in response to the detected sign of an activity related to the limited operational account.

In an embodiment, the database manager device 730 further includes a communications module 736 operable to broadcast a human-understandable indication of an occurrence of an unauthorized activity related to the database 722 in response to the detected sign of an activity related to the limited operational account 726. In another embodiment, the database manager device further includes a fortification module 738 operable to facilitate changing a protection status of the database in response to the detected sign of an activity related to the limited operational account.

In use, the apparatus 710 may be used to implement the operational flow 200 of FIG. 2 in the environment illustrated in FIGS. 18A and 18B. For example, the Card-Issuing Bank 430 of FIG. 18A may employ the apparatus and the operational flow to discover a security breach to its protected set of files that includes its normal credit card files. By way of further example, the Processor 420 of FIG. 18A may employ the apparatus and the operational flow to discover a security breach to any protected set of files it maintains.

Figure 22:
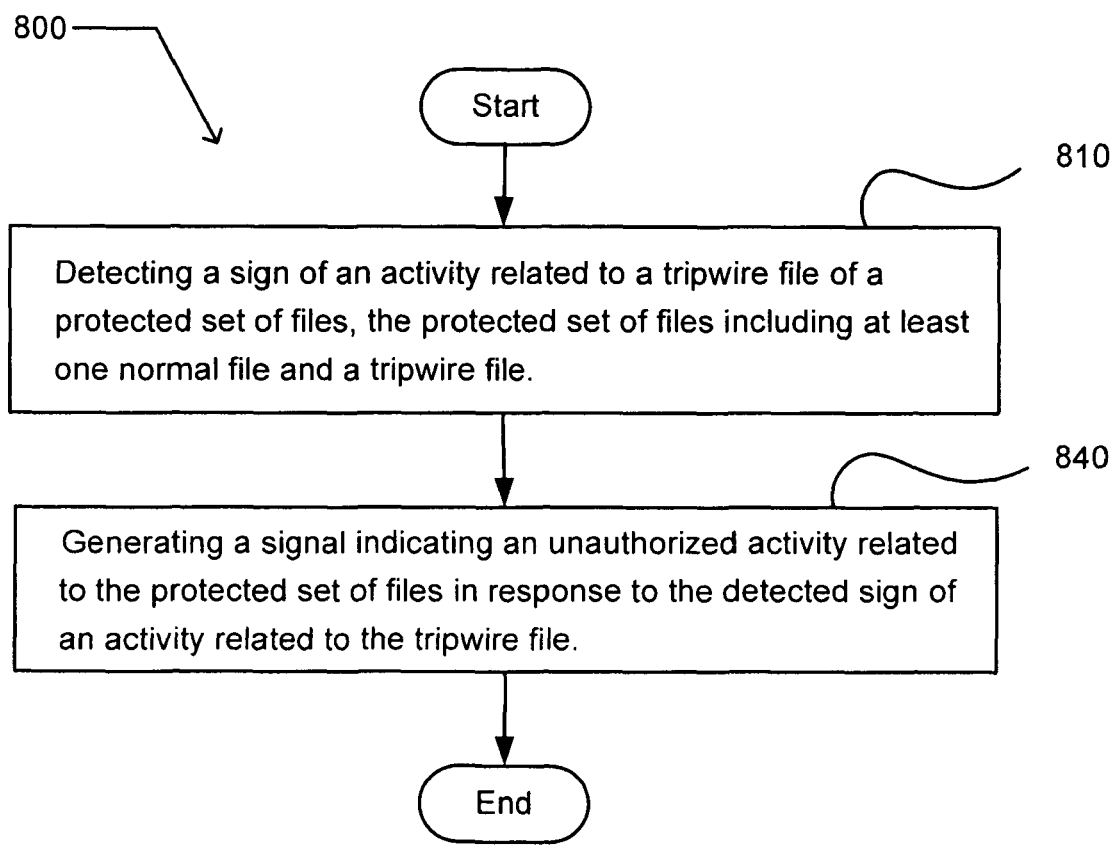
FIG. 22 illustrates an exemplary operational flow in which embodiments may be implemented.

FIG. 22 illustrates an exemplary operational flow 800 in which embodiments may be implemented. After a start operation, the operational flow moves a discovery operation 810. The discovery operation detects a sign of an activity related to a tripwire file of a protected set of files. The protected set of files includes at least one normal file and a tripwire file. A warning operation 840 generates a signal indicating an unauthorized activity related to the protected set of files in response to the detected sign of an activity related to the tripwire file. The operational flow then moves to an end operation.

Figure 23:
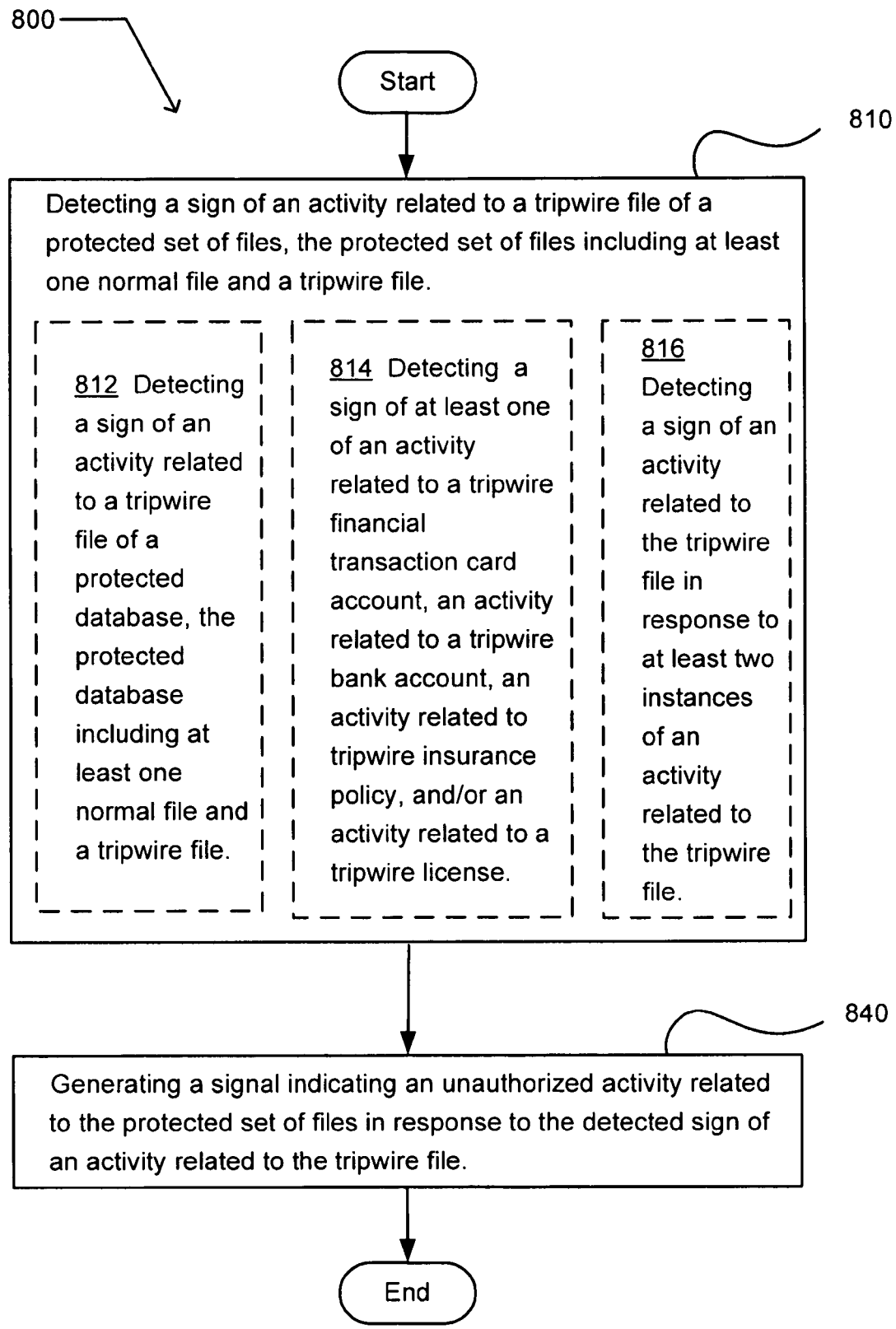
FIG. 23 illustrates an alternative embodiment of the exemplary operational flow of FIG. 22.

FIG. 23 illustrates an alternative embodiment of the exemplary operational flow 800 of FIG. 22. The discovery operation 810 may include at least one additional operation. The at least one additional operation may include an operation 812, an operation 814, and/or an operation 816. The operation 812 detects a sign of an activity related to a tripwire file of a protected database, the protected database including at least one normal file and a tripwire file. The operation 814 detects a sign of at least one of an activity related to a tripwire financial transaction card account, an activity related to a tripwire bank account, an activity related to tripwire insurance policy, and/or an activity related to a tripwire license. The operation 816 detects a sign of an activity related to the tripwire file in response to at least two instances of an activity related to the tripwire file.

Figure 24:
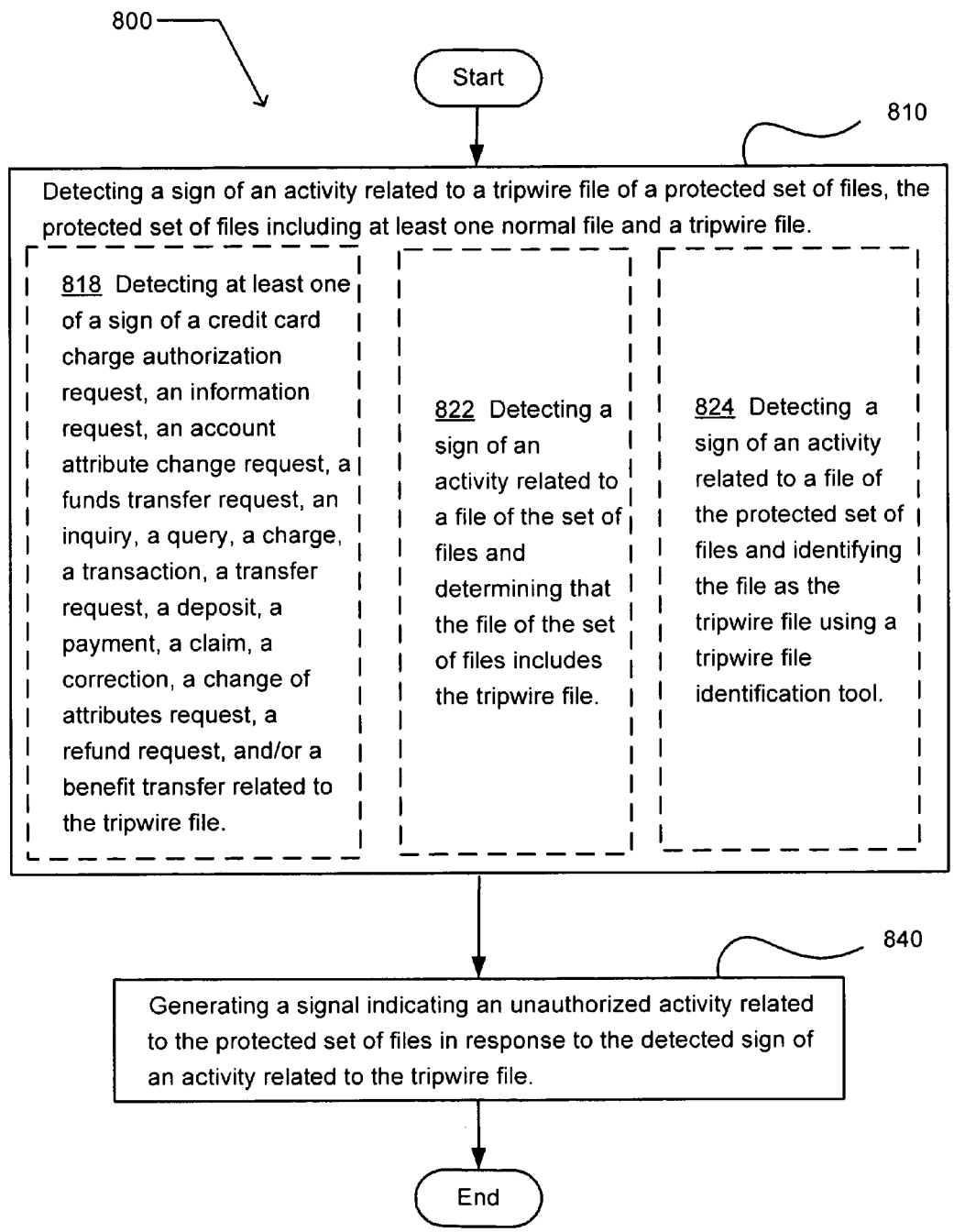
FIG. 24 illustrates another embodiment of the exemplary operational flow of FIG. 22.

FIG. 24 illustrates another embodiment of the exemplary operational flow 800 of FIG. 22. The discovery operation 810 may include at least one additional operation. The at least one additional operation may include an operation 818, an operation 822, and/or an operation 824. The operation 818 detects at least one of a sign of a credit card charge authorization request, an information request, an account attribute change request, a funds transfer request, an inquiry, a query, a charge, a transaction, a transfer request, a deposit, a payment, a claim, a correction, a change of attributes request, a refund request, and/or a benefit transfer related to the tripwire file. The operation 822 detects a sign of an activity related to a file of the set of files and determines that the file of the set of files includes the tripwire file. The operation 824 detects a sign of an activity related to a file of the protected set of files and identifying the file as the tripwire file using a tripwire file identification tool.

Figure 25:
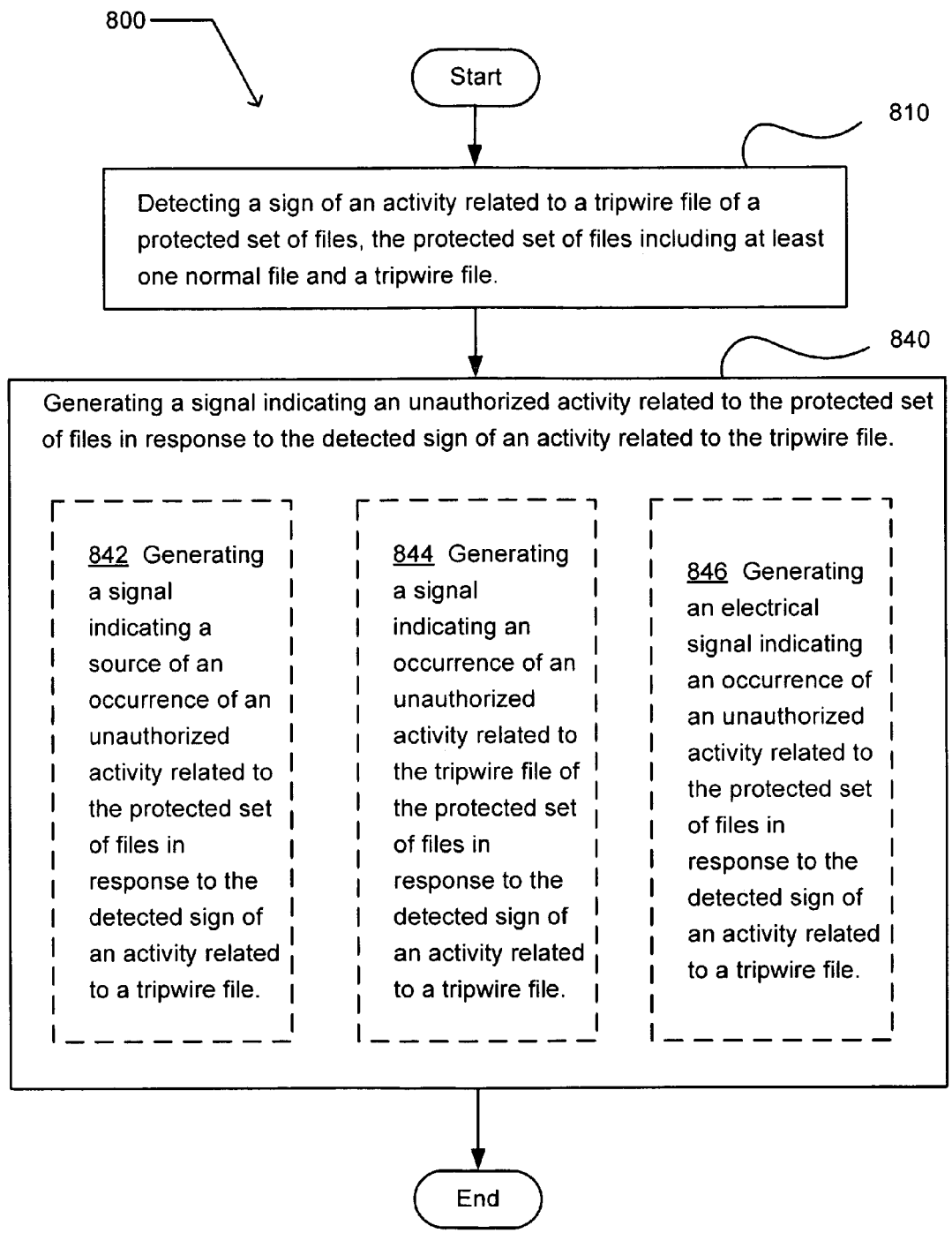
FIG. 25 illustrates a further embodiment of the exemplary operational flow of FIG. 22.

FIG. 25 illustrates a further embodiment of the exemplary operational flow 800 of FIG. 22. The warning operation 840 may include at least one additional operation. The at least one additional operation may include an operation 842, an operation 844, and/or an operation 846. The operation 842 generates a signal indicating a source of an occurrence of an unauthorized activity related to the protected set of files in response to the detected sign of an activity related to a tripwire file. The operation 844 generates a signal indicating an occurrence of an unauthorized activity related to the tripwire file of the protected set of files in response to the detected sign of an activity related to a tripwire file. The operation 846 generates an electrical signal indicating an occurrence of an unauthorized activity related to the protected set of files in response to the detected sign of an activity related to a tripwire file.

Figure 26:
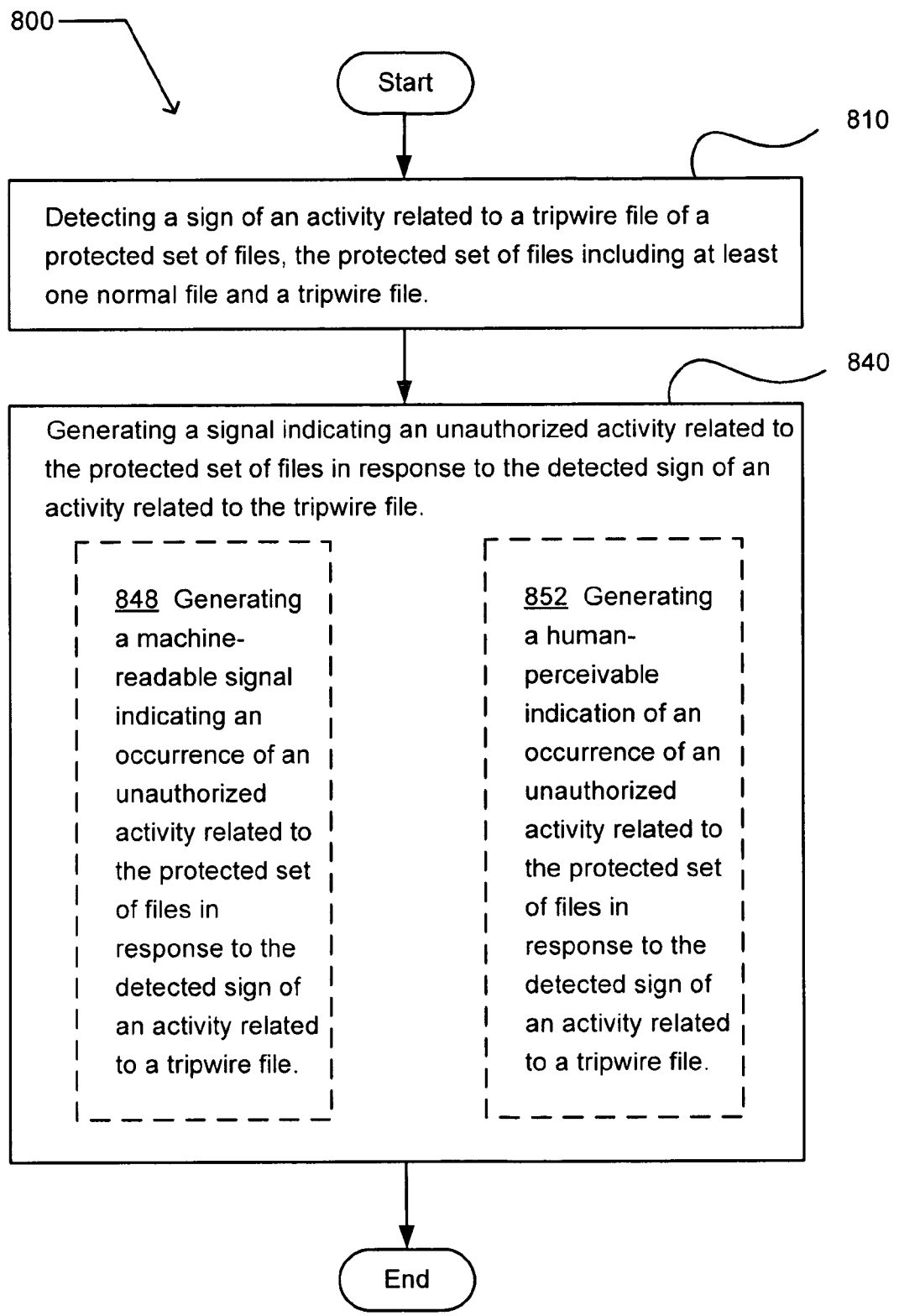
FIG. 26 illustrates another embodiment of the exemplary operational flow of FIG. 22.

FIG. 26 illustrates another embodiment of the exemplary operational flow 800 of FIG. 22. The warning operation 840 may include at least one additional operation. The at least one additional operation may include an operation 848, and/or an operation 852. The operation 848 generates a machine-readable signal indicating an occurrence of an unauthorized activity related to the protected set of files in response to the detected sign of an activity related to a tripwire file. The operation 852 generates a human-perceivable indication of an occurrence of an unauthorized activity related to the protected set of files in response to the detected sign of an activity related to a tripwire file.

Figure 27:
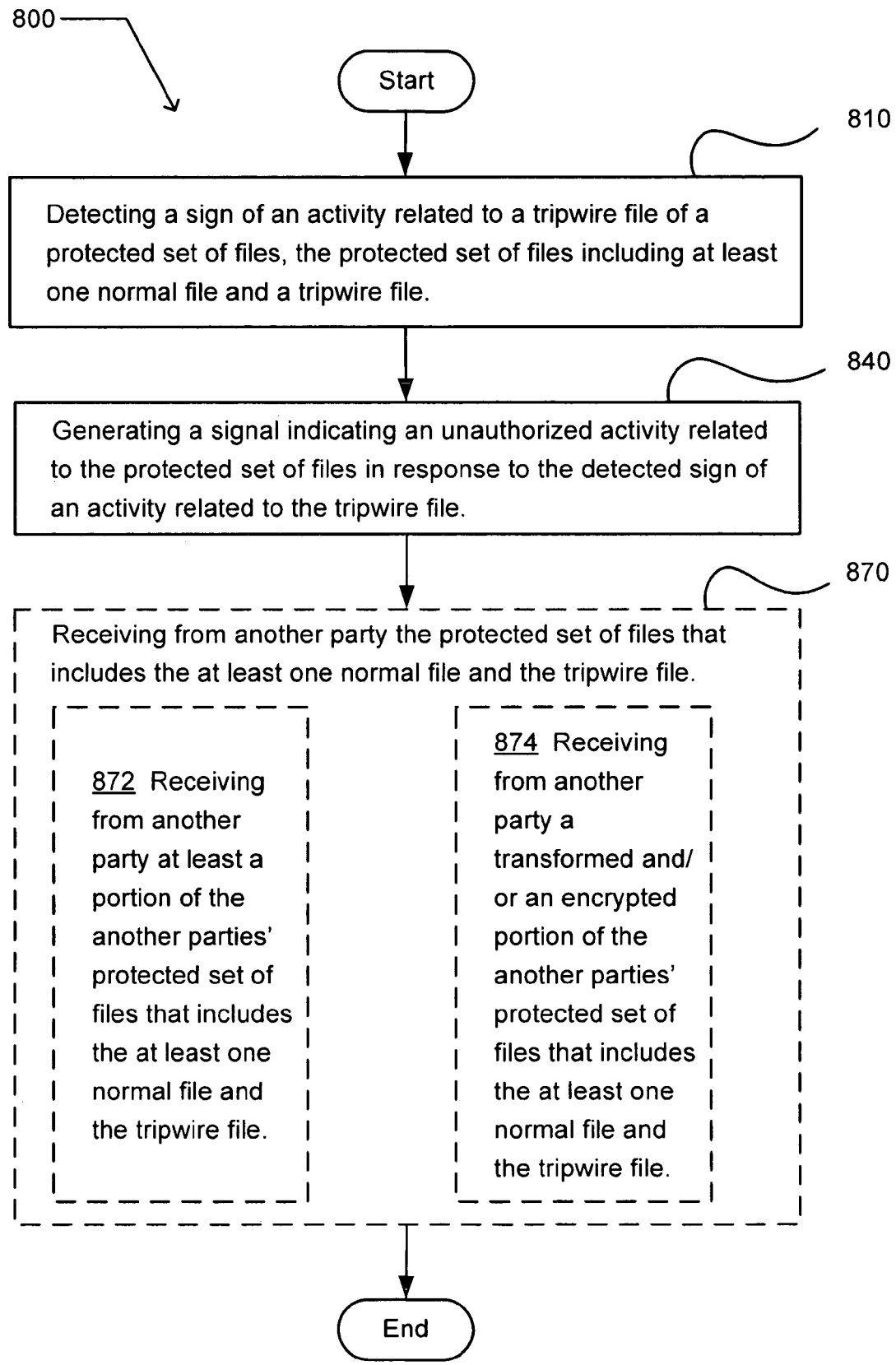
FIG. 27 illustrates another embodiment of the exemplary operational flow of FIG. 22.

FIG. 27 illustrates another embodiment of the exemplary operational flow 800 of FIG. 22. The operational flow may include at least one additional operation. The at least one additional operation may include an operation 870. The operation 870 receives from another party the protected set of files that includes the at least one normal file and the tripwire file. The operation 870 may include at least one additional operation, such as an operation 872 and/or an operation 874. The operation 872 receives from another party at least a portion of the another parties' protected set of files that includes the at least one normal file and the tripwire file. The operation 874 receives from another party a transformed and/or an encrypted portion of the another parties' protected set of files that includes the at least one normal file and the tripwire file. The another parties protected set of files may include a protected set of files maintained and/or operated by the another, and/or may include a protected set of files received from a third party by the another.

Figure 28:
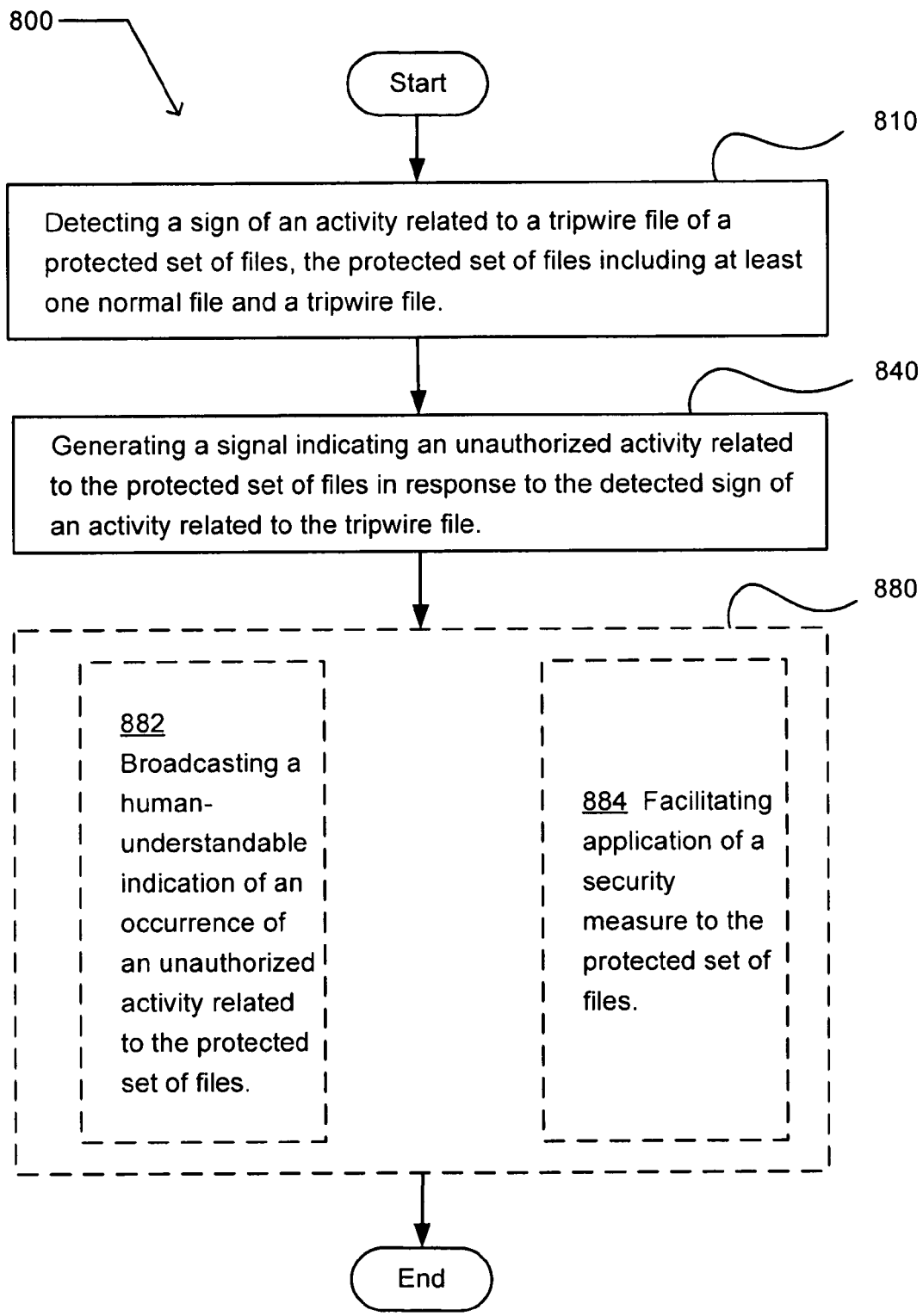
FIG. 28 illustrates a further embodiment of the exemplary operational flow of FIG. 22.

FIG. 28 illustrates a further embodiment of the exemplary operational flow 800 of FIG. 22. The operational flow may include at least one additional operation 880. The operation 880 may include an operation 882 and/or an operation 884. The operation 882 broadcasts a human-understandable indication of an occurrence of an unauthorized activity related to the protected set of files. The operation 884 facilitates application of a security measure to the protected set of files.

Figure 29:
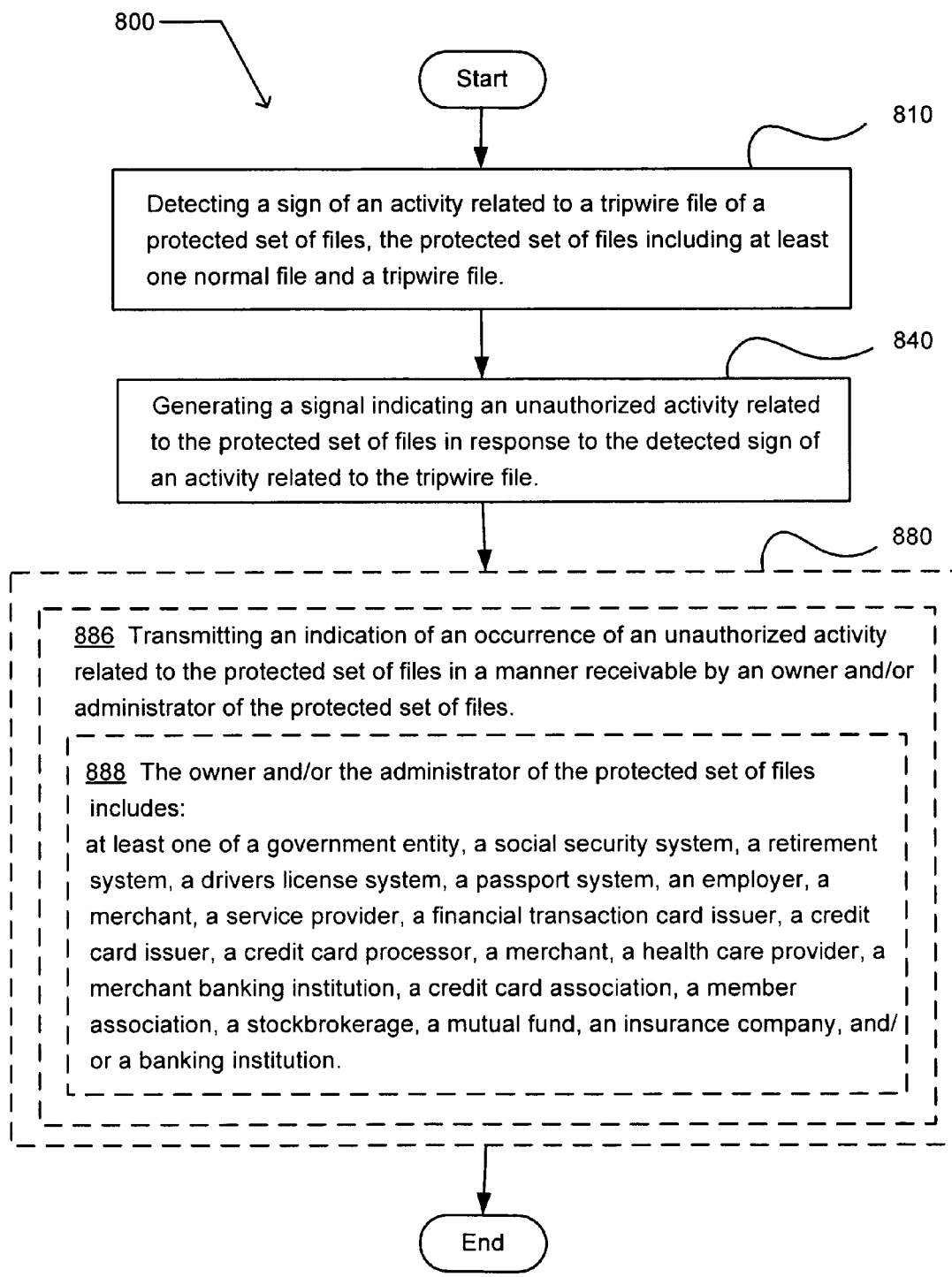
FIG. 29 illustrates another embodiment of the exemplary operational flow of FIG. 22.

FIG. 29 illustrates another embodiment of the exemplary operational flow 800 of FIG. 22. The at least one additional operation 880 of FIG. 28 may include at least one addition operation, such as an operation 886. The operation 886 transmits an indication of an occurrence of an unauthorized activity related to the protected set of files in a manner receivable by an owner and/or administrator of the protected set of files. The operation 886 may include at least one additional operation, such as an operation 888. At the operation 888, the owner and/or the administrator of the protected set of files includes at least one of a government entity, a social security system, a retirement system, a drivers license system, a passport system, an employer, a merchant, a service provider, a financial transaction card issuer, a credit card issuer, a credit card processor, a merchant, a health care provider, a merchant banking institution, a credit card association, a member association, a stockbrokerage, a mutual fund, an insurance company, and/or a banking institution.

In an embodiment, the operational flow 800 of FIG. 22 may be implemented in the environment illustrated in FIGS. 18A and 18B. For example, the Card-Issuing Bank 430 of FIG. 18A the operational flow to discover a security breach to its protected set of files that includes its normal credit card files. By way of further example, the Processor 420 of FIG. 18A may employ the apparatus and the operational flow to discover a security breach to a protected set of files maintained by the Card-Issuing Bank.

Figure 30:
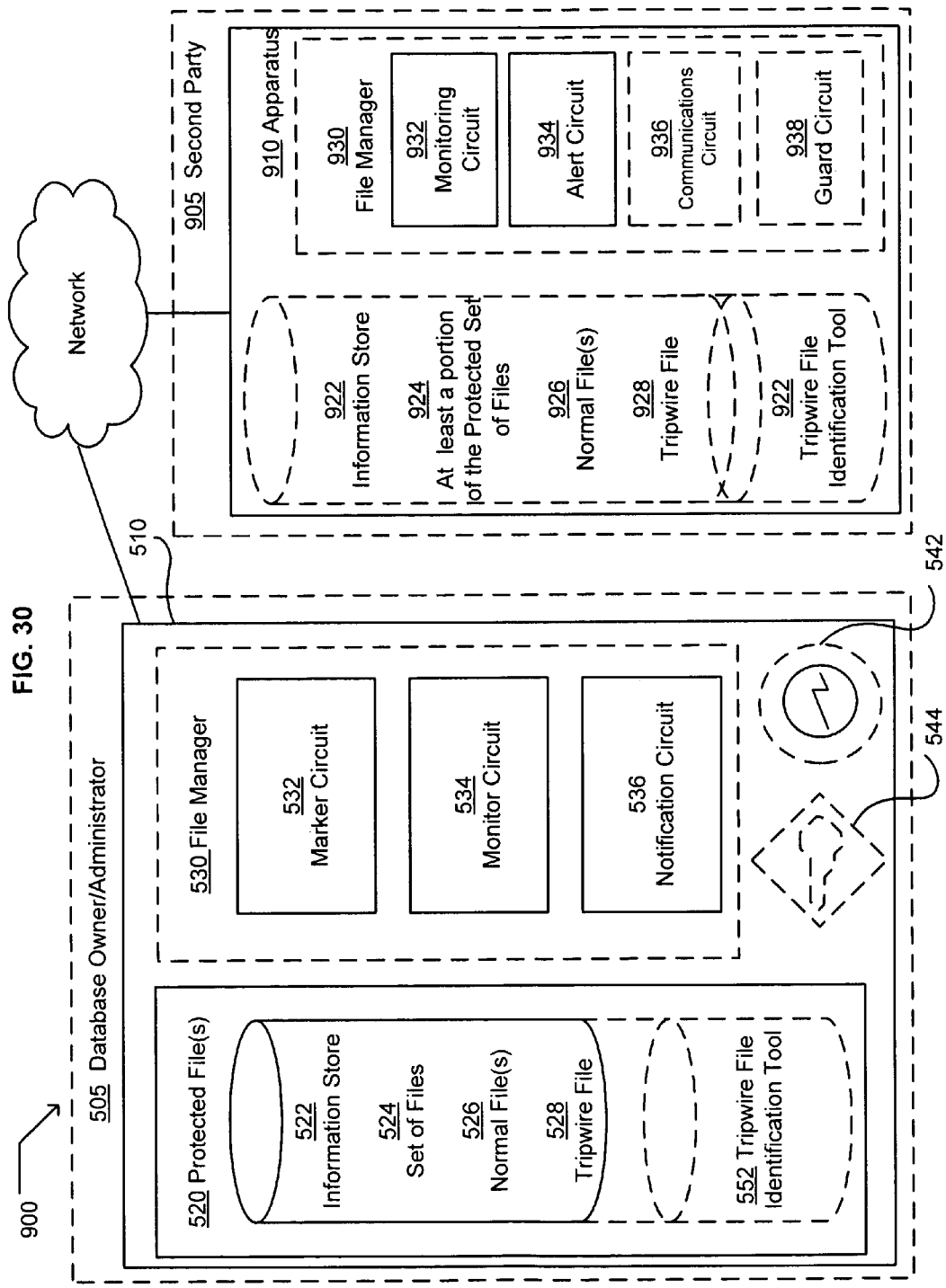
FIG. 30 illustrates an exemplary environment in which embodiments may be implemented.

FIG. 30 illustrates an exemplary environment 900 in which embodiments may be implemented. The exemplary environment includes the apparatus 510 described in conjunction with FIG. 19 and an apparatus 910. The apparatus 910 includes a monitoring circuit 932 and an alert circuit 934.

The monitoring circuit 932 includes a monitoring circuit for detecting a sign of an activity related to a tripwire file of a protected set of files, the protected set of files including at least one normal file 926 and a tripwire file 928. The protected set of files may include an at least a portion of the protected set of files 924 communicated from the protected set of files 520. In an embodiment, the at least a portion of the protected set of files may be saved in an information store 922 local to the apparatus 910. In another embodiment, the protected set of files may be saved in a remote information store (not shown) available to the apparatus 910 over the network. In a further embodiment, the protected set of files may be saved in the remote information 522 store available to the apparatus 910 over the network. The alert circuit includes an alert circuit for generating a signal indicating an unauthorized activity related to the protected set of files in response to the detected sign of an activity related to a tripwire file.

In an alternative embodiment, the apparatus 910 includes a communications circuit 936 for receiving from another party the protected set of files that includes the at least one normal file and the tripwire file. In a further embodiment, the communications circuit further includes a communications circuit for transmitting an indication of an occurrence of an unauthorized activity related to the protected set of files in a manner receivable by an owner and/or administrator of the protected set of files in response to the detected sign of an activity related to a tripwire file. For example, the owner and/or administrator of the protected set of files may include the database owner/administrator 505. In another alternative embodiment, the apparatus 910 includes a guard circuit 938 for facilitating application of a security measure to the protected set of files in response to the detected sign of an activity related to a tripwire file.

Figure 31:
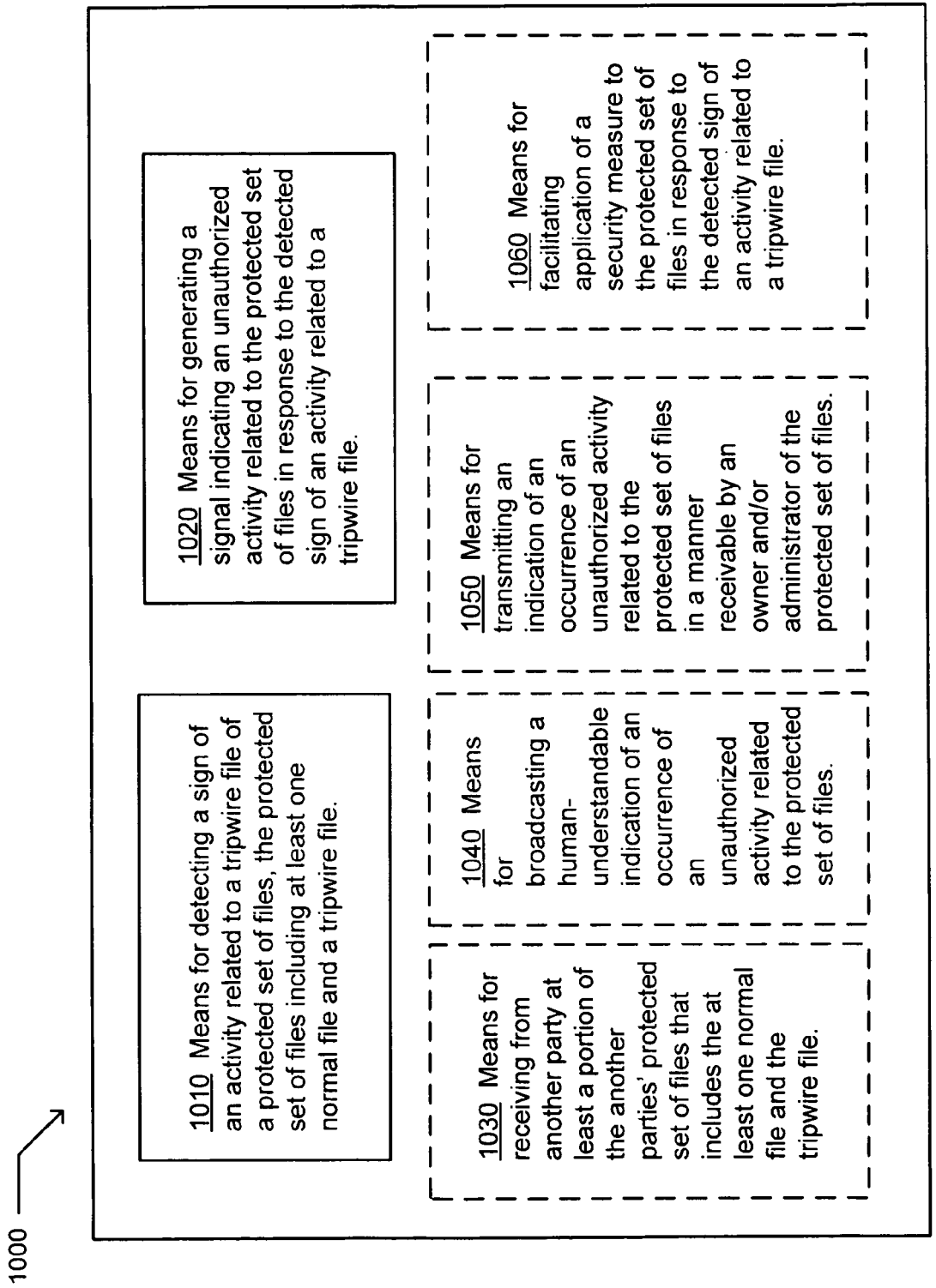
FIG. 31 illustrates an exemplary apparatus in which embodiments may be implemented.

FIG. 31 illustrates an exemplary apparatus 1000 in which embodiments may be implemented. The apparatus includes a means 1010 for detecting a sign of an activity related to a tripwire file of a protected set of files, the protected set of files including at least one normal file and a tripwire file. The apparatus also includes a means 1020 for generating a signal indicating an unauthorized activity related to the protected set of files in response to the detected sign of an activity related to a tripwire file.

In an alternative embodiment, the apparatus 1000 includes a means 1030 for receiving from another party at least a portion of the another parties' protected set of files that includes the at least one normal file and the tripwire file. In a further embodiment, the apparatus includes a means 1040 for broadcasting a human-understandable indication of an occurrence of an unauthorized activity related to the protected set of files. In another embodiment, the apparatus includes a means 1050 for transmitting an indication of an occurrence of an unauthorized activity related to the protected set of files in a manner receivable by an owner and/or administrator of the protected set of files. In an embodiment, the apparatus includes a means 1060 for facilitating application of a security measure to the protected set of files in response to the detected sign of an activity related to a tripwire file.

Figure 32:
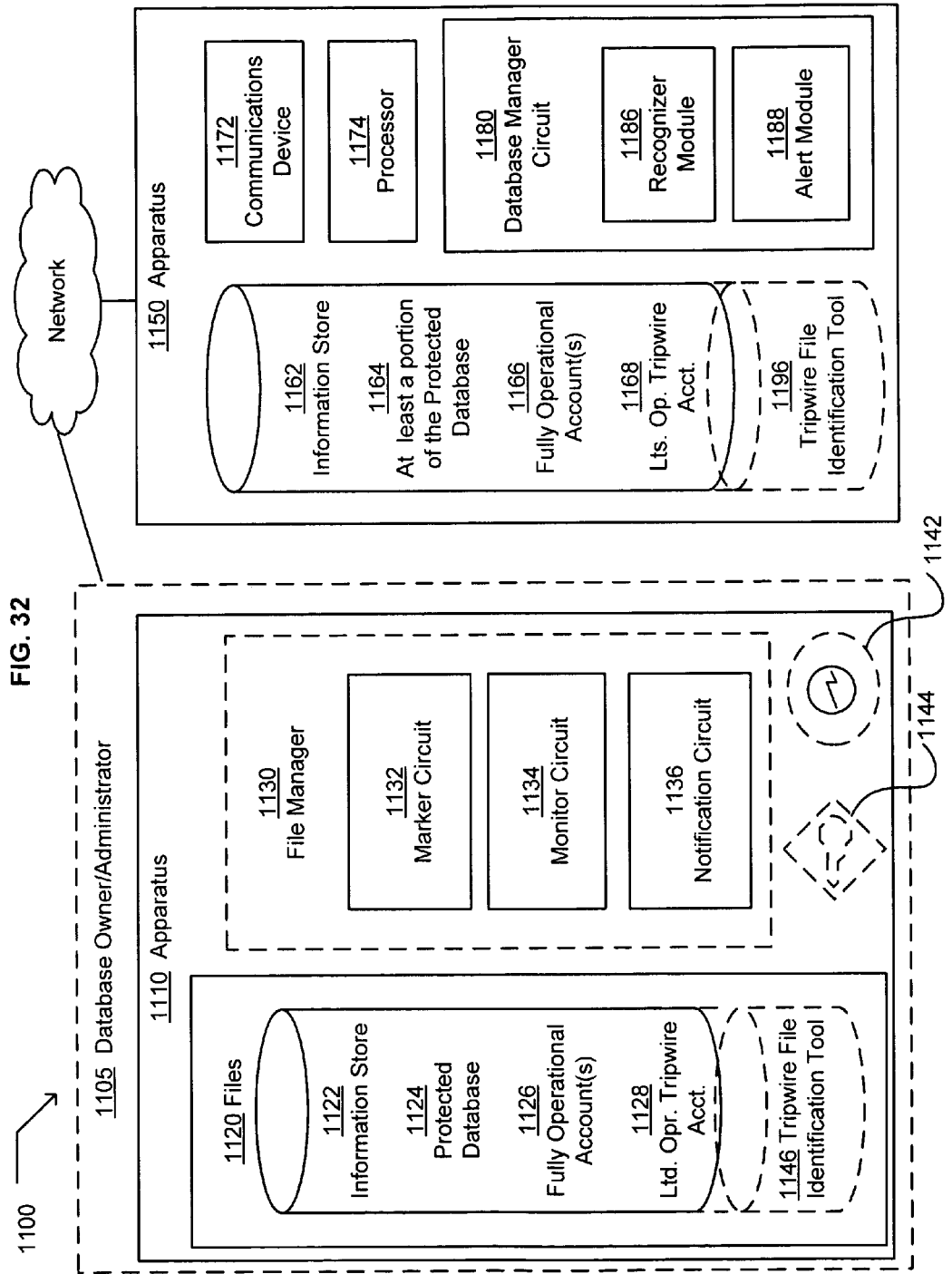
FIG. 32 illustrates an exemplary environment in which embodiments may be implemented.

FIG. 32 illustrates an exemplary environment 900 in which embodiments may be implemented. The exemplary environment includes an apparatus 1110 and an apparatus 1150. The apparatus 1110 includes an apparatus at least substantially similar to the apparatus 510 described in conjunction with FIG. 30. The apparatus 1150 includes a communications device 1172, an information store 1162, a processor 1174, and a database manager circuit 1180.

The communications device 1172 includes a communications device operable to receive an at least a portion of a protected database 1164 that includes at least one fully operational account 1166 and a limited operational tripwire account 1168. In an embodiment, the operability to receive an at least a portion of a protected database includes an operability to receive at least a portion of a protected database 1124 of apparatus 1110. The information store 1162 includes an information storage device configurable by a received at least a portion of a protected database. In another embodiment, the information store further includes an information store configured by the received at least a portion of a protected database.

The database manager circuit 1180 includes a recognizer module 1186 operable to detect a sign of an activity related to the limited operational tripwire account. The database manager circuit further includes an alert module 1188 operable to generate signal indicating an unauthorized activity related to the received at least a portion of a database 1164 in response to the detected sign of an activity related to a limited operational tripwire account 1168. In a further embodiment, the alert module further includes an alert module operable to generate signal indicating an unauthorized activity related to the received at least a portion of a database and to transmit the signal in a manner receivable by an owner and/or administrator 1105 of the received at least a portion of a database.

Figure 33:
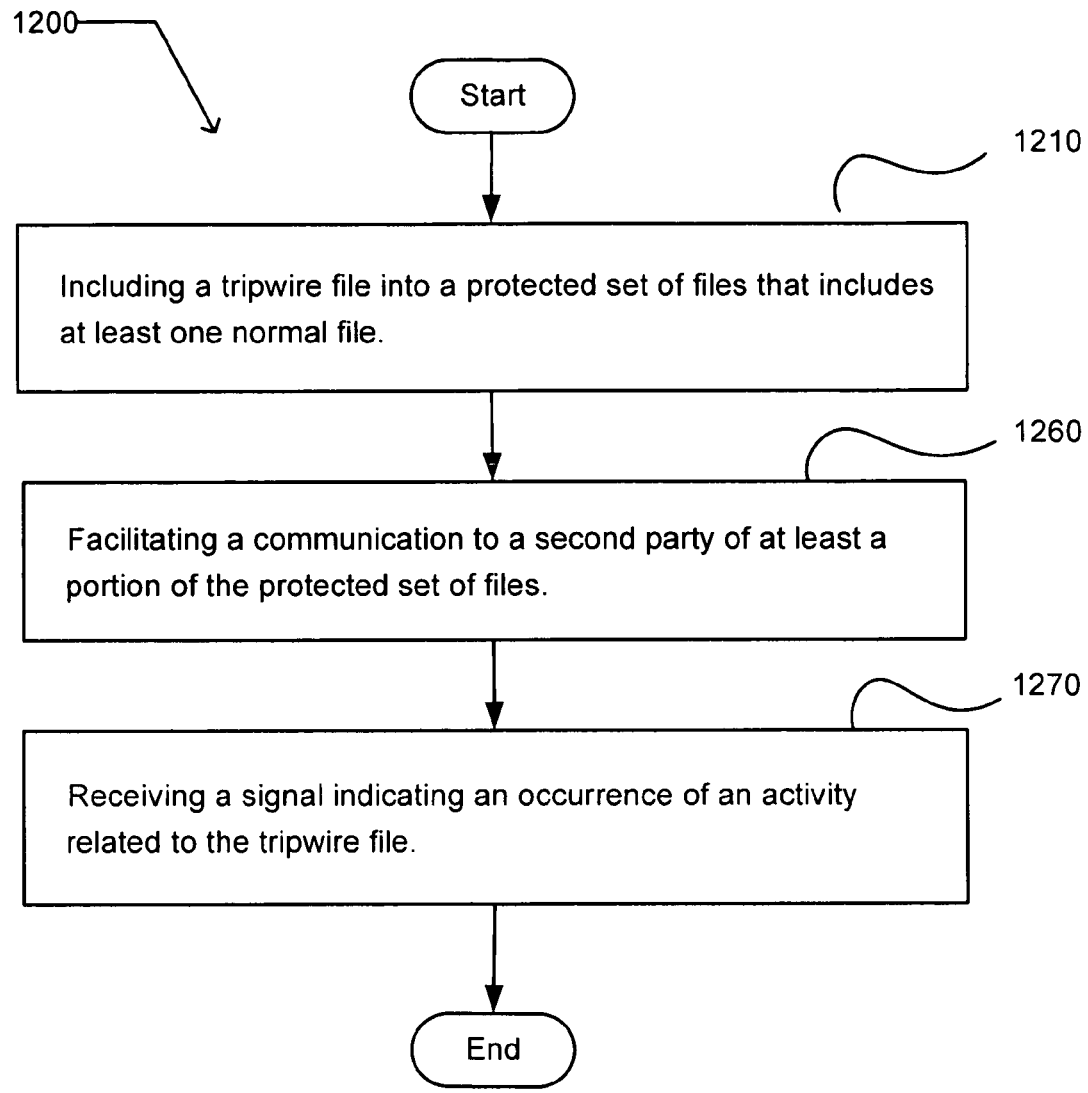
FIG. 33 illustrates an exemplary operational flow in which embodiments may be implemented.

FIG. 33 illustrates an exemplary operational flow 1200 in which embodiments may be implemented. After a start operation, the operational flow moves to an implanting operation 1210. The implanting operation includes a tripwire file into a protected set of files that includes at least one normal file. A transmission operation 1260 facilitates a communication to a second party of at least a portion of the protected set of files. An acquisition operation 1270 receives a signal indicating an occurrence of an activity related to the tripwire file. The operational flow then moves to an end operation.

Figure 34:
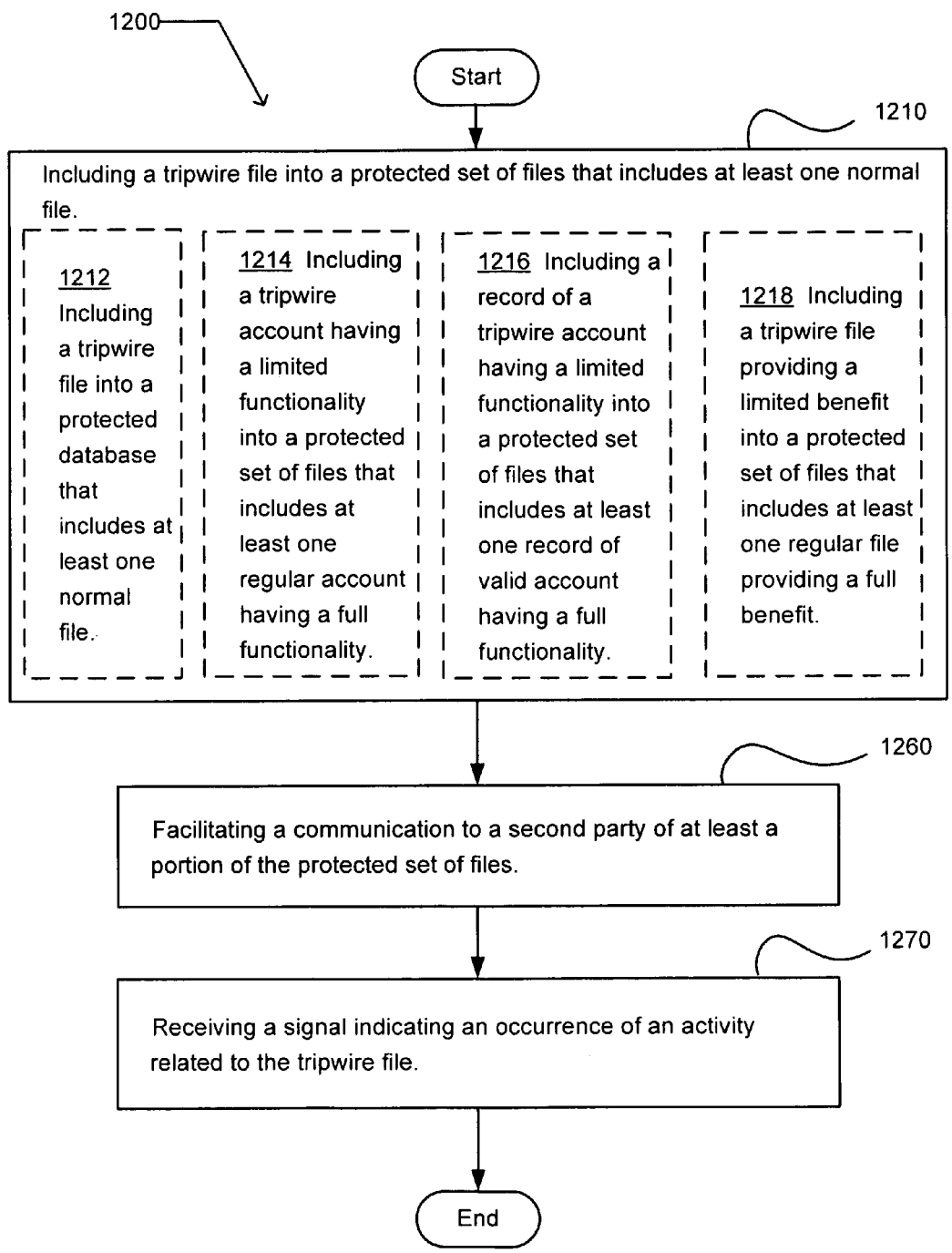
FIG. 34 illustrates an alternative embodiment of the exemplary operational flow of FIG. 33.

FIG. 34 illustrates an alternative embodiment of the exemplary operational flow 1200 of FIG. 33. The implanting operation 1210 may include at least one additional operation. The at least one additional operation may include an operation 1212, an operation 1214, an operation 1216, and/or an operation 1218. The operation 1212 includes a tripwire file into a protected database that includes at least one normal file. The operation 1214 includes a tripwire account has a limited functionality into a protected set of files that includes at least one regular account having a full functionality. The operation 1216 includes a record of a tripwire account having a limited functionality into a protected set of files that includes at least one record of valid account having a full functionality. The operation 1218 includes a tripwire file providing a limited benefit into a protected set of files that includes at least one regular file providing a full benefit.

FIG. 35 illustrates another embodiment of the exemplary operational flow 1200 of FIG. 33. The implanting operation 1210 may include at least one additional operation. The at least one additional operation may include an operation 1222, an operation 1224, and/or an operation 1226. The operation 1222 includes a tripwire file misleadingly appearing to allow provision of a benefit to a beneficiary into a protected set of files that includes at least one regular file actually allowing provision of the benefit to another beneficiary. The operation 1224 includes a tripwire file facilitating provision of a token and/or de minimis benefit into a protected set of files that includes at least one regular file facilitating provision of a full benefit. The operation 1226 includes a tripwire file subtype into a protected set of files that includes at least one normal file subtype.

FIG. 36 illustrates a further embodiment of the exemplary operational flow 1200 of FIG. 33. The implanting operation 1210 may include at least one additional operation. The at least one additional operation may include an operation 1228, and/or an operation 1232. The operation 1228 includes a tripwire file subtype into a protected set of files that includes at least one normal file subtype, wherein the tripwire file includes data and/or a characteristic usable in discriminating between a tripwire file subtype and an normal file subtype. The operation 1232 includes a tripwire file and a tripwire file identification tool into a protected set of files that includes at least one normal file. The operation 1232 may include at least one additional operation, such as an operation 1234. The operation 1234 causes a tripwire file to be included in a protected set of files that includes at least one normal file and causes a tripwire file identification tool to be included another set of files.

FIG. 37 illustrates an alternative embodiment of the exemplary operational flow 1200 of FIG. 33. The implanting operation 1210 may include at least one additional operation. The at least one additional operation may include an operation 1236, and/or an operation 1238. The operation 1236 includes a tripwire file into a protected set of files that includes at least one normal file. The tripwire file is at least substantially lacking at least one of a name, an attribute, an association, an operation, an interaction, a collaboration, a visibility, a state, a generalization, a relationship, and/or a responsibility element present in the at least one normal file. The operation 1238 includes a tripwire file into a protected set of files that includes at least one normal file. The tripwire file has at least one of a name, an attribute, an association, an operation, an interaction, a collaboration, a visibility, a state, a generalization, a relationship, and/or a responsibility that is at least substantially different from each file of the at least one normal file.

FIG. 38 illustrates another embodiment of the exemplary operational flow 1200 of FIG. 33. The implanting operation 1210 may include at least one additional operation. The at least one additional operation may include an operation 1242, and/or an operation 1244. The operation 1242 includes a tripwire file in a protected set of files that includes at least one normal file. The tripwire file has a property that does not facilitate return of an approval code in response to a credit card authorization request. Each normal file of the at least one normal file has a property that does facilitate return of an approval code in response to a credit card authorization request. The operation 1244 includes a tripwire file into a protected set of files that includes at least one normal file. The tripwire file has a property that does not facilitate a return of an approval in response to a health insurance claim. Each normal file of the at least one normal file has a property that does facilitate a return of an approval in response to a health insurance claim.

FIG. 39 illustrates a further embodiment of the exemplary operational flow 1200 of FIG. 33. The implanting operation 1210 may include at least one additional operation, such as the operation 1246. The operation 1246 includes in a protected set of files a tripwire file having a usability at least substantially limited to facilitating detection of a security breach of the protected set of files. The transmission operation 1260 may include at least one additional operation, such as the operation 1262. The operation 1262 facilitates a communication to a second party of at least a portion of the protected set of files in at least one of an untransformed, a transformed, and/or a secure configuration.

FIG. 40 illustrates an alternative embodiment of the exemplary operational flow 1200 of FIG. 33. The communication operation 1270 may include at least one additional operation. The at least one additional operation may include an operation 1272, and/or an operation 1274. The operation 1272 receives a signal originated by at least one of the second party and/or by a third party and indicating an occurrence of an activity related to the tripwire file. The operation 1274 receives a signal indicating an occurrence of an activity related to the tripwire file. The activity includes at least one of a credit card charge authorization request, an information request, an account attribute change request, a funds transfer request, an inquiry, a query, a charge, a transaction, a transfer request, a deposit, a claim, a correction, a change of attributes request, a payment, a refund request, and/or a benefit transfer related to the tripwire file.

FIG. 41 illustrates another embodiment of the exemplary operational flow 1200 of FIG. 33. The operational flow may include at least one additional operation 1290. The at least one additional operation may include an operation 1292, and/or an operation 1294. The operation 1292 in response to the receiving a signal indicating an occurrence of an activity related to the tripwire file, generates a human-perceivable signal indicating an occurrence of an unauthorized activity related to the protected set of files. The operation 1294 facilitates an application of a security measure to the protected set of files in response to the receiving a signal indicating an occurrence of an activity related to the tripwire file.

FIG. 42 illustrates a partial view of an exemplary computer program product 1300. The computer program product includes program instruction 1304 and a computer-readable signal-bearing medium 1302 bearing the program instructions. The computer program product encodes the computer program instructions as computer executable instructions operable to perform a process in a computing device. The process includes a tripwire file into a protected set of files that includes at least one normal file. The process also facilitates a communication to a second party of at least a portion of the protected set of files. The process further receives a signal indicating an occurrence of an activity related to the tripwire file.

In an alternative embodiment, the process further includes generating 1306 a signal indicating an occurrence of an unauthorized activity related to the protected set of files in response to the received signal indicating an occurrence of an activity related to the tripwire file. In another embodiment, the process further includes facilitating 1308 application of a security measure to the protected set of files in response to the received signal indicating an occurrence of an activity related to the tripwire file. In an alternative embodiment, the computer program product 1300 may be implemented in hardware, software, and/or firmware.

In a further embodiment, the computer-readable signal-bearing medium includes a computer storage medium 1312. In another embodiment, the computer-readable signal-bearing medium includes a communication medium 1314.

Figure 43:
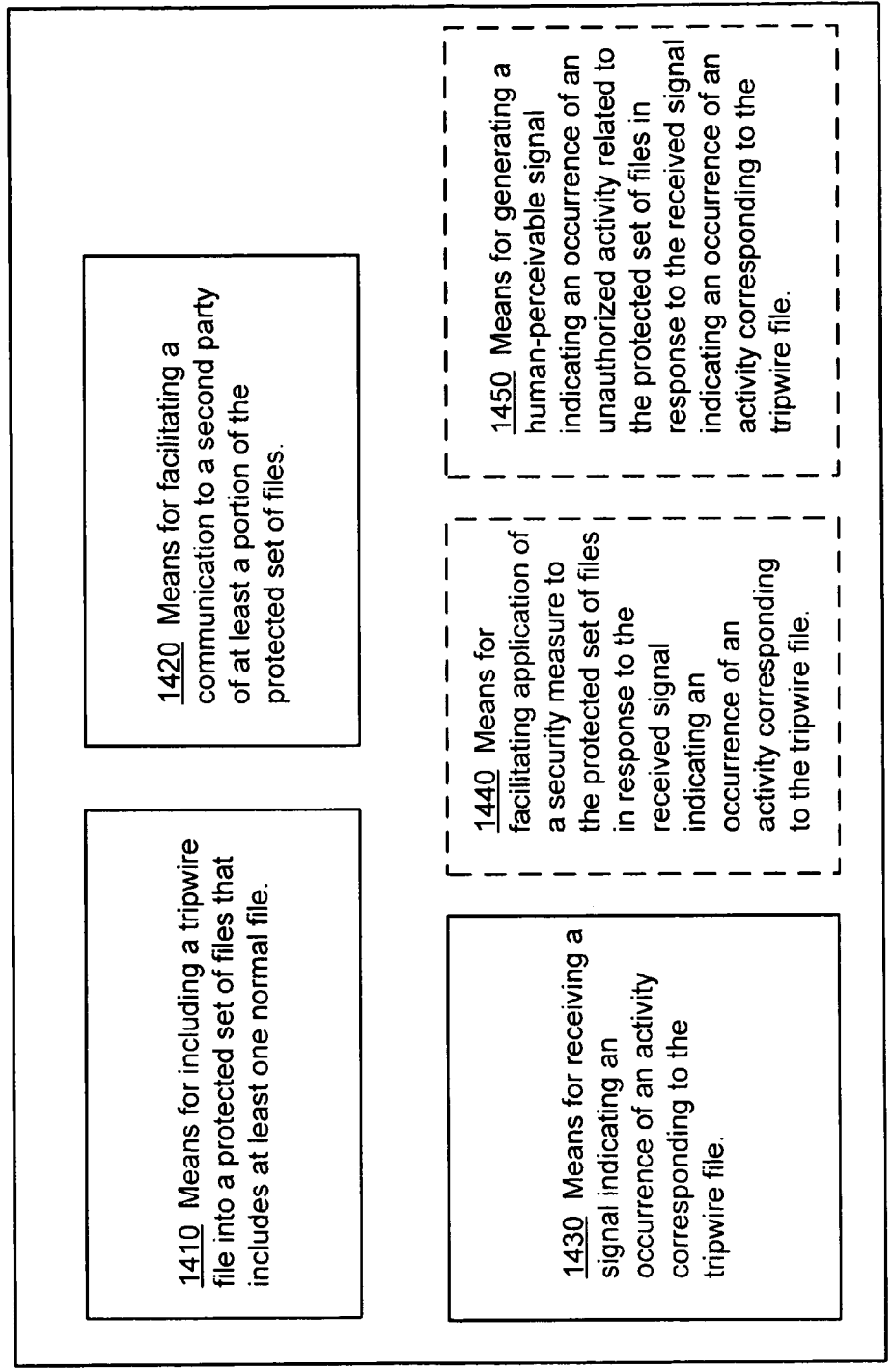
FIG. 43 illustrates a partial view of an exemplary apparatus that may implement embodiments.

FIG. 43 illustrates a partial view of an exemplary apparatus 1400 that may implement embodiments. The apparatus includes a means 1410 for including a tripwire file into a protected set of files that includes at least one normal file. The apparatus also includes a means 1420 for facilitating a communication to a second party of at least a portion of the protected set of files. The apparatus further includes a means 1430 for receiving a signal indicating an occurrence of an activity corresponding to the tripwire file.

In an alternative embodiment, the apparatus includes a means 1440 for facilitating application of a security measure to the protected set of files in response to the received signal indicating an occurrence of an activity corresponding to the tripwire file. In another embodiment, the apparatus includes a means 1450 for generating a human-perceivable signal indicating an occurrence of an unauthorized activity related to the protected set of files in response to the received signal indicating an occurrence of an activity corresponding to the tripwire file.

Figure 44:
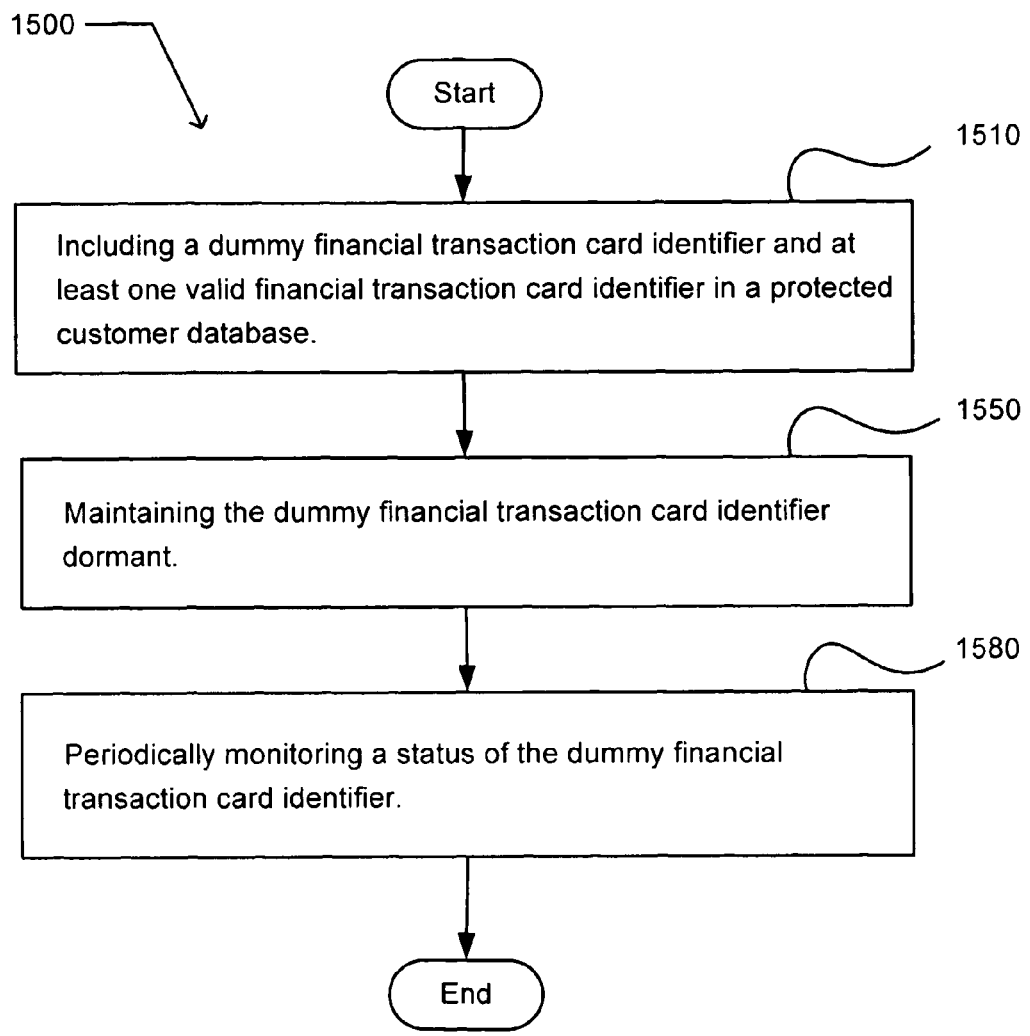
FIG. 44 illustrates a partial view of an exemplary operational flow in which embodiments may be implemented.

FIG. 44 illustrates a partial view of an exemplary operational flow 1500 in which embodiments may be implemented. After a start operation, the operational flow moves to a snare placement operation 1510. The snare placement operation includes a dummy financial transaction card identifier and at least one valid financial transaction card identifier in a protected customer database. The inclusion of the dummy financial transaction card identifier and the at least one valid financial transaction card identifier in a protected database may be accomplished in any manner. In one embodiment, the dummy financial transaction card identifier may be added to a protected database that already includes the valid financial transaction card identifier. In another embodiment, the valid financial transaction card identifier may be added to a protected database that already includes the dummy financial transaction card identifier. In a further embodiment, the dummy financial transaction card identifier and the valid financial transaction card identifier may be saved in the protected database at about the same time. A concealment operation 1550 maintains the dummy financial transaction card identifier dormant. A trapping operation 1580 periodically monitors a status of the dummy financial transaction card identifier. The operational flow then moves to an end operation.

Figure 45:
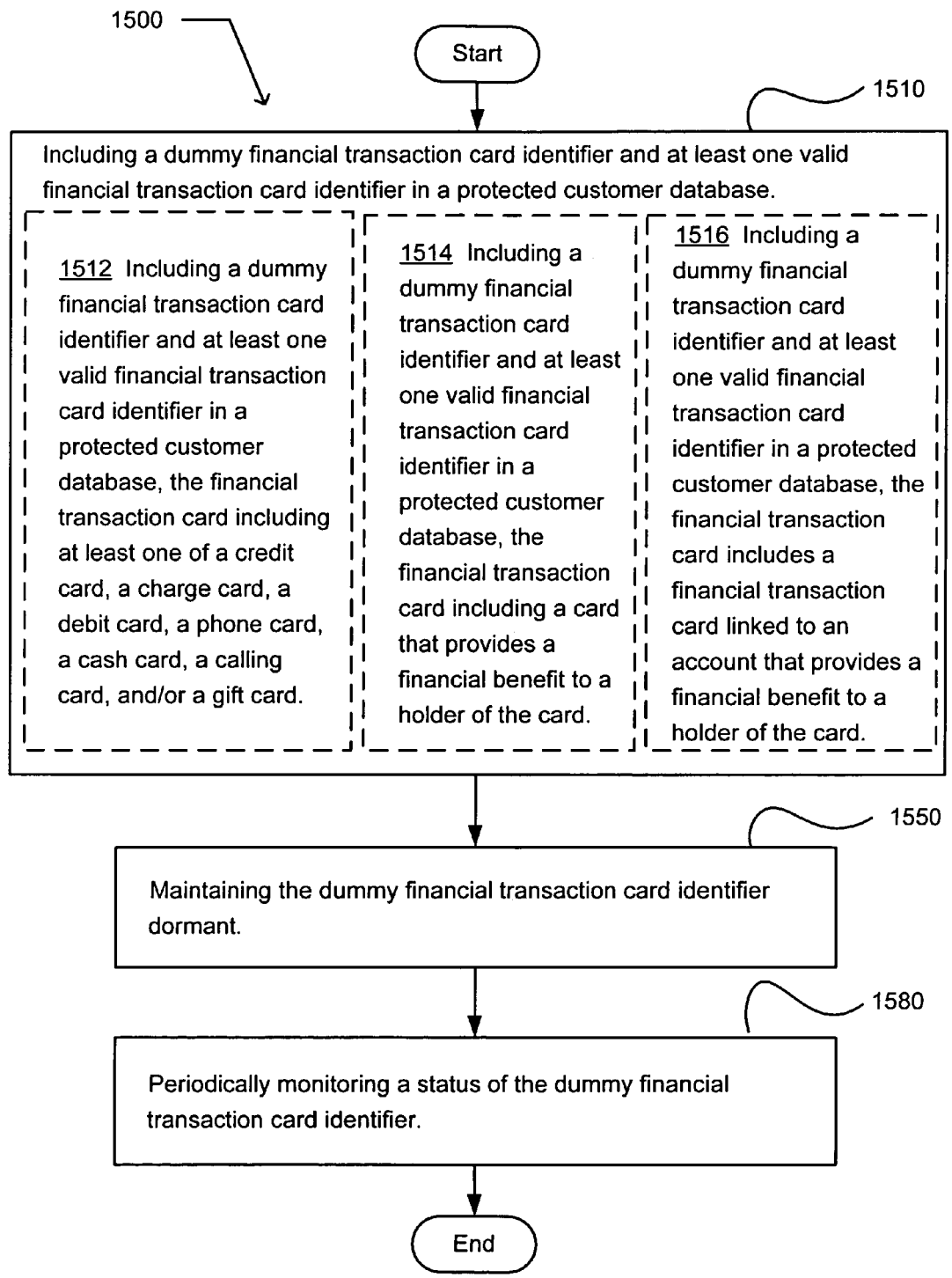
FIG. 45 illustrates an alternative embodiment of the exemplary operational flow of FIG. 44.

FIG. 45 illustrates an alternative embodiment of the exemplary operational flow 1500 of FIG. 44. The snare placement operation 1510 may include at least one additional operation. The at least one additional operation may include an operation 1512, an operation 1514, and/or an operation 1516. The operation 1512 includes a dummy financial transaction card identifier and at least one valid financial transaction card identifier in a protected customer database. The financial transaction card including at least one of a credit card, a charge card, a debit card, a phone card, a cash card, a calling card, and/or a gift card. The operation 1514 includes a dummy financial transaction card identifier and at least one valid financial transaction card identifier in a protected customer database. The financial transaction card includes a financial transaction card that provides a financial benefit to a holder of the card. The operation 1516 includes a dummy financial transaction card identifier and at least one valid financial transaction card identifier in a protected customer database. The financial transaction card includes a financial transaction card linked to an account that provides a financial benefit to a holder of the card.

Figure 46:
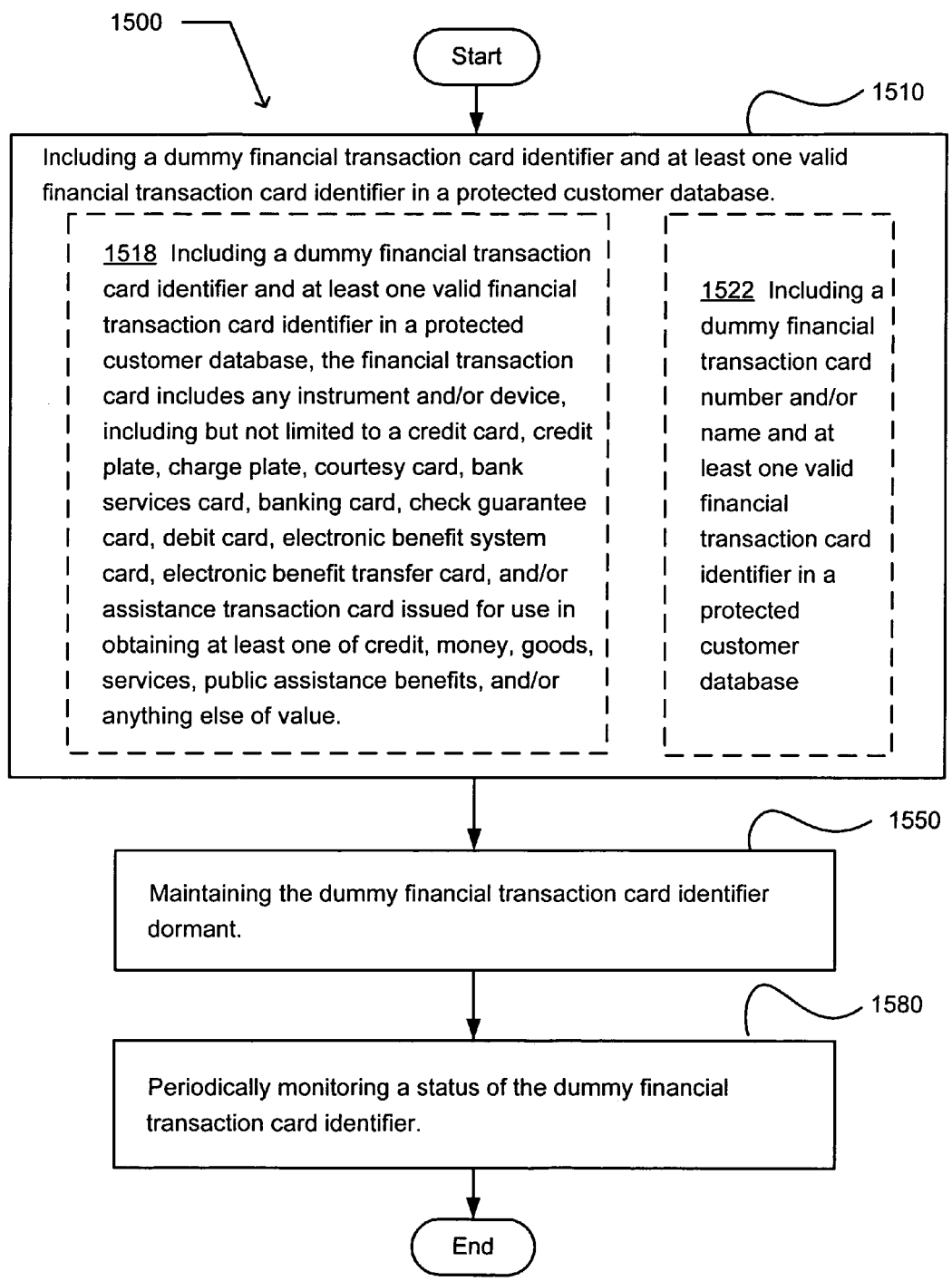
FIG. 46 illustrates an alternative embodiment of the exemplary operational flow of FIG. 44.

FIG. 46 illustrates an alternative embodiment of the exemplary operational flow 1500 of FIG. 44. The snare placement operation 1510 may include at least one additional operation. The at least one additional operation may include an operation 1518, and/or an operation 1522. The operation 1518 includes a dummy financial transaction card identifier and at least one valid financial transaction card identifier in a protected customer database. The financial transaction card includes any instrument and/or device, including but not limited to a credit card, credit plate, charge plate, courtesy card, bank services card, banking card, check guarantee card, debit card, electronic benefit system card, electronic benefit transfer card, and/or assistance transaction card issued for use in obtaining at least one of credit, money, goods, services, public assistance benefits, and/or anything else of value. The operation 1522 includes a dummy financial transaction card number and/or name and at least one valid financial transaction card identifier in a protected customer database.

Figure 47:
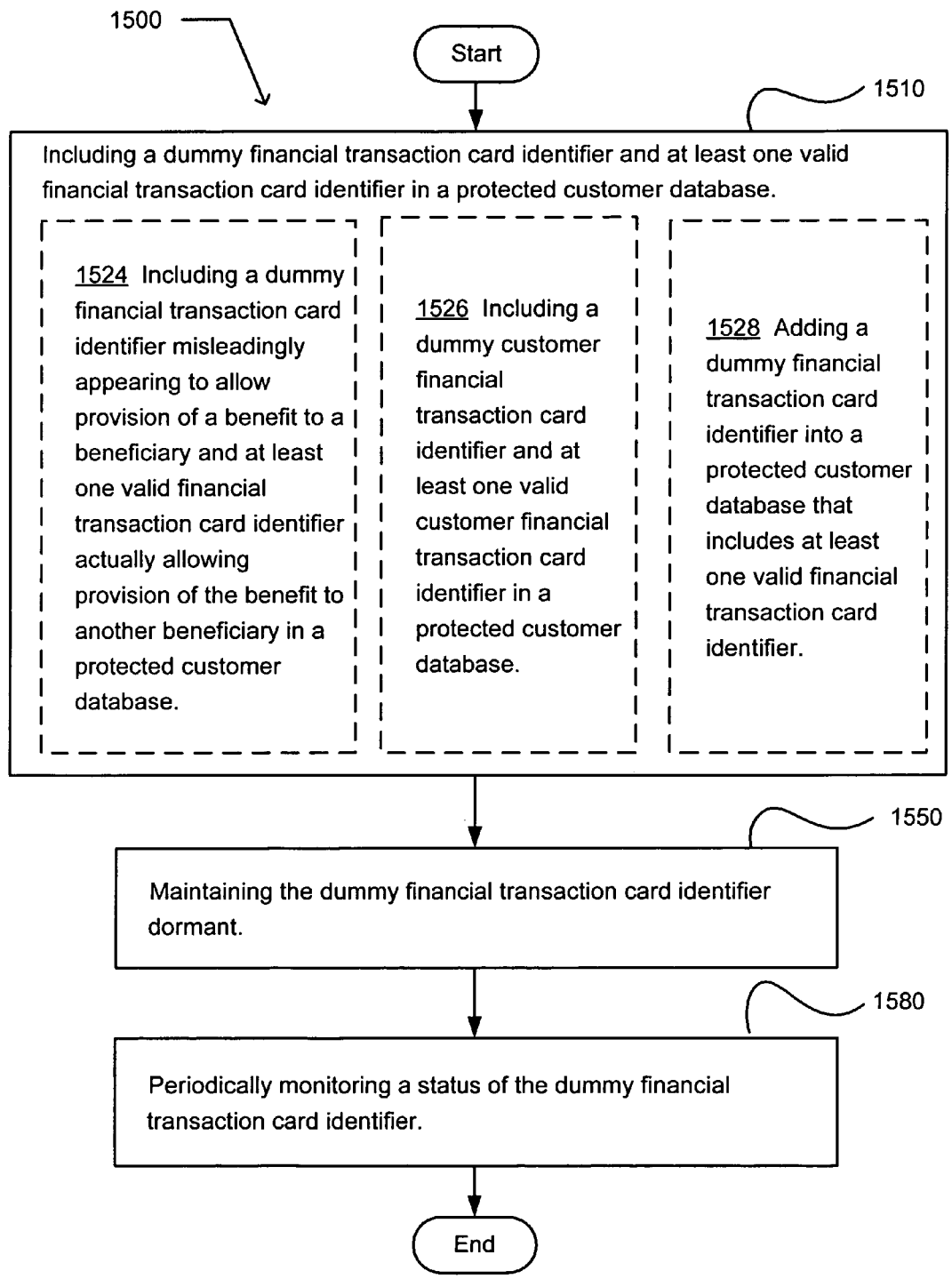
FIG. 47 illustrates another embodiment of the exemplary operational flow of FIG. 44.

FIG. 47 illustrates another embodiment of the exemplary operational flow 1500 of FIG. 44. The snare placement operation 1510 may include at least one additional operation. The at least one additional operation may include an operation 1524, an operation 1526, and/or an operation 1528. The operation 1524 includes a dummy financial transaction card identifier misleadingly appearing to allow provision of a benefit to a beneficiary and at least one valid financial transaction card identifier actually allowing provision of the benefit to another beneficiary in a protected customer database. The operation 1526 includes a dummy customer financial transaction card identifier and at least one valid customer financial transaction card identifier in a protected customer database. The operation 1528 adds a dummy financial transaction card identifier into a protected customer database that includes at least one valid financial transaction card identifier.

Figure 48:
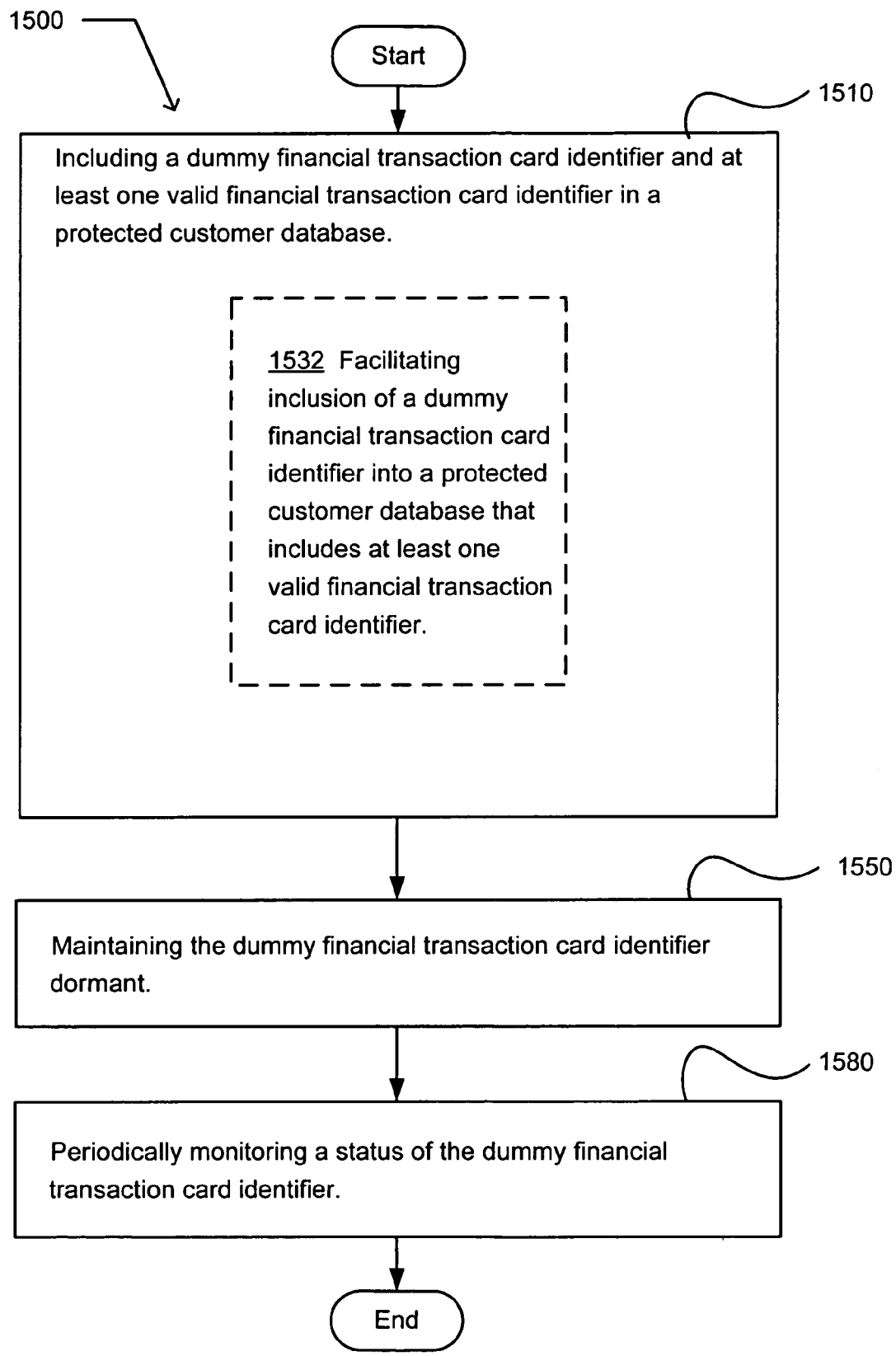
FIG. 48 illustrates an alternative embodiment of the exemplary operational flow of FIG. 44.

FIG. 48 illustrates an alternative embodiment of the exemplary operational flow 1500 of FIG. 44. The snare placement operation 1510 may include at least one additional operation. The at least one additional operation may include an operation 1532. The operation 1532 facilitates inclusion of a dummy financial transaction card identifier into a protected customer database that includes at least one valid financial transaction card identifier.

Figure 49:
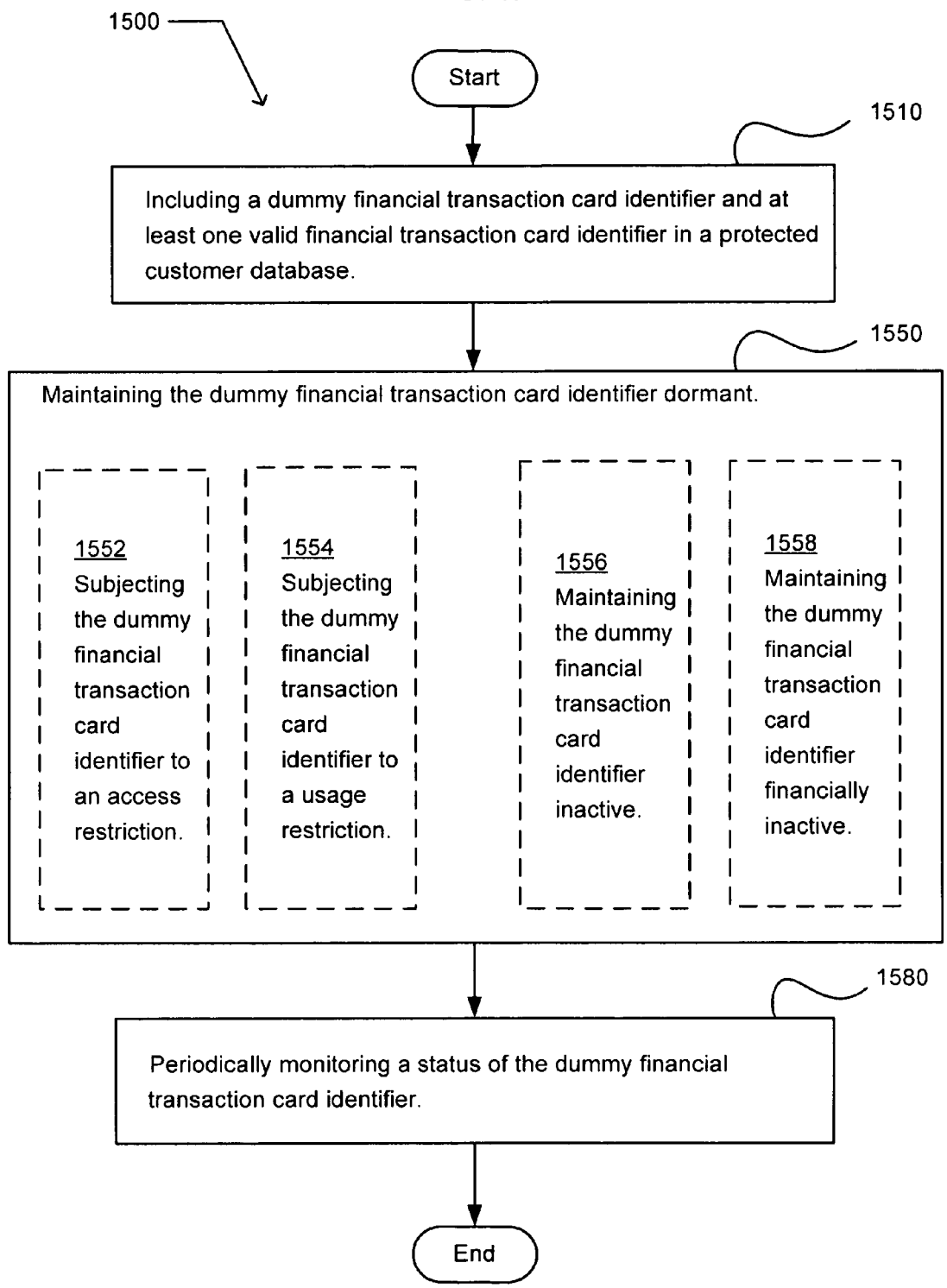
FIG. 49 illustrates an alternative embodiment of the exemplary operational flow of FIG. 44.

FIG. 49 illustrates an alternative embodiment of the exemplary operational flow 1500 of FIG. 44. The concealment operation 1550 may include at least one additional operation. The at least one additional operation may include an operation 1552, an operation 1554, an operation 1556, and/or an operation 1558. The operation 1552 subjects the dummy financial transaction card identifier to an access restriction. For example, the access restriction may limit access to the dummy financial transaction card identifier only to persons having a high-level security clearance. The operation 1554 subjects the dummy financial transaction card identifier to a usage restriction. For example, the usage restriction may limit use of the dummy financial transaction card identifier to a single person for testing purposes only. The operation 1556 maintains the dummy financial transaction card identifier inactive. For example, inactivity may be maintained by blocking any changes to an aspect of the dummy financial transaction card identifier, such as a customer name, a mailing address, and/or a credit limit. The operation 1558 maintains the dummy financial transaction card identifier financially inactive.

Figure 50:
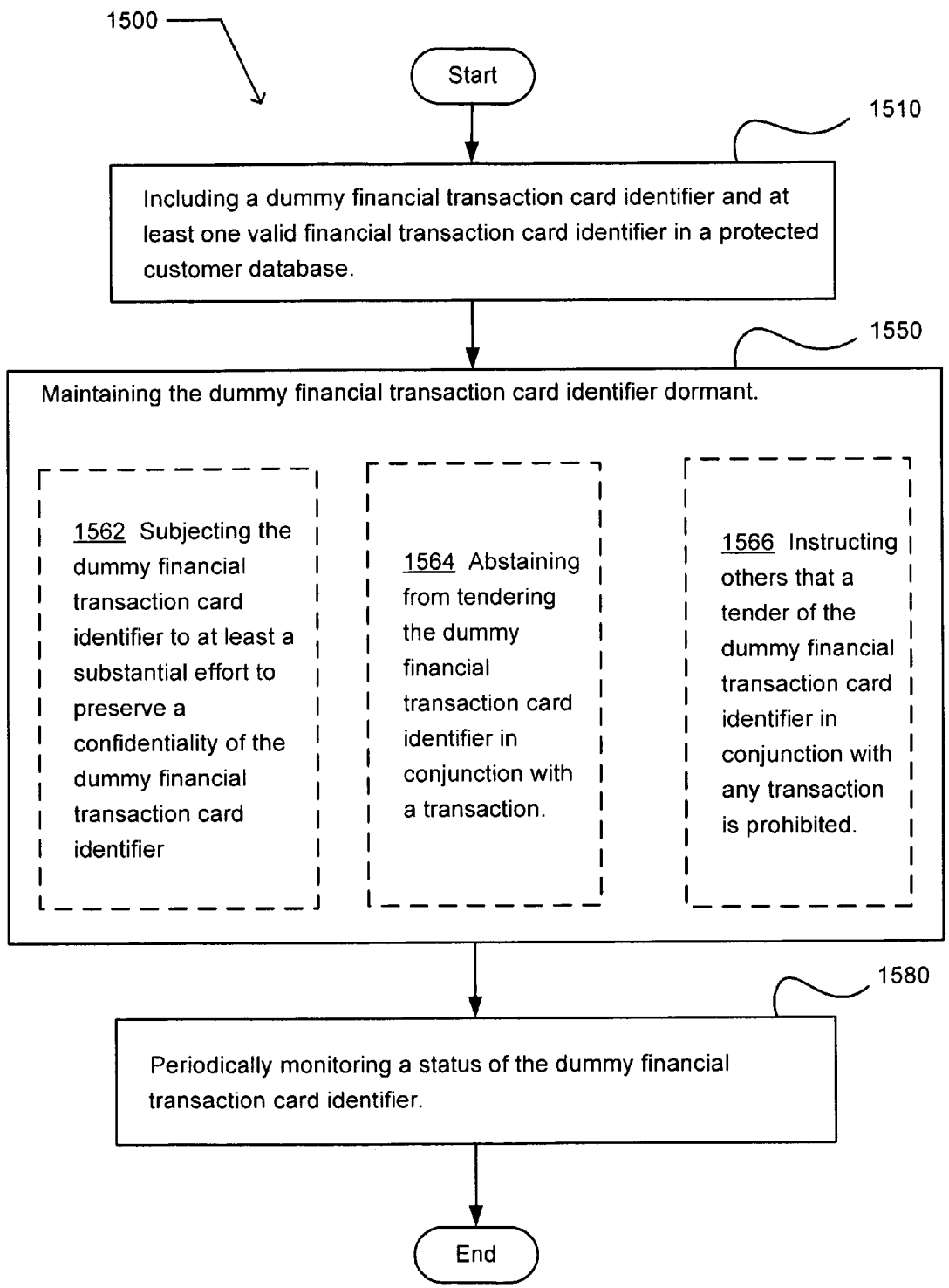
FIG. 50 illustrates another embodiment of the exemplary operational flow of FIG. 44.

FIG. 50 illustrates another embodiment of the exemplary operational flow 1500 of FIG. 44. The concealment operation 1550 may include at least one additional operation. The at least one additional operation may include an operation 1562, an operation 1564, and/or an operation 1566. The operation 1562 subjects the dummy financial transaction card identifier to at least a substantial effort to preserve a confidentiality of the dummy financial transaction card identifier. The operation 1564 abstains from tendering the dummy financial transaction card identifier in conjunction with a transaction. The operation 1566 instructs others that a tender of the dummy financial transaction card identifier in conjunction with any transaction is prohibited.

Figure 51:
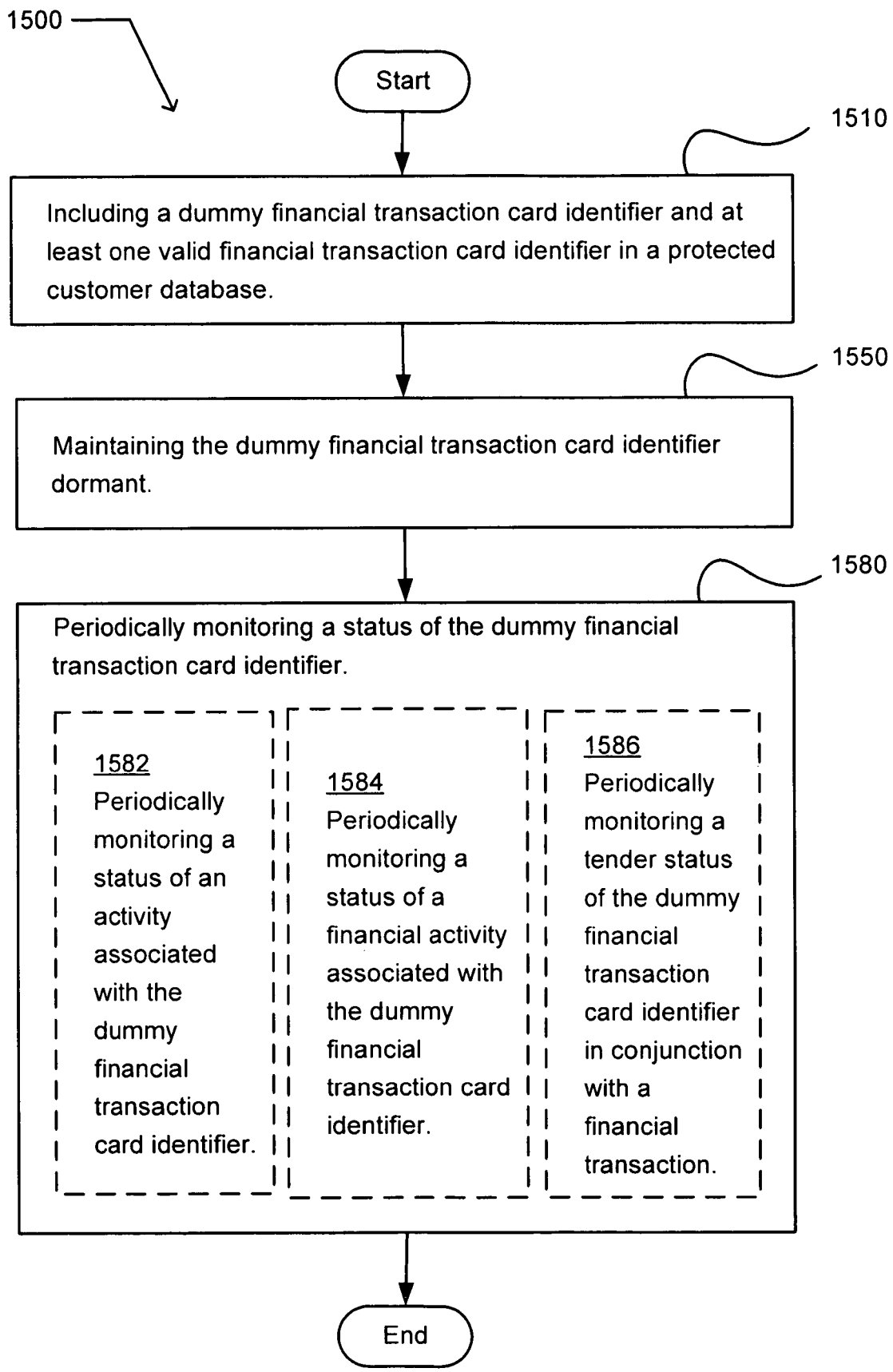
FIG. 51 illustrates a further embodiment of the exemplary operational flow of FIG. 44.

FIG. 51 illustrates a further embodiment of the exemplary operational flow 1500 of FIG. 44. The trapping operation 1580 may include at least one additional operation. The at least one additional operation may include an operation 1582, an operation 1584, and/or an operation 1586. The operation 1582 periodically monitors a status of an activity associated with the dummy financial transaction card identifier. The operation 1854 periodically monitors a status of a financial activity associated with the dummy financial transaction card identifier. The operation 1586 periodically monitors a tender status of the dummy financial transaction card identifier in conjunction with a financial transaction.

Figure 52:
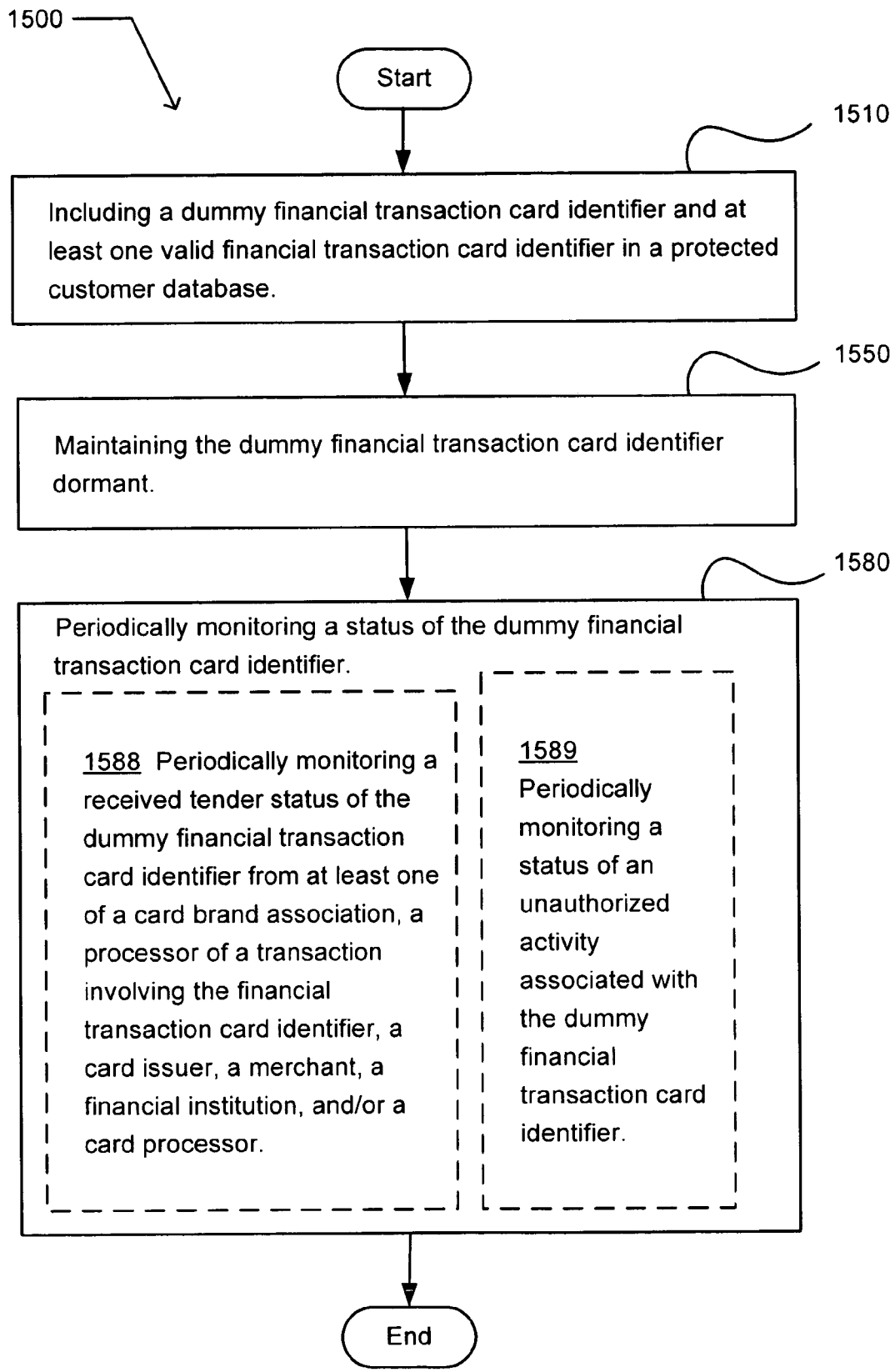
FIG. 52 illustrates another embodiment of the exemplary operational flow of FIG. 44.

FIG. 52 illustrates another embodiment of the exemplary operational flow 1500 of FIG. 44. The trapping operation 1580 may include at least one additional operation. The at least one additional operation may include an operation 1588, and/or an operation 1589. The operation 1588 periodically monitors a received tender status of the dummy financial transaction card identifier from at least one of a card brand association, a processor of a transaction involving the financial transaction card identifier, a card issuer, a merchant, a financial institution, and/or a card processor. For example, a tender status of the dummy financial transaction card identifier may include at least one of the Merchant's point of sale unit 410 of FIG. 18 having received the dummy financial transaction card identifier; the Merchant's point of sale unit having communicated an "authorization request" related to the dummy financial transaction card identifier; the Processor 420 having received an "authorization request" related to the dummy financial transaction card identifier; the Processor having communicated an "authorization request" related to the dummy financial transaction card identifier; Card-Issuing Bank 430 having received an "authorization request" related to the dummy financial transaction card identifier; and/or the Card-Issuing Bank 430 having communicated an "approval code" related to the dummy financial transaction card identifier. The operation 1589 periodically monitors a status of an unauthorized activity associated with the dummy financial transaction card identifier.

Figure 53:
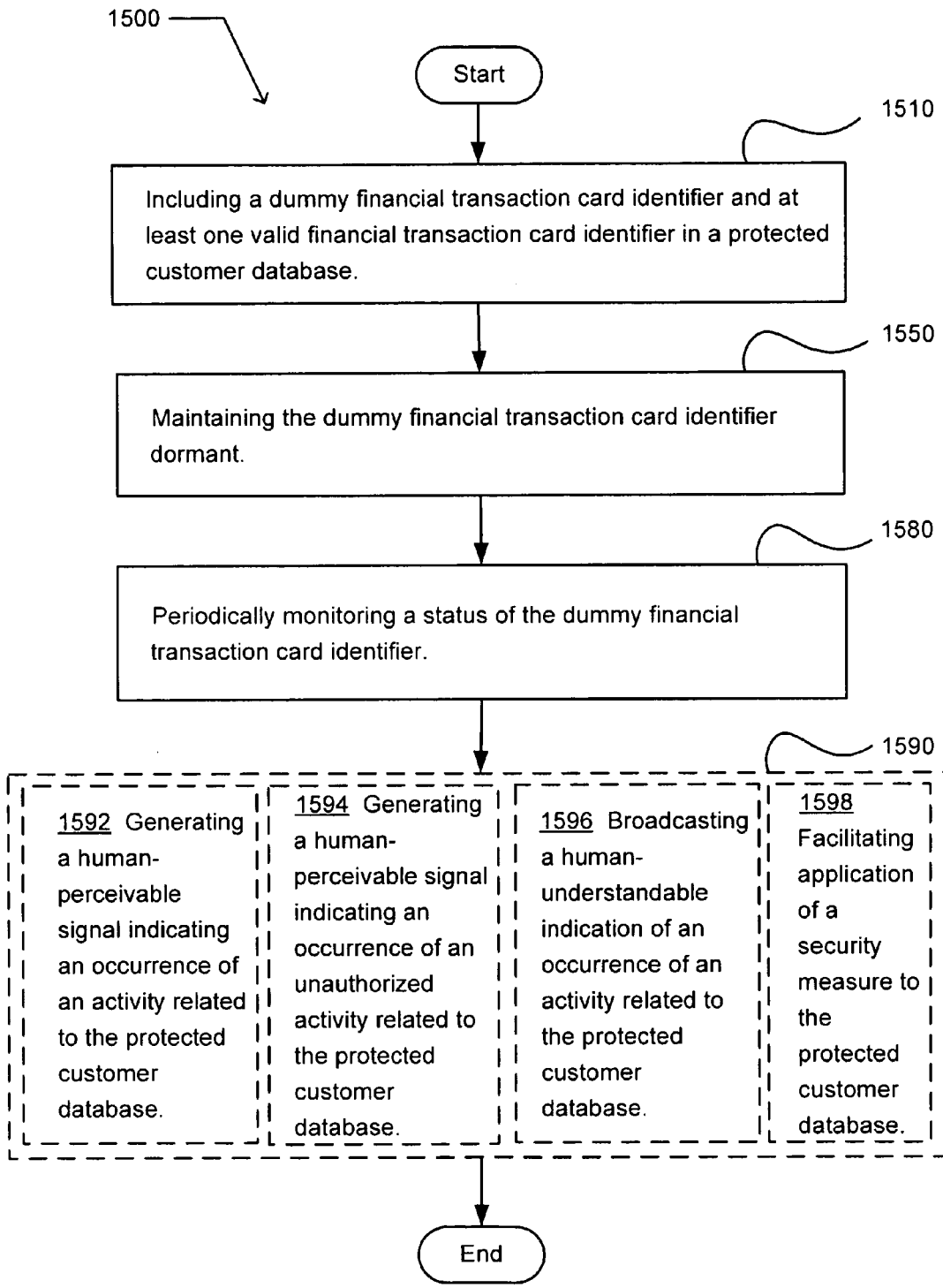
FIG. 53 illustrates a further embodiment of the exemplary operational flow of FIG. 44.

FIG. 53 illustrates a further embodiment of the exemplary operational flow 1500 of FIG. 44. The operational flow may include at least one additional operation, illustrated as an operation 1590. The at least one additional operation may include an operation 1592, an operation 1594, an operation 1596, and/or an operation 1598. The operation 1592 generates a human-perceivable signal indicating an occurrence of an activity related to the protected customer database. The operation 1594 generates a human-perceivable signal indicating an occurrence of an unauthorized activity related to the protected customer database. The operation 1596 broadcasts a human-understandable indication of an occurrence of a activity related to the protected customer database. The operation 1598 facilitates application of a security measure to the protected customer database.

Figure 54:
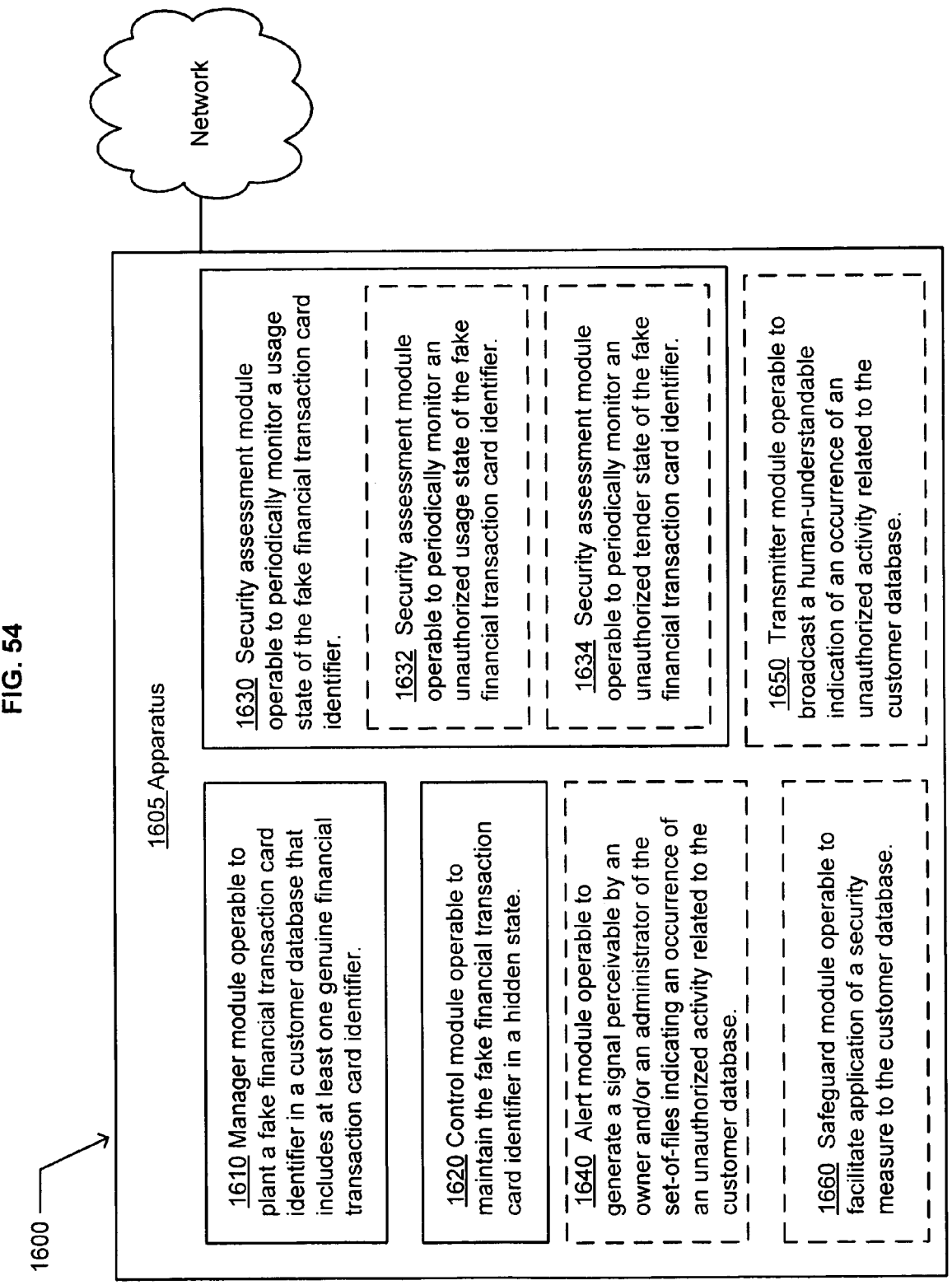
FIG. 54 illustrates an exemplary environment in which embodiments may be implemented.

FIG. 54 illustrates an exemplary environment 1600 in which embodiments may be implemented. The environment includes an apparatus 1605. The apparatus includes a manager module 1610 operable to plant a fake financial transaction card identifier in a customer database that includes at least one genuine financial transaction card identifier. The apparatus also includes a control module 1620 operable to maintain the fake financial transaction card identifier in a hidden state. The apparatus further includes a security assessment module 1630 operable to periodically monitor a usage state of the fake financial transaction card identifier.

In an alternative embodiment, the security assessment module 1640 further includes a security assessment module 1632 operable to periodically monitor an unauthorized usage state of the fake financial transaction card identifier. In another embodiment, the security assessment module further includes a security assessment module 1634 operable to periodically monitor an unauthorized tender state of the fake financial transaction card identifier.

In a further embodiment, the apparatus 1605 includes an alert module 1640 operable to generate a signal perceivable by an owner and/or an administrator of the set-of-files indicating an occurrence of an unauthorized activity related to the customer database. In another embodiment, the apparatus includes a transmitter module 1650 operable to broadcast a human-understandable indication of an occurrence of an unauthorized activity related to the customer database. In a further embodiment, the apparatus includes a safeguard module 1660 operable to facilitate application of a security measure to the customer database.

Figure 55:
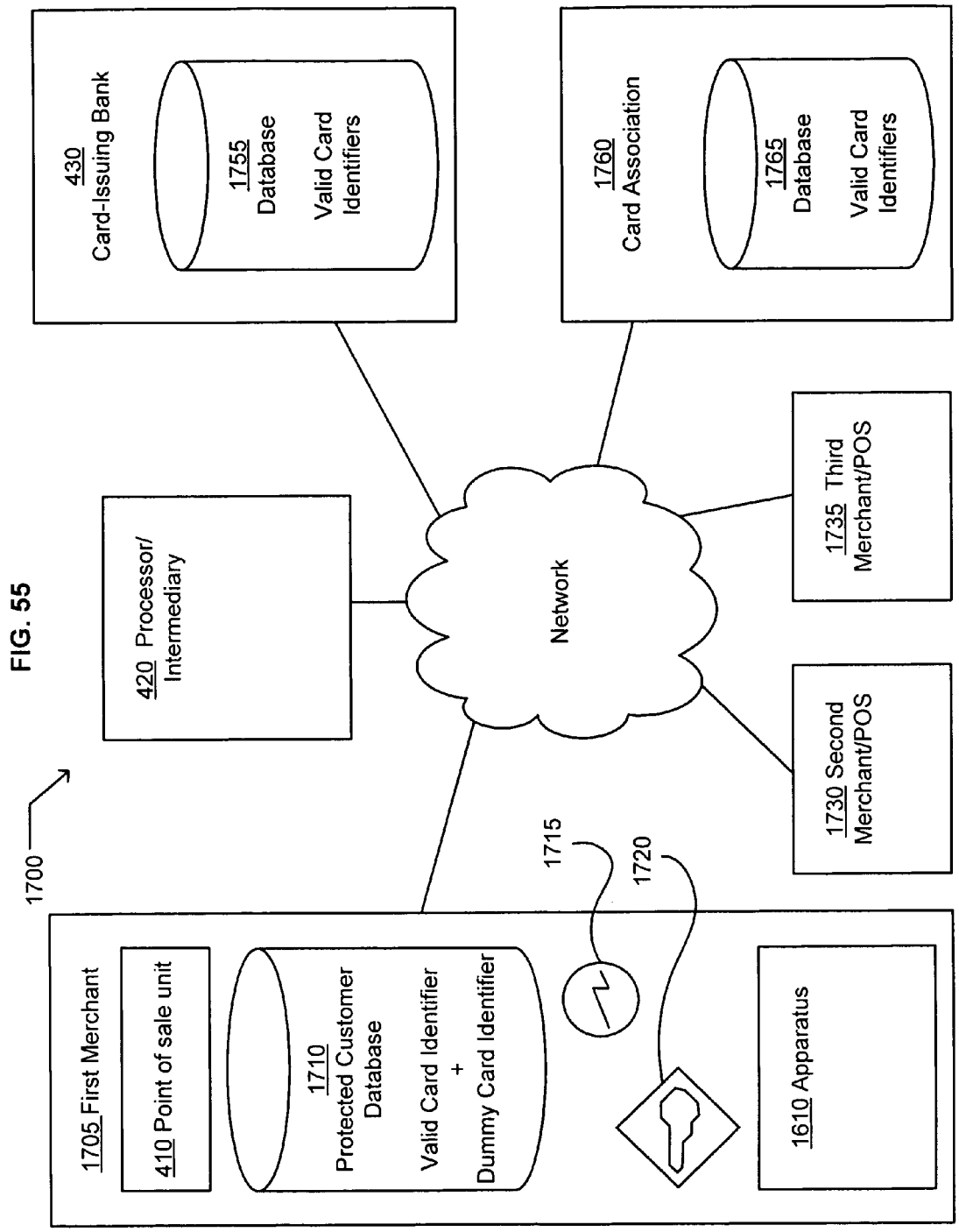
FIG. 55 partially illustrates an exemplary environment in which embodiments of the operational flow of FIG. 44 and/or the apparatus of FIG. 54 may be implemented.

FIG. 55 partially illustrates an exemplary environment 1700 in which embodiments of the operational flow 1500 of FIG. 44 and/or the apparatus 1610 of FIG. 54 may be implemented. FIG. 55 illustrates an aspect of the credit card processing system described in conjunction with FIGS. 18A and 18B from a perspective of a merchant, illustrated as a First Merchant 1705. In an embodiment, the First Merchant maintains a protected customer database 1710 that includes a valid financial transaction card identifier for each customer (or genuine card identifier as described in conjunction with FIG. 54). The valid financial transaction card identifier may be acquired in any manner. For example, the identifiers may be acquired from customer transactions handled through the First Merchant's Point of sale unit 410.

The First Merchant 1705 may include a dummy financial transaction card identifier (or a fake card identifier as described in conjunction with FIG. 54) in their protected customer database 1710 by performing the operational flow 1500 described in conjunction with FIG. 44. In an alternative embodiment, the First Merchant may include a dummy financial transaction card identifier in their protected customer database using the apparatus 1610 described in conjunction with FIG. 54. Next, the First Merchant maintains the dummy financial transaction card identifier dormant. For example, the dummy financial transaction card identifier can be kept secret from everyone except an administrator of the customer database. The First Merchant periodically monitors a status of the dummy financial transaction card identifier. For example, the First Merchant can monitor information received from others relating to stolen and fraudulent card use, such as information from the Card-Issuing Bank 430, the Processor 420, and/or others. Appearance of the dummy financial transaction card identifier in such information may be treated by the First Merchant as a change in status of the dummy financial transaction card identifier from a dormant status to a tendered in commerce status. This First Merchant may regard a change in status of the dummy financial transaction card identifier as indicating that a security breach has occurred to their customer database 1710. A human-perceivable signal may be generated using the display 1715 indicating an occurrence of an activity related to the protected customer database. An application of a security measure to the protected customer database may be facilitated using the security tool 1720.

In another embodiment, a prepaid long distance telephone card issuer may include a dummy prepaid telephone card identifier in its protected database that includes genuine prepaid telephone card identifiers. The prepaid long distance telephone card issuer would maintain the dummy prepaid telephone card identifier dormant. The prepaid long distance telephone card issuer can monitor a status of the dummy prepaid telephone card identifier. The monitoring may include monitoring information generated by others indicating stolen or fraudulent prepaid telephone card identifiers. Appearance of the dummy prepaid telephone card identifier in such information may treated by the prepaid long distance telephone card issuer as a change in status of dummy prepaid telephone card identifier from a dormant status to a tendered in commerce status. This change in status of the dummy prepaid telephone card identifier may be regarded by the prepaid long distance telephone card issuer as an indication that a security breach has occurred to their database.

Figure 56:
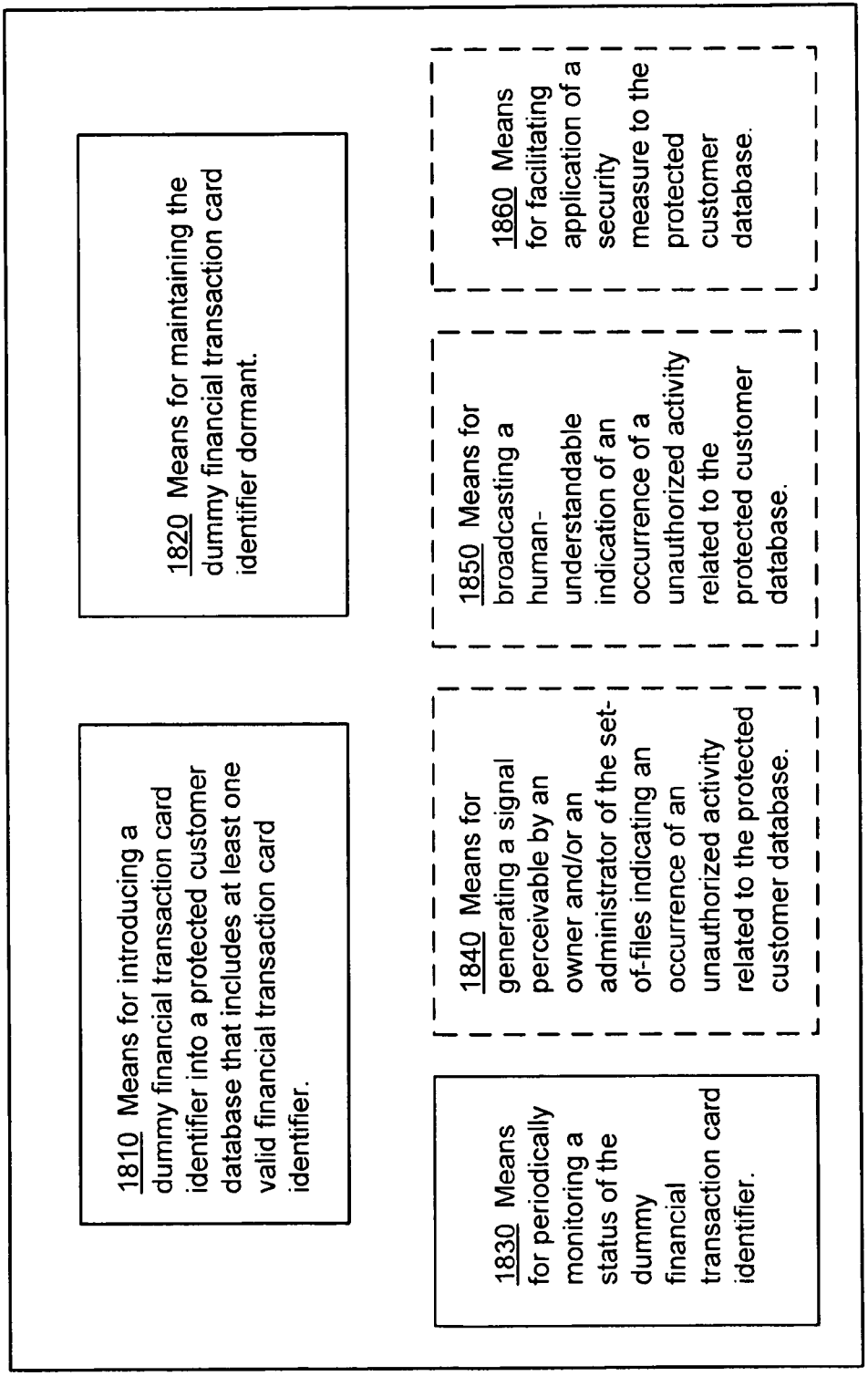
FIG. 56 illustrates an exemplary apparatus that may be used to implement embodiments.

FIG. 56 illustrates an exemplary apparatus 1800 that may be used to implement embodiments. The apparatus includes a means 1810 for introducing a dummy financial transaction card identifier into a protected customer database that includes at least one valid financial transaction card identifier. The apparatus also includes a means 1820 for maintaining the dummy financial transaction card identifier dormant. The apparatus further includes means 1830 for periodically monitoring a status of the dummy financial transaction card identifier.

In an alternative embodiment, the apparatus 1800 includes a means 1840 for generating a signal perceivable by an owner and/or an administrator of the set-of-files indicating an occurrence of an unauthorized activity related to the protected customer database. In another embodiment, the apparatus includes a means 1850 for broadcasting a human-understandable indication of an occurrence of a unauthorized activity related to the protected customer database. In a further means, the apparatus includes a means 1860 for facilitating application of a security measure to the protected customer database.

Figure 57:
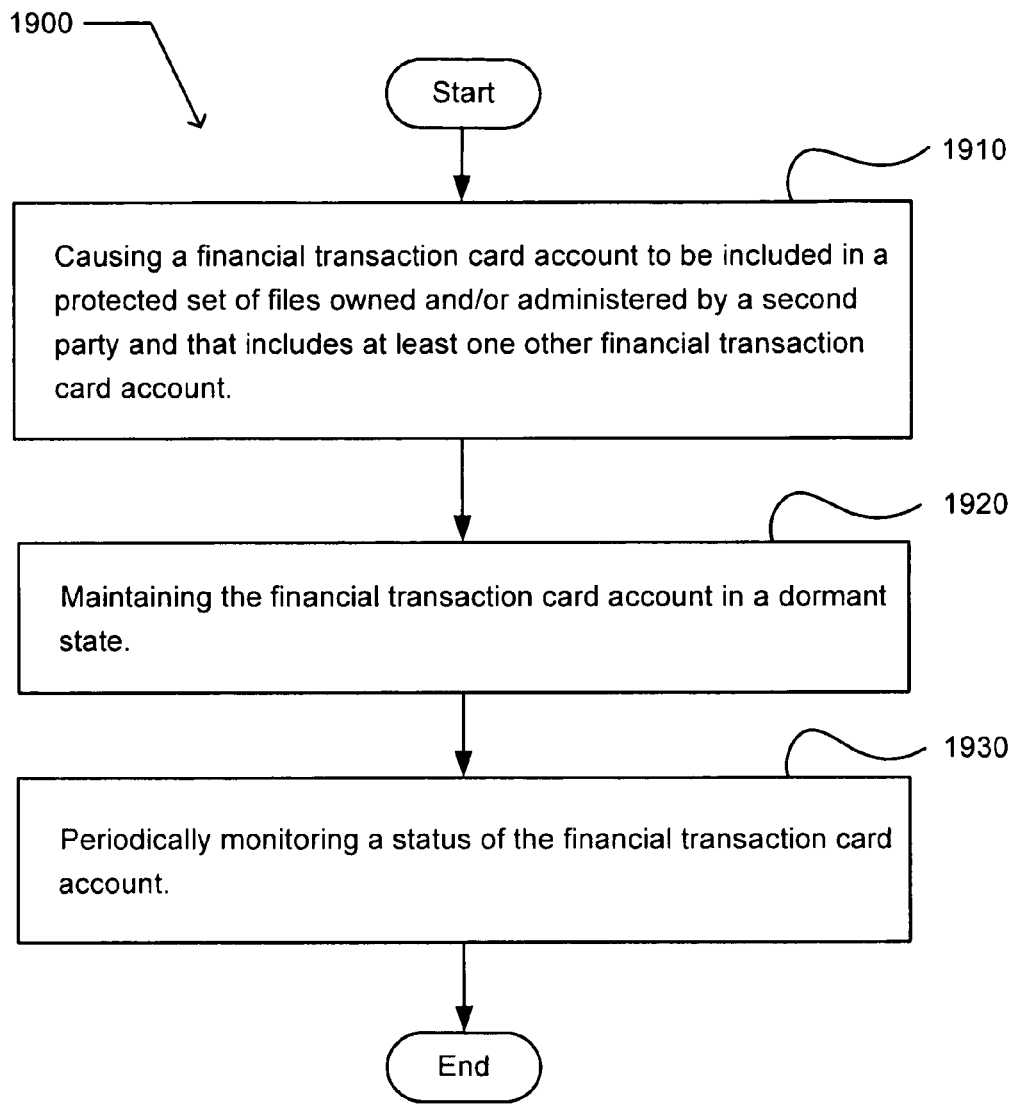
FIG. 57 partially illustrates an exemplary operational flow in which embodiments may be implemented.

FIG. 57 partially illustrates an exemplary operational flow 1900 in which embodiments may be implemented. After a start operation, the operational flow moves to an integration operation 1910. The integration operation causes a financial transaction card account to be included in a protected set of files owned and/or administered by a second party and that includes at least one other financial transaction card account. A confidentiality operation 1920 maintains the financial transaction card account in a dormant state. A sentry operation 1930 periodically monitors a status of the financial transaction card account. The operational flow then moves to an end operation.

Figure 58:
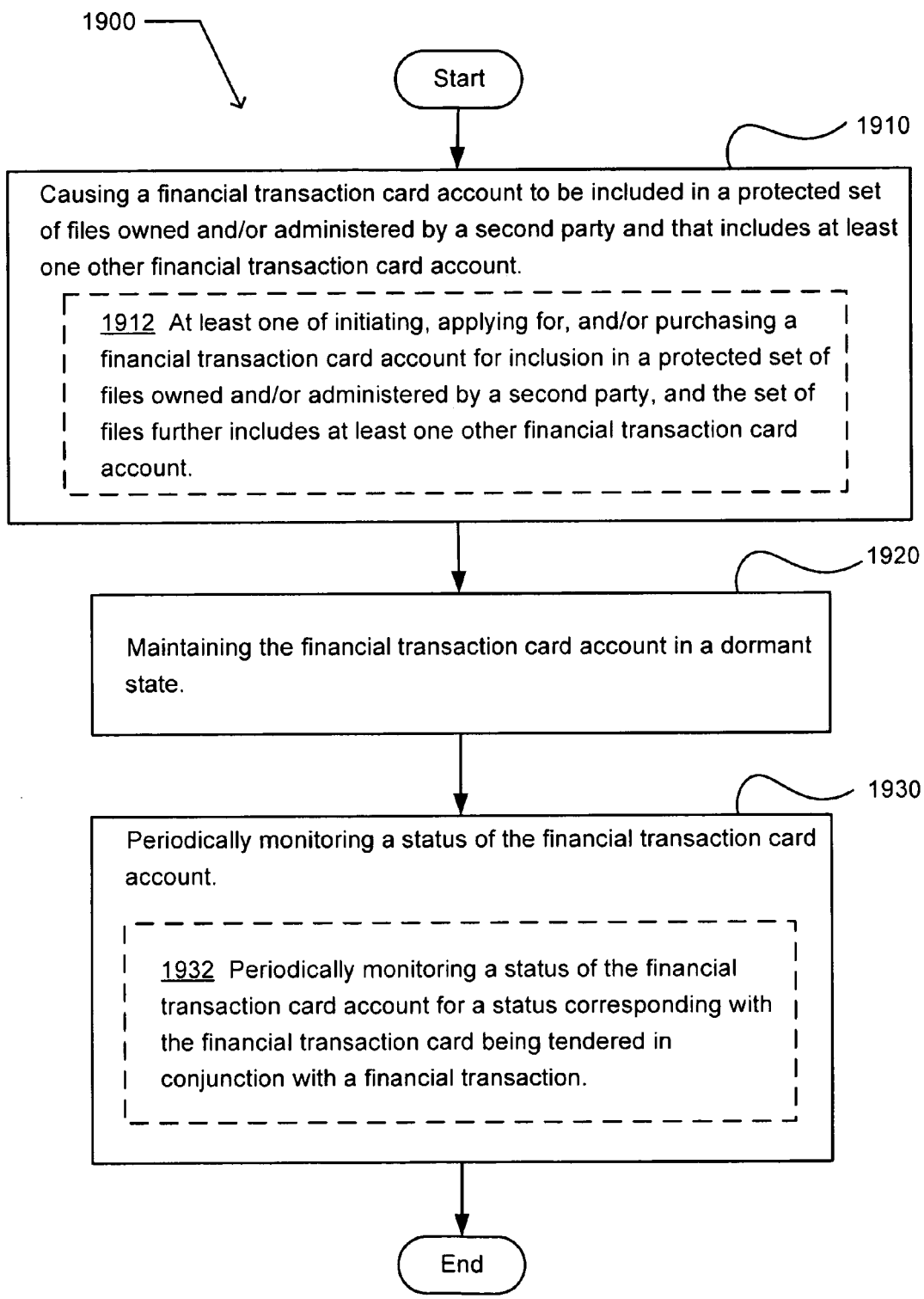
FIG. 58 illustrates an alternative embodiment of the exemplary operational flow of FIG. 57.

FIG. 58 illustrates an alternative embodiment of the exemplary operational flow 1900 of FIG. 57. The integration operation 1910 may include at least one additional operation, such as an operation 1912. At the operation 1912 the causing a financial transaction card account to be included in a protected set of files further includes at least one of initiating, applying for, and/or purchasing a financial transaction card account for inclusion in a protected set of files owned and/or administered by a second party. The set of files further includes at least one other financial transaction card account. The sentry operation 1930 may include at least one additional operation, such as an operation 1932. The operation 1932 periodically monitors a status of the financial transaction card account for a status corresponding with the financial transaction card being tendered in conjunction with a financial transaction.

Figure 59:
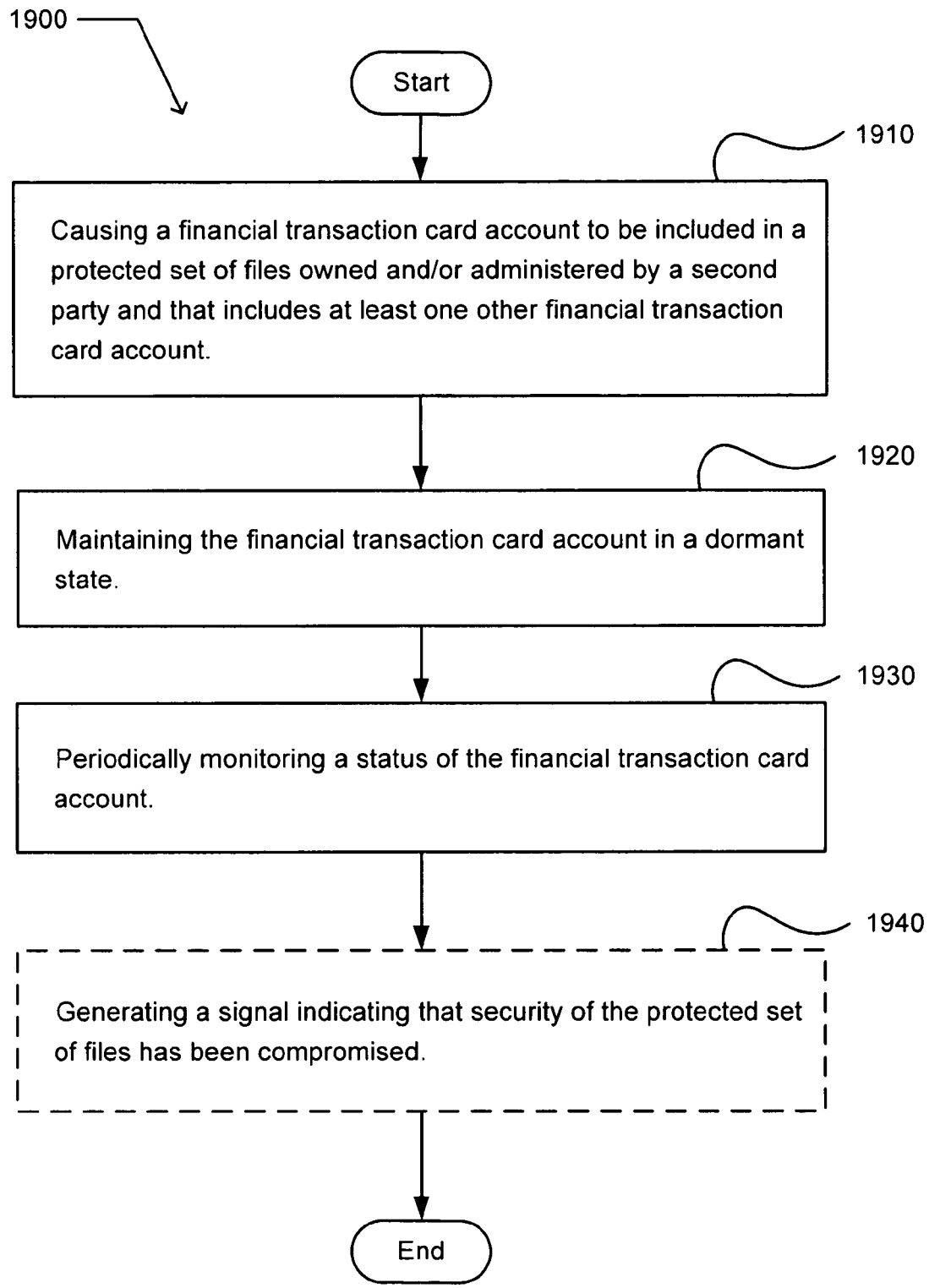
FIG. 59 illustrates an alternative embodiment of the exemplary operational flow of FIG. 57.

FIG. 59 illustrates an alternative embodiment of the exemplary operational flow 1900 of FIG. 57. The operational flow 1900 may include at least one additional operation, such as an operation 1940. The operation 1940 generates a signal indicating that security of the protected set of files has been compromised.

Figure 60:
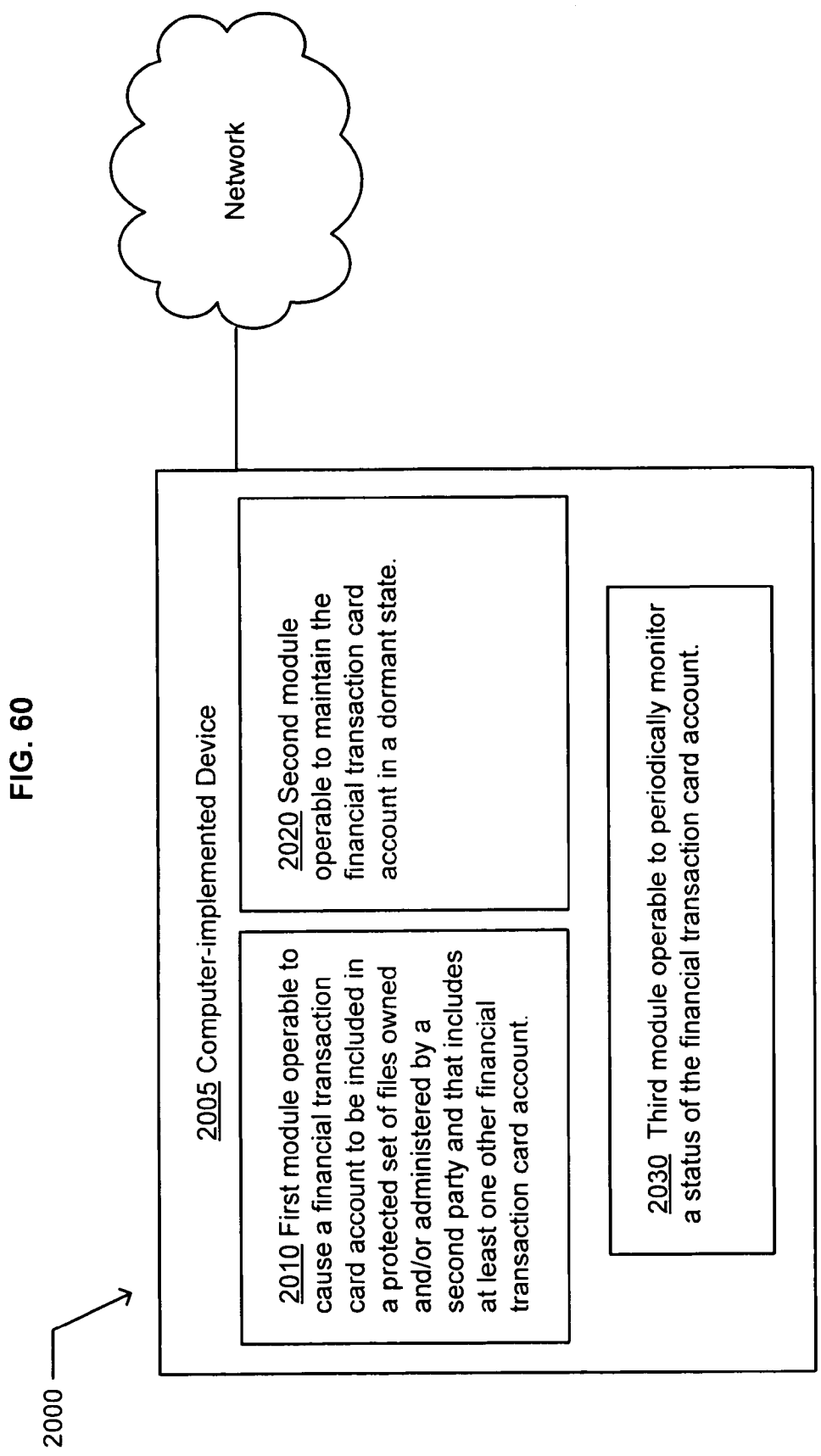
FIG. 60 at least partially illustrates an exemplary embodiment of a system that includes an exemplary computer-implemented device in which embodiments may be implemented.

FIG. 60 illustrates an exemplary embodiment of a system 2000 that includes an exemplary computer-implemented device 2005 in which embodiments may be implemented. The computer-implemented device includes a first module 2010 operable to cause a financial transaction card account to be included in a protected set of files owned and/or administered by a second party. The protected set of files includes at least one other financial transaction card account. The computer-implemented device also includes a second module 2020 operable to maintain the financial transaction card account in a dormant state. The computer-implemented device further includes a third module 2030 operable to periodically monitor a status of the financial transaction card account.

Figure 61:
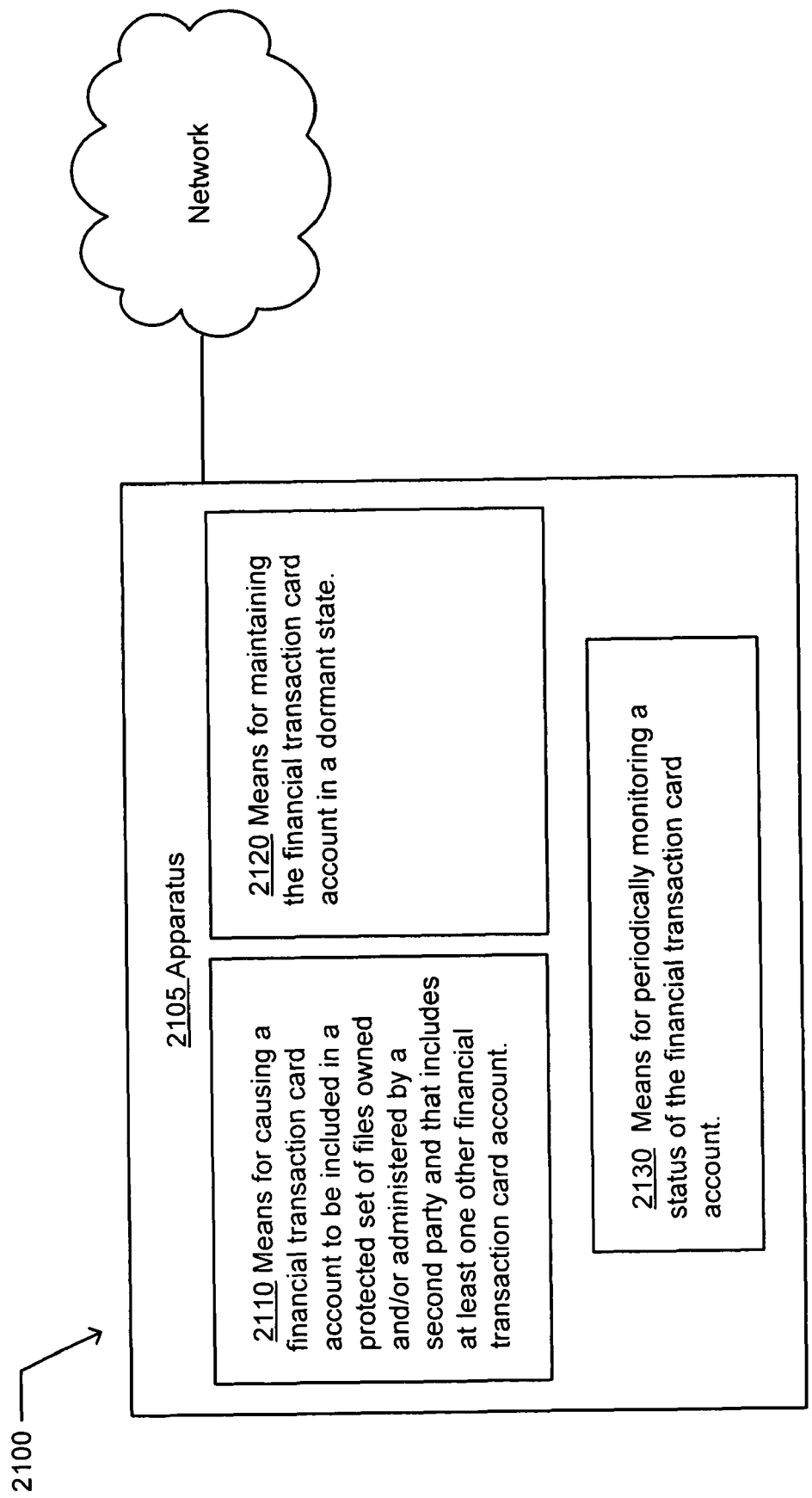
FIG. 61 illustrates an exemplary environment that includes an exemplary apparatus in which embodiments may be implemented.

FIG. 61 illustrates an exemplary environment 2100 that includes an exemplary apparatus 2105 in which embodiments may be implemented. The apparatus includes a means 2110 for causing a financial transaction card account to be included in a protected set of files owned and/or administered by a second party and that includes at least one other financial transaction card account. The apparatus also includes a means 2120 for maintaining the financial transaction card account in a dormant state. The apparatus further includes a means 2130 for periodically monitoring a status of the financial transaction card account.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In addition, those skilled in the art will appreciate that the mechanisms of the subject matter described herein are capable of being distributed as a program product in a variety of forms, and that an illustrative embodiment of the subject matter described herein applies equally regardless of the particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   (a) causing a decoy file to be included in a protected set of files that includes at least one normal file, wherein the causing a decoy file to be included in a protected set of files that includes at least one normal file further includes at least one of:
      (i) causing a decoy file to be included in a protected set of files that includes at least one normal file, the decoy file having a property that does not facilitate a return of an approval code in response to a financial transaction card authorization request and each normal file of the at least one normal file having a property that does facilitate a return of an approval code in response to a financial transaction card authorization request; or
      (ii) causing a decoy file to be included in a protected set of files that includes at least one normal file, the decoy file having a property that does not facilitate a return of an approval in response to a health insurance claim and each normal file of the at least one normal file having a property that does facilitate a return of an approval in response to a health insurance claim;
   (b) detecting an indicium of an activity related to the decoy file, wherein the detecting an indicium of an activity related to the decoy file includes:
      (i) detecting an indicium of at least one or more of an activity related to financial transaction card account, an activity related to a bank account, an activity related to an insurance policy, and an activity related to a license holder that corresponds with the decoy file; and
   (c) generating a signal indicating an occurrence of an unauthorized activity related to the protected set of files in response to the detected indicium of an activity related to the decoy file, wherein at least one of causing, detecting, or generating is at least partially performed using one or more processing devices.

2. The method of claim 1, wherein the causing a decoy file to be included in a protected set of files that includes at least one normal file further includes:
   causing a decoy file to be included in a protected database that includes at least one normal file.

3. The method of claim 1, wherein the causing a decoy file to be included in a protected set of files that includes at least one normal file further includes:
   causing a decoy account having a limited functionality to be included in a protected set of files that includes at least one regular account having a full functionality.

4. The method of claim 1, wherein the causing a decoy file to be included in a protected set of files that includes at least one normal file further includes:
   causing a record of a decoy account having a limited functionality to be included in a protected set of files that includes at least one record of valid account having a full functionality.

5. The method of claim 1, wherein the causing a decoy file to be included in a protected set of files that includes at least one normal file further includes:
   causing a decoy file providing a limited benefit to be included in a protected set of files that includes at least one regular file providing a full benefit.

6. The method of claim 1, wherein the causing a decoy file to be included in a protected set of files that includes at least one normal file further includes:
   causing a decoy file misleadingly appearing to provide a benefit to a beneficiary to be included in a protected set of files that includes at least one regular file actually providing the benefit to another beneficiary.

7. The method of claim 1, wherein the causing a decoy file to be included in a protected set of files that includes at least one normal file further includes:
   causing a decoy file facilitating provision of a token and a de minimis benefit to be included in a protected set of files that includes at least one regular file facilitating provision of a full benefit.

8. The method of claim 1, wherein the causing a decoy file to be included in a protected set of files that includes at least one normal file further includes:
   causing a decoy file subtype to be included in a protected set of files that includes at least one normal file subtype.

9. The method of claim 1, wherein the causing a decoy file to be included in a protected set of files that includes at least one normal file further includes:
   causing a decoy file to be associated with the protected set of files that includes at least one normal file, wherein the decoy file includes a structure usable in discriminating between a decoy file and a normal file.

10. The method of claim 1, wherein the causing a decoy file to be included in a protected set of files that includes at least one normal file further includes:
    causing a decoy file to be associated with the protected set of files that includes at least one normal file, wherein the decoy file includes an encrypted data and/or a characteristic usable in discriminating between a decoy file and a normal file.

11. The method of claim 1, wherein the causing a decoy file to be included in a protected set of files that includes at least one normal file further includes:
    causing a decoy file subtype to be associated with a protected set of files that includes at least one normal file subtype, wherein the decoy file includes data and/or a characteristic usable in discriminating between a decoy file subtype and a normal file subtype.

12. The method of claim 1, wherein the causing a decoy file to be included in a protected set of files that includes at least one normal file further includes:
    causing a decoy file and a decoy file identification tool to be included in a protected set of files that includes at least one normal file.

13. The method of claim 1, wherein the causing a decoy file to be included in a protected set of files that includes at least one normal file further includes:
    causing a decoy file to be included in a protected set of files that includes at least one normal file; and
    causing a decoy file identification tool to be included another set of files.

14. The method of claim 1, wherein the causing a decoy file to be included in a protected set of files that includes at least one normal file further includes:
    causing a decoy file to be included in a protected set of files that includes at least one normal file;
    creating an identification file having a content useful in differentiating the decoy file from the at least one normal file; and
    storing the identification file in at least one of a same information storage device that stores at least a portion of the protected set of files and/or a different information storage device from that which stores the at least a portion of the protected set of files.

15. The method of claim 1, wherein the causing a decoy file to be included in a protected set of files that includes at least one normal file further includes:
    causing a decoy file to be included in a protected database that includes at least one normal file; and
    causing a decoy file identification tool to be included in another protected database.

16. The method of claim 1, wherein the causing a decoy file to be included in a protected set of files that includes at least one normal file further includes:
    causing a decoy file to be included in a protected set of files that includes at least one normal file, the decoy file at least lacking at least one of a name, an attribute, an association, an operation, an interaction, a collaboration, a visibility, a state, a generalization, a relationship, and/or a responsibility of each file of the at least one normal file.

17. The method of claim 1, wherein the causing a decoy file to be included in a protected set of files that includes at least one normal file further includes:
    causing a decoy file to be included in a protected set of files that includes at least one normal file, the decoy file having at least one of a name, an attribute, an association, an operation, an interaction, a collaboration, a visibility, a state, a generalization, a relationship, and/or a responsibility that is at least different from each file of the at least one normal file.

18. The method of claim 1, wherein the causing a decoy file to be included in a protected set of files that includes at least one normal file further includes:
    causing inclusion in a protected set of files of a decoy file having a usability at least limited to facilitating detection of a security breach of the protected set of files.

19. The method of claim 1, wherein the causing a decoy file to be included in a protected set of files that includes at least one normal file further includes:
    causing a decoy file to be included in a protected set of files that includes at least one normal file, the protected set of files including at least one of a collection of information, a large amount of data stored in a computer system, and/or a set of related files that are managed by a set of files management system.

20. The method of claim 1, wherein the causing a decoy file to be included in a protected set of files that includes at least one normal file further includes:
    causing a decoy file to be included in a protected set of files that includes at least one normal file, access to the protected set of files being limited by a security protocol.

21. The method of claim 1, wherein the causing a decoy file to be included in a protected set of files that includes at least one normal file further includes:
    causing a decoy file to be included in a protected set of files that includes at least one normal file, access to the protected set of files being fortified against attack.

22. The method of claim 1, wherein the causing a decoy file to be included in a protected set of files that includes at least one normal file further includes:
    causing a decoy record to be included in a protected relational database that includes at least one normal record.

23. The method of claim 1, wherein the causing a decoy file to be included in a protected set of files that includes at least one normal file further includes:
    causing a decoy object to be included in a protected object orientated database that includes at least one normal object.

24. The method of claim 1, wherein the causing a decoy file to be included in a protected set of files that includes at least one normal file further includes:
    causing a decoy file to be included in a protected file system that includes at least one normal file.

25. The method of claim 1, wherein the causing a decoy file to be included in a protected set of files that includes at least one normal file further includes:
    causing a decoy file to be included in a protected set of files that is subject to control by an owner and an administrator and that includes at least one normal file.

26. The method of claim 1, wherein the owner and the administrator of the set of files includes:
    at least one of a government entity, a social security system, a retirement system, a drivers license system, a passport system, an employer, a merchant, a service provider, a financial transaction card issuer, a merchant, a health care provider, a merchant bank, a financial transaction card association, a member association, a stockbrokerage, a mutual fund, an insurance company, and a banking institution.

27. The method of claim 1, wherein the detecting an indicium of an activity related to the decoy file includes:
    detecting an indicium of an activity related to the decoy file using an artificial intelligence.

28. The method of claim 1, wherein the detecting an indicium of an activity related to the decoy file includes:
    detecting an indicium of an activity related to the decoy file in response to at least two instances of an activity related to the decoy file.

29. The method of claim 1, wherein the detecting an indicium of an activity related to the decoy file includes:
    detecting at least one of an indicium of a credit card charge authorization request, an information request, an account attribute change request, a funds transfer request, an inquiry, a query, a charge, a transaction, a transfer request, a deposit, a claim, a correction, a change of attributes request, a payment, a refund request, and a benefit transfer related to the decoy file.

30. The method of claim 1, wherein the detecting an indicium of an activity related to the decoy file includes:
    detecting an indicium of an activity related to a file of the set of files and determining that the file of the set of files includes the decoy file.

31. The method of claim 1, wherein the detecting an indicium of an activity related to the decoy file includes:
    detecting an indicium of an activity related to a file of the protected set of files and identifying the file as the decoy file using a decoy file identification tool.

32. The method of claim 1, wherein the generating a signal indicating an occurrence of an unauthorized activity related to the protected set of files in response to the detected indicium of an activity related to the decoy file further includes:
    generating a signal indicating a source of an occurrence of an unauthorized activity related to the protected set of files in response to the detected indicium of an activity related to the decoy file.

33. The method of claim 1, wherein the generating a signal indicating an occurrence of an unauthorized activity related to the protected set of files in response to the detected indicium of an activity related to the decoy file further includes:
    generating a signal indicating an occurrence of an unauthorized activity related to the decoy file to the protected set of files in response to the detected indicium of an activity related to the decoy file.

34. The method of claim 1, wherein the generating a signal indicating an occurrence of an unauthorized activity related to the protected set of files in response to the detected indicium of an activity related to the decoy file further includes:
    generating an electrical signal indicating an occurrence of an unauthorized activity related to the protected set of files in response to the detected indicium of an activity related to the decoy file.

35. The method of claim 1, wherein the generating a signal indicating an occurrence of an unauthorized activity related to the protected set of files in response to the detected indicium of an activity related to the decoy file further includes:
    generating a machine-readable signal indicating an occurrence of an unauthorized activity related to the protected set of files in response to the detected indicium of an activity related to the decoy file.

36. The method of claim 1, wherein the generating a signal indicating an occurrence of an unauthorized activity related to the protected set of files in response to the detected indicium of an activity related to the decoy file further includes:
    generating a human-perceivable indication of an unauthorized activity related to the protected set of files in response to the detected indicium of an activity related to the decoy file.

37. The method of claim 1, wherein the generating a signal indicating an occurrence of an unauthorized activity related to the protected set of files in response to the detected indicium of an activity related to the decoy file further includes:
    generating an indication of the unauthorized activity related to the protected set of files that is perceivable by the set-of-files owner and the set-of-files administrator.

38. The method of claim 1, further comprising:
    broadcasting a human-understandable indication of an occurrence of the unauthorized activity related to the protected set of files.

39. The method of claim 1, further comprising:
    facilitating application of a security measure to the protected set of files.

40. A method comprising:
    (a) causing a decoy file to be included in a protected set of files that includes at least one normal file, wherein the causing a decoy file to be included in a protected set of files that includes at least one normal file further includes:
        causing a decoy file to be included in a protected set of files that includes at least one normal file, the decoy file having a property that does not facilitate a return of an approval in response to a health insurance claim and each normal file of the at least one normal file having a property that does facilitate a return of an approval in response to a health insurance claim:
    (b) detecting an indicium of an activity related to the decoy file, wherein the detecting an indicium of an activity related to the decoy file includes:
        (i) detecting an indicium of at least one or more of an activity related to financial transaction card account, an activity related to a bank account, an activity related to an insurance policy, and an activity related to a license holder that corresponds with the decoy file; and
    (c) generating a signal indicating an occurrence of an unauthorized activity related to the protected set of files in response to the detected indicium of an activity related to the decoy file, wherein at least one of causing, detecting, or generating is at least partially performed using one or more processing devices.

41. An apparatus comprising:
    (a) a marker circuit for saving a decoy file in a protected set of files that includes at least one normal file, wherein the marker circuit for saving a decoy file in a protected set of files that includes at least one normal file further includes:
        a marker circuit for saving a decoy file in a protected set of files that includes at least one normal file, the decoy file having a property that does not facilitate a return of an approval in response to a health insurance claim and each normal file of the at least one normal file having a property that does facilitate a return of an approval in response to a health insurance claim;
    (b) a monitor circuit for detecting an indicium of an activity related to the decoy file, wherein the monitor circuit for detecting an indicium of an activity related to the decoy file further includes:

(i) a monitor circuit for detecting at least one of an indicium of a credit card charge authorization request, an account information change request, a funds transfer request, an inquiry, a query, a charge, a transaction, a claim, a correction, a change of attributes request, a refund, and/or a benefit transfer related to the decoy file; and (c) a notification circuit for generating a signal indicating an occurrence of an unauthorized activity related to the protected set of files in response to the detected indicium of an activity related to the decoy file.

42. The apparatus of claim 41, wherein the marker circuit for saving a decoy file in a protected set of files that includes at least one normal file further includes:
a marker circuit for saving a decoy file in a protected database that includes at least one normal file.

43. The apparatus of claim 41, wherein the marker circuit for saving a decoy file in a protected set of files that includes at least one normal file further includes:
a marker circuit for saving a decoy file misleadingly appearing to allow provision of a benefit to a beneficiary into a protected set of files that includes at least one regular file actually allowing provision of the benefit to another beneficiary.

44. The apparatus of claim 41, wherein the marker circuit for saving a decoy file in a protected set of files that includes at least one normal file further includes:
a marker circuit for causing a decoy file subtype to be included in a protected set of files that includes at least one normal file subtype.

45. The apparatus of claim 41, wherein the marker circuit for saving a decoy file in a protected set of files that includes at least one normal file further includes:
a marker circuit for causing a decoy file and a decoy file identification tool to be included in a protected set of files that includes at least one normal file.

46. The apparatus of claim 41, wherein the marker circuit for saving a decoy file in a protected set of files that includes at least one normal file further includes:
a marker circuit for causing a decoy file to be included in a protected set of files that includes at least one normal file and for causing a decoy file identification tool to be included in another set of files.

47. The apparatus of claim 41, wherein the monitor circuit for detecting an indicium of an activity related to the decoy file further includes:
a monitor circuit for detecting an indicium of an activity related to the decoy file in response to at least two instances of an activity related to the decoy file.

48. The apparatus of claim 41, wherein the notification circuit for generating a signal indicating an occurrence of an unauthorized activity related to the protected set of files in response to the detected indicium of an activity related to the decoy file further includes:
a notification circuit for generating an electrical signal indicating an occurrence of an unauthorized activity related to the protected set of files in response to the detected indicium of an activity related to the decoy file.

49. The apparatus of claim 41, wherein the notification circuit for generating a signal indicating an occurrence of an unauthorized activity related to the protected set of files in response to the detected indicium of an activity related to the decoy file further includes:
a notification circuit for generating a human-perceptible indication of an occurrence of an unauthorized activity related to the protected set of files in response to the detected indicium of an activity related to the decoy file.

50. The apparatus of claim 41, further comprising:
a sentry circuit for broadcasting a human-understandable indication of the occurrence of an unauthorized activity related to the protected set of files in response to the detected indicium of an activity related to the decoy file.

51. The apparatus of claim 41, further comprising:
a fortification circuit for facilitating application of a security measure to the protected set of files in response to the detected indicium of an activity related to the decoy file.

52. The apparatus of claim 41, further comprising:
a fortification circuit for facilitating application of a security measure to another set of files in response to the detected indicium of an activity related to the decoy file.

53. An apparatus comprising:
(a) means for causing a decoy file to be included in a protected set of files that includes at least one normal file, including:
(i) means for causing a decoy file to be included in a protected set of files that includes at least one normal file, the decoy file having a property that does not facilitate a return of an approval code in response to a financial transaction card authorization request and each normal file of the at least one normal file having a property that does facilitate a return of an approval code in response to at least one or a financial transaction card authorization request or a health insurance claim;
(b) means for detecting an indicium of an activity related to the decoy file, wherein the means for detecting an indicium of an activity related to the decoy file includes:
(i) means for detecting an indicium of at least one or more of an activity related to a financial transaction card account, an activity related to a bank account, an activity related to an insurance policy, and an activity related to a license holder that corresponds with the decoy file; and
(c) means for generating a signal indicating an occurrence of an unauthorized activity related to the protected set of files in response to the detected indicium of an activity related to the decoy file.

54. The apparatus of claim 53, further comprising:
means for broadcasting a human-understandable indication of an occurrence of an unauthorized activity related to the protected set of files.

55. The apparatus of claim 53, further comprising:
means for facilitating application of a security measure to the protected set of files.

56. A method comprising:
(a) causing a decoy file to be included in a protected set of files that includes at least one normal file, wherein the causing a decoy file to be included in a protected set of files that includes at least one normal file further includes:
(i) causing a decoy file to be included in a protected set of files that includes at least one normal file, the decoy file having a property that does not facilitate a return of an approval code in response to a financial transaction card authorization request and each normal file of the at least one normal file having a property that does facilitate a return of an approval code in response to a financial transaction card authorization request;
(b) detecting an indicium of an activity related to the decoy file; and
(c) generating a signal indicating an occurrence of an unauthorized activity related to the protected set of files in response to the detected indicium of an activity related to the decoy file, wherein at least one of causing, detecting, or generating is at least partially performed using one or more processing devices.

57. A method comprising:
(a) causing a decoy file to be included in a protected set of files that includes at least one normal file, wherein the causing a decoy file to be included in a protected set of files that includes at least one normal file further includes:
  (i) causing a decoy file to be included in a protected set of files that includes at least one normal file, the decoy file having a property that does not facilitate a return of an approval code in response to a health insurance claim and each normal file of the at least one normal file having a property that does facilitate a return of an approval code in response to a health insurance claim;
(b) detecting an indicium of an activity related to the decoy file; and
(c) generating a signal indicating an occurrence of an unauthorized activity related to the protected set of files in response to the detected indicium of an activity related to the decoy file, wherein at least one of causing, detecting, or generating is at least partially performed using one or more processing devices.

58. A method comprising:
(a) causing a decoy file to be included in a protected set of files that includes at least one normal file, wherein the causing a decoy file to be included in a protected set of files that includes at least one normal file includes at least one of:
  (i) causing a decoy file to be included in a protected set of files that includes at least one normal file, the decoy file having a property that does not facilitate a return of an approval code in response to a financial transaction card authorization request and each normal file of the at least one normal file having a property that does facilitate a return of an approval code in response to a financial transaction card authorization request; or
  (ii) causing a decoy file to be included in a protected set of files that includes at least one normal file, the decoy file having a property that does not facilitate a return of an approval in response to a health insurance claim and each normal file of the at least one normal file having a property that does facilitate a return of an approval in response to a health insurance claim;
(b) detecting an indicium of an activity related to the decoy file, wherein the detecting an indicium of an activity related to the decoy file includes:
  (i) detecting at least one or more of an indicium of a credit card charge authorization request, an information request, an account attribute change request, a funds transfer request, an inquiry, a query, a charge, a transaction, a transfer request, a deposit, a claim, a correction, a change of attributes request, a payment, a refund request, and a benefit transfer related to the decoy file; and
(c) generating a signal indicating an occurrence of an unauthorized activity related to the protected set of files in response to the detected indicium of an activity related to the decoy file, wherein at least one of causing, detecting, or generating is at least partially performed using one or more processing devices.

59. An apparatus comprising:
(a) a marker circuit for saving a decoy file in a protected set of files that includes at least one normal file, wherein the marker circuit for saving a decoy file in a protected set of files that includes at least one normal file includes:
  (i) a marker circuit for saving a decoy file in a protected set of files that includes at least one normal file, the decoy file having a property that does not facilitate a return of an approval code in response to a health insurance claim and each normal file of the at least one normal file having a property that does facilitate a return of an approval code in response to a health insurance claim;
(b) a monitor circuit for detecting an indicium of an activity related to the decoy file; and
(c) a notification circuit for generating a signal indicating an occurrence of an unauthorized activity related to the protected set of files in response to the detected indicium of an activity related to the decoy file.

\* \* \* \* \*